United States Patent [19]

Shah

[11] Patent Number: 5,390,326

[45] Date of Patent: Feb. 14, 1995

[54] LOCAL AREA NETWORK WITH FAULT DETECTION AND RECOVERY

[75] Inventor: Nitin J. Shah, Northboro, Mass.

[73] Assignee: The Foxboro Company, Foxboro, Mass.

[21] Appl. No.: 56,221

[22] Filed: Apr. 30, 1993

[51] Int. Cl.$^6$ ............................................. G06F 11/00
[52] U.S. Cl. ..................... 395/575; 371/8.2; 371/62; 371/20.6; 370/85.4
[58] Field of Search ................ 371/8.2, 9.1, 20.6, 371/62; 395/575; 370/14, 16, 85.4

[56] References Cited

U.S. PATENT DOCUMENTS

| | | | |
|---|---|---|---|
| 4,807,224 | 2/1989 | Naron et al. | 370/94 |
| 4,860,006 | 8/1989 | Barall | 340/825.5 |
| 4,868,818 | 9/1989 | Madan et al. | 371/11.3 |
| 4,964,120 | 10/1990 | Mostashari | 370/16 |
| 4,991,174 | 2/1991 | Mori et al. | 371/15.1 |
| 5,008,805 | 4/1991 | Fiebig et al. | 364/184 |
| 5,023,872 | 6/1991 | Annamalai | 371/5.1 |
| 5,040,175 | 8/1991 | Tuch et al. | 370/85.2 |
| 5,117,430 | 5/1992 | Berglund | 370/85.1 |
| 5,119,222 | 6/1992 | Hara et al. | 359/110 |
| 5,123,089 | 6/1992 | Beilinski et al. | 395/200 |

OTHER PUBLICATIONS

Koji Kobayashi et al., "New Communication Network Protocol for Cell Level Factory Automation and Its LSI Implementation," *Computer Applications in Production and Engineering*, IFIP (1989), 565–572.

*Primary Examiner*—Charles E. Atkinson
*Attorney, Agent, or Firm*—Jules Jay Morris; Mary Lou Wakimura; Steven M. Mills

[57] ABSTRACT

A local area network having fault detection and recovery and a method for detecting and recovering from faults in a local area network are disclosed. The network has modules interconnected by a token bus implemented by a pair of redundant cable systems. All of the modules are agent modules and one of the modules also serves as a master module. Each agent module periodically transmits an agent heartbeat signal on each of its cables. Each module monitors all of the agent heartbeat signals from all of the other modules. When a fault is detected by a module, such as missed agent heartbeat signals from another module, the module applies agent rules to determine if and how the fault should be reported. The agent module reports the fault to the master module. The master module collects fault reports from the agent modules, applies a set of master rules to the agent fault reports, and generates a master failure report. The master module also initiates an appropriate network recovery action based upon the failure report generated. The master module periodically transmits a master heartbeat signal on the token bus which is received by the agent modules. The agent modules decode the master heartbeat signal to ensure that a master module is always present on the token bus.

45 Claims, 9 Drawing Sheets

LOCAL AREA NETWORK WITH FAULT DETECTION AND RECOVERY

BACKGROUND OF THE INVENTION

A local area network (LAN) is an electronic system which includes several devices called stations, modules or nodes which interact with each other to perform specific tasks. The modules on the network are interconnected by a bus which is often implemented by a very sophisticated system of cables. The modules communicate over the bus in accordance with standardized protocols.

One type of network communication protocol is known as token passing. During normal operation on a token passing LAN, a package of data called a token is passed or transmitted along the bus (in this case referred to as the token bus) from one module to the next in succession. In a ring type token passing LAN, one can visualize the token being passed from module to module repeatedly around the ring. The token is used to control access to the bus. Each module has possession of the token for a specific predetermined period of time. During that period, the module in possession has exclusive use of the token bus to communicate with other modules, peripheral devices, etc.

Local area networks are often used to control operations in an industrial manufacturing or process plant. Very large networks are formed which may incorporate multiple user workstations, control and applications processors as well as all of the electrical, mechanical, hydraulic, pneumatic or other type of equipment used to perform the various tasks required by the specific process being controlled. It will be appreciated that in such systems reliability of the network is a high priority requirement.

Traditionally, failures of cables and modules in such systems have been difficult to detect and even more difficult to correct expeditiously. Such failures have resulted in lengthy and costly process shutdowns while diagnostic and remedial tasks were performed.

SUMMARY OF THE INVENTION

The present invention is a local area network with fault detection and recovery. The present invention also provides a method in a local area network of detecting and recovering from faults. The local area network has a plurality of stations or nodes or modules connected on a token bus implemented by redundant cables.

Each module periodically transmits signals referred to as heartbeat signals on each cable of the token bus at a predetermined rate. Each module is adapted to receive on each cable the heartbeat signals from the other modules connected on the token bus. Each module monitors the other modules' heartbeat signals. A fault and hence a failure is indicated when the heartbeat signals fail to be received at the predetermined periodic rate. After a fault has been indicated, the network initiates a process by which it recovers from the failure.

The network of the present invention is capable of indicating and recovering from several different types of faults or failures. These include network trunk cable and module drop cable faults and discontinuities as well as excessive cable noise. Also, network faults caused by the token bus transmitter and/or receiver within specific modules can be detected and recovered from.

In one embodiment, all of the modules are agent modules and one module also serves as a master module. The agent modules and the master module monitor the heartbeat signals as mentioned above. When an agent fails to receive heartbeat signals as expected, the agent applies a set of agent rules to the failure to determine if and how it should be reported. The agent transmits failure reports, also referred to herein as filtered results, to the master module.

The master module collects the filtered results from the agent modules and applies master rules to them to determine if a network fault exists. If it is determined that a fault exists, the master module then determines an appropriate course of action to be taken to recover. The master module then transmits commands to the agents to carry out the recovery. The master module also makes a failure report to the user. The user can then permanently correct the fault.

Each module on the token bus can be either a master module or an agent module, there being one master module at any given time. The module which serves as master is nominated from the modules on the token bus. After the master is selected, the remaining modules serve as agent modules. The master module can also serve as an agent module simultaneously.

The master module is selected by a master nomination algorithm. Each module is assigned a unique identifying character which associates a level of priority with the module. When the master nomination algorithm is invoked, the priority levels are compared. The module with the highest priority level is deemed the master.

During operation, the master periodically transmits a master heartbeat signal on the token bus to inform the agents that it is present. If the master fails, a new master is nominated by invoking the master nomination algorithm. Once again, the module with the highest priority is selected as the master. Thus, a master module is always present and operating on the token bus.

The network of the present invention may be part of a larger system. In one embodiment, each token bus module also serves as a node on a node bus. The node buses of the system occupy a lower logical level than the token bus in the system logic hierarchy. Each node bus has its own master node which resolves faults on the node bus. When a node bus master cannot resolve a fault, it can report the fault to the token bus module on the node bus. In one embodiment, devices on one node bus can communicate with devices on another node bus via their respective token bus modules. In another embodiment, each token bus module serves as a master node on its corresponding node bus. Faults on a node bus are reported to the token bus module corresponding to that node bus.

The network fault detection and recovery of the present invention provide numerous advantages. In prior systems, a single fault-tolerant module on the network detected failures by sampling the cables periodically and making conclusions about failures based on its own perspective of the network. Thus, the prior art detection schemes involved a guessing element in making conclusions. Also, only simple faults could be correctly detected.

In contrast, in the present invention, the master module on the token bus compiles failure reports from all of the agent modules. A conclusion concerning a fault is made based upon an analysis of all of the reports taken together. This enlarged perspective allows the present system to draw more accurate conclusions regarding faults. Also, more complicated faults can be detected and recovered from.

A simple example will serve to illustrate the improved detection and recovery method of the present invention. A network is assumed to have three modules, one of which has a failed token bus receiver. In a system of the prior art, the fault tolerant module would sample communications on the cables on the network and would not find a fault. However, in the network of the present invention, the faulty module will transmit a failure report to the master module, informing the master module that no heartbeats have been received from all other modules on that cable. No other modules will report a fault. Using these reports, the master module will conclude that the faulty module has a failed receiver. Thus, the present method of transmitting and monitoring periodic heartbeat messages provides more accurate fault detection and recovery.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same components throughout the different views. The drawings are not necessarily to scale, emphasis instead being placed upon illustrating the principles of the invention.

DETAILED DESCRIPTION OF THE INVENTION

Figure 1:
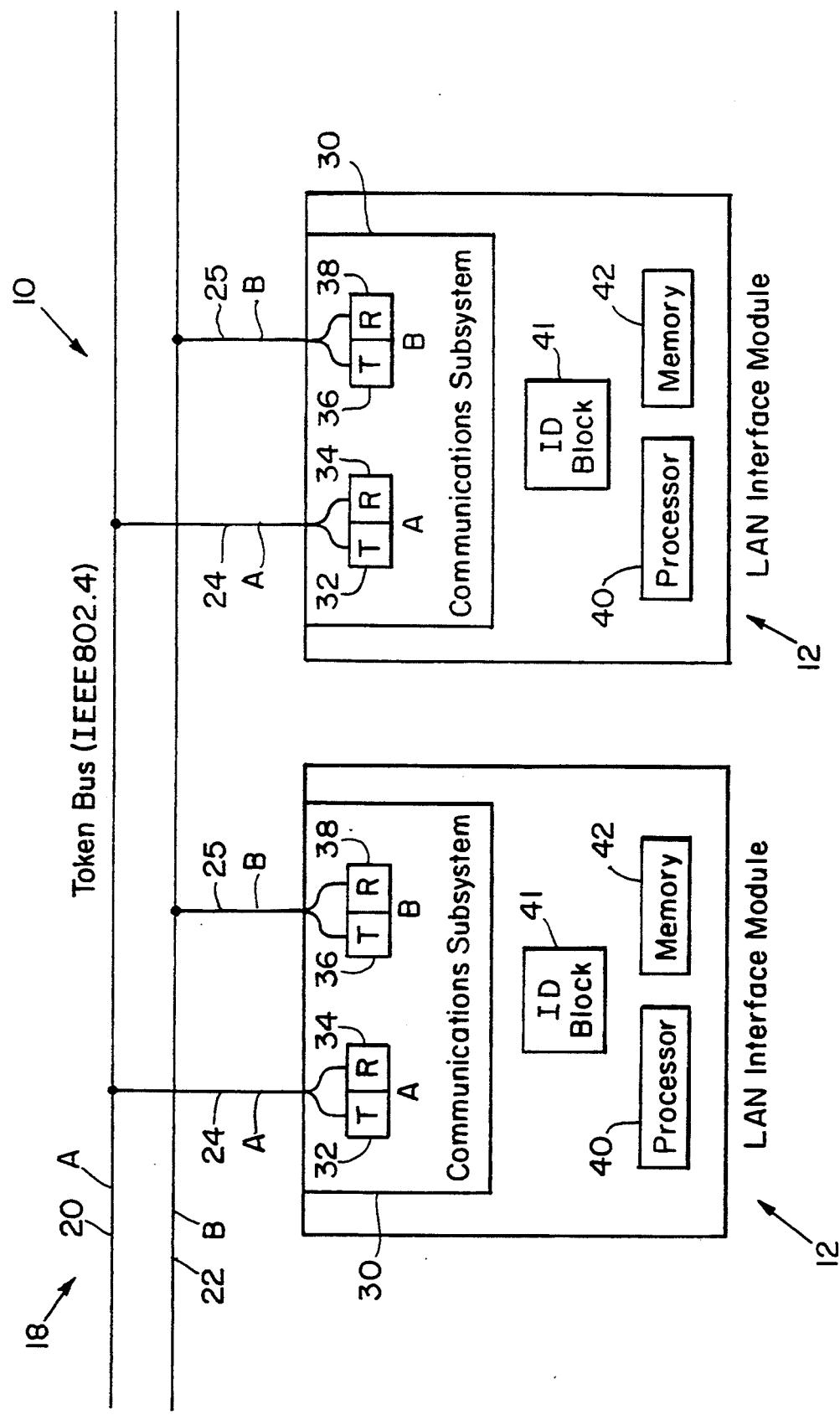
FIG. 1 is a schematic block diagram of a portion of a token passing local area network in accordance with the present invention.

FIG. 1 schematically depicts a portion of a token passing LAN 10 in accordance with the present invention. In this depiction, the LAN comprises two LAN interface (LI) stations, nodes or modules indicated generally as 12. The LI modules 12 are interconnected via the token bus 18. In a preferred embodiment, the network is compatible with IEEE standard 802.4 for token passing LANs.

The token bus 18 comprises a pair of trunk cables 20 and 22. Each LI module 12 is connected to the token bus 18 by a pair of drop cables 24 and 25. Specifically, the LI modules 12 are connected to trunk cable 20 by drop cables 24 and to trunk cable 22 by drop cables 25. Thus, the LI modules 12 are interconnected by a pair of redundant cable systems or communication channels which include trunk cables 20 and 22 as well as module drop cables 24 and 25. For simplicity and clarity, the cable system comprising trunk cable 20 and drop cables 24 will be referred to herein as system A, channel A or cable A. The cable system comprising trunk cable 22 and drop cables 25 will be referred to as system B, channel B or cable B.

Each LI module 12 has a communications subsystem (CS) 30. The CS 30 handles transmission and reception of signals on the token bus 18. Each CS 30 comprises a cable A transmitter 32 and a cable A receiver 34 connected to the channel A trunk cable 20 by the channel A drop cable 24. Each CS 30 also comprises a cable B transmitter 36 and a cable B receiver 38 connected to the channel B trunk cable 22 by the channel B drop cable 25. LI modules 12 communicate with each other over the token bus 18 via these transmitters and receivers. The A transmitters 32 and the A receivers 34 transmit and receive signals over the cable A system; the B transmitters 36 and receivers 38 communicate via the cable B system. This dual-channel communication system provides the redundancy which facilitates recovery from network faults. Should one of the channels experience a failure, the network can simply restrict communications to the other channel.

Each LI module 12 also has an identity insert block 41. Each block 41 uniquely identifies the LI module 12 in which it resides. The function of the block 41 within the system of the present invention will be described below in detail.

Each LI module 12 also has a processor 40 and memory 42. The memory 42 stores programs and data used by the processor 40 to control the various functions of the LI module 12. The processor 40 and memory 42 interface with the CS 30 of the LI module 12 to analyze, manipulate, or control transmission and reception of signals on the token bus 18. The processor 40 and memory 42 also interact with each other and with other LI module subsystems to perform other functions of the LI module 12 required for its operation in accordance with the present invention. These other functions will be described herein.

In the preferred embodiment, faults on the network 10 are detected by monitoring periodic signals transmitted on the token bus 18 by the modules 12. All of the modules 12 serve as agent modules. In addition, one of the modules is nominated to serve as a master module. Each agent module periodically transmits agent heartbeat signals on channels A and B of the token bus 18. In the preferred embodiment, an agent module alternately transmits an agent heartbeat signal on one of cable A or cable B every fifteen seconds. That is, the agent transmits an agent heartbeat signal on cable A followed fifteen seconds later by an agent heartbeat signal on cable B. Fifteen seconds after that, it transmits another agent heartbeat signal on cable A, and so on, meaning that heartbeats are transmitted on each cable every 30 seconds. This alternating transmission of agent heartbeats continues while the network 10 is operating. It will be understood that other transmission ordering schemes are possible. Also, the period between transmissions need not be limited to fifteen seconds.

Each agent heartbeat signal is a collection of data formatted for transmission on the token bus 18 in accordance with the bus communication protocol, in one embodiment, IEEE standard 802.4. One of the data fields in the agent heartbeat signal identifies its source.

The source LI module 12 is identified as well as the cable system, A or B, on which the signal was sent. This allows the agents to closely monitor each other's agent heartbeats and identify the potential source of network failures.

The CS 30 in each agent module receives every agent heartbeat signal from all the other agents. The CS 30 keeps track of all of the agent heartbeats by source module and cable. The CS 30 monitors a list of all stations presently on the network so that it knows which heartbeat signals to expect. The list is updated regularly as stations are added to or removed from the network.

When the CS 30 encounters an error in the agent heartbeats, it reports the error to its agent module processor 40. For example, if a CS 30 fails to receive two consecutive cable A agent heartbeats from the same module, the CS 30 reports the error to its agent module processor 40.

The agent collects failure reports from its CS 30 for a predetermined period of time called the agent window. In one embodiment, the agent window is 35 seconds. The agent processor 40 compiles the reports, applies a set of agent rules to them, and makes an appropriate failure report to the master module. The master collects agent failure reports or filtered results, applies master rules to them, and issues master failure reports to the user as well as fault recovery commands to the agents.

Figure 2:
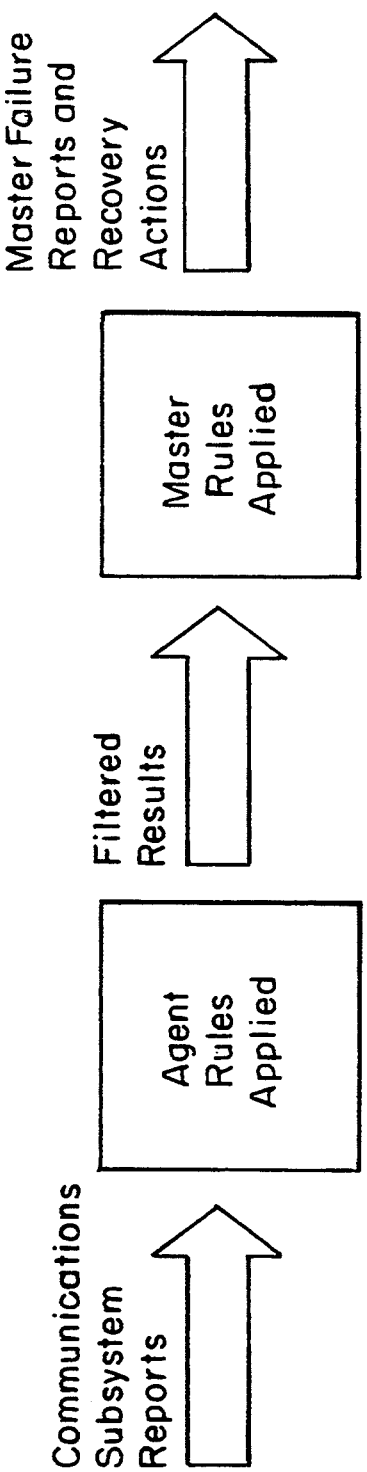
FIG. 2 depicts the hierarchical logical structure of the error detection method of the present invention.

FIG. 2 schematically depicts the logical flow of the fault detection and recovery of the present invention. The diagram shows the hierarchical structure of the fault detection method. At the lowest level, CSs 30 report errors to their respective agents 12. The agents 12 apply agent rules to the error reports to generate filtered results. The filtered results are transmitted to the master module 12 which applies master rules to them. The master module 12 generates failure reports and commands recovery actions to the faulty components of the network.

The CSs 30 of the LI modules 12 are at the lowest logical level of fault detection in the network. Each CS 30 is responsible for generating and transmitting agent heartbeat signals from both transmitters at the proper rate. In addition, the CS 30 receives the agent heartbeat signals from other LI modules. It decodes and monitors every agent heartbeat signal from all of the other LI modules on the network. It also checks the time between agent heartbeats to ensure that all of them are being transmitted at the proper rate.

The CS 30 detects errors in the agent heartbeat signals and reports them to its agent processor 40. The CS 30 can make three types of reports to its agent. It can report a single agent heartbeat signal missing from a module, or two successive agent heartbeats missing from a module, or a cable noise level above a predetermined allowable noise threshold.

At the next logical level in the fault detection, the agent processors 40 receive error reports from their individual respective CSs 30. Agent rules are applied to the reports to determine if an error actually exists and, if so, what the source of the error is. After the determination is made, the agent generates a set of filtered results and reports them to the master module on the token bus. The possible filtered results which can be reported by the agent include trunk cable or drop cable failures, noisy trunk cables or drop cables and intermittent or failed transmitters.

The master processor 40 of the module applies master rules to the received filtered results in order to ascertain the nature of the failure. Based on the conclusion, the master then devises and implements a corrective action to enable the network to recover from the fault and continue to operate properly. The master also reports the failure to the operator via a network monitor. The operator can then effect repairs to the faulty component and run a cable test. If the test does not reveal a failure, the network can return to normal operation.

The details of the fault detection and recovery will now be described in connection with Tables I-VII. Tables I-III depict the relationship between the fault reports or indications made by the CS 30 to the agent processor 40 and the filtered results generated by the agent processor 40. The first column of each of Tables I-III lists a possible report which can be made by the CS 30. The middle column shows how the agent rules are applied to the CS reports. The third column shows the filtered results after application of the agent rules.

Referring to Table I, one fault which the CS 30 reports to its agent processor 40 is two successive missed agent heartbeat signals from a single node on a single channel (A or B). When the CS 30 misses a first agent heartbeat, it records that fact and waits for the next expected agent heartbeat from the node and channel in question. If the second agent heartbeat is not received as expected, the CS 30 makes a report to its agent. In one embodiment, the CS 30 reports faults involving cable A to its agent at the same time it transmits its own cable B agent heartbeat on the token bus 18. It reports cable B faults when it transmits its cable A agent heartbeat.

When the agent processor 40 receives the first report from the CS 30 that two successive agent heartbeats have been missed on a specific cable (A or B) from a node X, the agent processor 40 starts a 35-second timer. This represents the "agent window" for this fault report. The 35-second agent window is longer than the 30-second time between heartbeat signals to ensure that if the second heartbeat is sent, it will not be missed. When the agent window ends, the agent processor applies its rules, generates filtered results and transmits them to the master if necessary. While the window is open, the agent processor 40 waits for another report from the CS 30 of two consecutive missed agent heartbeats from another node. If no such report is made by the CS 30, the agent processor 40, applying the agent rules, concludes that the transmitter on node X (Channel A or B) has failed. Thus, the filtered results reported to the master module are that the transmitter on a particular channel in node X has failed. During the 35-second agent window, if the CS 30 reports that two consecutive agent heartbeats have been lost from multiple nodes on the same cable, the agent processor 40 concludes that the trunk cable has failed and makes this report to the master module.

Referring to Table II, the CS 30 also reports single missing agent heartbeats to the agent processor 40. As indicated above, if the CS 30 misses a first agent heartbeat from a node, it awaits the next agent heartbeat from that node. If that agent heartbeat is not received, the CS 30 reports two successive missing agent heartbeats to the agent processor 40. However, if the expected agent heartbeat is received, then the CS 30 reports a single missing agent heartbeat to the agent processor.

The agent processor 40 monitors a 9-minute window during which it keeps a total count of the number of single missed agent heartbeats reported from a node on a specific cable. If during that 9-minute period the total count for a single node and cable is greater than or equal to 6, the agent concludes that three possible failures exist. The possible failures are that the node has an intermittent transmitter on the problem channel or that the node has a noisy drop cable on the channel or that the trunk cable on the channel is noisy.

During the 9-minute period, the agent also keeps a total count of the total number of single missed agent heartbeats on all the nodes for each channel. It calculates the ratio $$\frac{Total\_Count}{Total\_Nodes - 1}.$$

If that ratio is ever greater than or equal to 6 during the 9-minute window for one of the channels, the agent processor 40 concludes that the channel's trunk cable (A or B) is noisy.

Referring to Table III, the CS 30 also reports excessive cable noise to the agent processor 40. The CS 30 periodically senses the noise level on each of the cables to which it is connected. This sensed noise level is compared to a predetermined maximum tolerable noise level. If the measured noise exceeds the maximum tolerable level, the CS 30 reports the noisy cable to the agent. If the agent receives two successive reports for the same cable in a specified period of time, the agent concludes that the cable is noisy. In the preferred embodiment, this period is 35 seconds and is determined by the rate at which the CS 30 samples the cables for noise.

TABLE I

| COMMUNICATIONS SUBSYSTEM REPORTS | AGENT RULES APPLIED | FILTERED RESULTS GENERATED |
|---|---|---|
| 2 Successive HB Missing From Node X (A or B) | - 1 report of HB loss from Node X (agent window = 35 seconds after reception of the report) | - TX Failure Node X (A or B) |
|  | - reports of HB loss from more than one node (agent window = 35 seconds after reception of the first report) | - Trunk Cable Failure (A or B) |

TABLE II

| COMMUNI-CATIONS SUBSYSTEM REPORTS | AGENT RULES APPLIED | FILTERED RESULTS GENERATED |
|---|---|---|
| 1 HB missing from Node X (A or B) | - reports of single misisng from HBs from a single node Total\_Count $\geq 6$ (9 minute period after reception of report) | - Intermittent TX Node X or Noisy Drop Cable or Noisy Trunk Cable (A or B) |
|  | - reports of missing single HBs from more than one node and Total\_Count $\left.\begin{array}{l}\\ \\ Total\_Nodes - 1 \end{array}\right\} \geq 6$ (9 minute period after reception of first report) | - Noisy Trunk Cable (A or B) |

TABLE III

| COMMUNICATIONS SUBSYSTEM REPORTS | AGENT RULES APPLIED | FILTERED RESULTS GENERATED |
|---|---|---|
| Noisy Cable Indication | - 2 successive reports for the same cable within 35 seconds | - Noisy Trunk Cable (A or B) |

The filtered results from the agents are supplied to the master module on the network 18. The master module applies master rules to the filtered results to generate network failure reports and to initiate corrective action. Tables IV-VII show the relationship between the filtered results from the agents and the failure reports generated by the master. The first column of the tables shows the filtered results supplied to the master. The second column illustrates the master rules applied to the filtered results. The third column shows the failure reports generated by the master.

Table IV shows the relationship for failures involving trunk cables or drop cables. After the master, i.e., its processor 40, receives an agent report, it starts a 36-second master window. When a node X reports a trunk cable failure on a channel and two or more other nodes which make reports during the master window report node X transmitter failure on the channel, the master processor 40 generates a failure report indicating a failure of either the node X drop cable or the trunk cable on the channel. Where node X reports a trunk cable failure and not all the other reporting nodes report a node X transmitter failure, the master processor 40 generates a trunk cable failure report. When more than one agent node reports the same trunk cable failure within the master window, the master processor 40 generates a trunk cable failure report on the failed channel A or B. If the other channel has already been reported a failure, the master reports both cables have failed.

As previously described, an agent can also report intermittent node X transmitter on a channel or noisy drop cable on a channel or noisy trunk cable on a channel. In these case, the report is repeated as a master failure report. In a network with only two nodes, where both agents report within the master window that the other's transmitter has failed and both reports indicate the same channel, the master processor 40 will indicate failure of the trunk cable or drop cable on the indicated channel.

Table V shows the relationship between filtered results and master failure reports for failures involving receivers. Where a node X reports a trunk cable failure on a channel and no other nodes make any reports within the master window, the master processor 40 reports a node X receiver failure. More specifically, when a node X reports a trunk cable failure on a channel and no other node reports a node X transmitter failure within the master window, the master reports a node X receiver failure on the channel. In a network having only two nodes and where one of the nodes reports failure of the other's transmitter, the master reports either the failure of the reporting node's receiver or failure of the other node's transmitter.

Table VI concerns failures involving transmitters. Where more than one agent node reports failure of a node X transmitter and no reports are received from node X within the master window, the master processor 40 reports that the node X transmitter has failed. When more than one report of a node X transmitter failure is received and no cable failure reports are received within the master window, the master processor 40 reports failure of the node X transmitter. Where a node X intermittent transmitter is reported, no master rules are applied. The master processor 40 reports a node X intermittent transmitter.

In a network having only two nodes, where only one node reports failure of the other's transmitter and no other reports are received within the master window, the master processor 40 reports failure of the reporting node's receiver or the other node's transmitter. Where one node reports the other node's transmitter is intermittent and no other reports are received, the master reports intermittent failure of the reporting node's receiver or intermittent failure of the other node's transmitter. In a two-node network where both nodes report intermittent transmitter in the other node, the master reports a noisy trunk cable.

Table VII involves detection of noisy cables. Where at least two agent nodes report a noisy trunk cable and the total number of nodes reporting the noisy trunk cable is greater than or equal to 5 percent of the total number of nodes on the token bus 18, the master processor 40 reports the noisy trunk cable. The master processor 40 will report both trunk cables are noisy when at least two agent nodes for each of the cables report a noisy trunk cable condition and the total number of nodes reporting the condition on each cable is greater than or equal to 5 percent of the total number of nodes on the bus for each cable. These reports must be received by the master within 35 seconds.

In a two-node network, if both nodes report a single noisy trunk cable condition within 30 seconds, the master processor 40 will report the noisy trunk cable condition. If both of the nodes report a noisy trunk cable condition on both cables within 30 seconds, the master will report both trunk cables are noisy.

TABLE IV

| FILTERED RESULTS | MASTER RULES APPLIED | FAILURE REPORTS GENERATED |
|---|---|---|
| NETWORK WITH MORE THAN 2 NODES | | |
| Node X reported Trunk Cable (A or B) Failure Other nodes reported TX Failure Node X (A or B) | - Node X reported Trunk Cable Failure - two or more other nodes on the bus reported Node X TX Failure (within 36 seconds after the reception of the first agent report) | Node X's Drop Cable Failure (A or B) or Trunk Cable Failure (A or B) |
| Node X reported Trunk Cable (A or B) Failure Other nodes reported TX Failure Node X (A or B) | - Node X reported Trunk Cable Failure - not all other nodes on the bus reporting during master window reported Node X TX Failure (within 36 seconds after the reception of the first agent report) | Trunk Cable Failure (A or B) |
| Trunk Cable Failure (A or B) | - more than one node reported Trunk Cable Failure (within 36 seconds after the reception of the first agent report) | Trunk Cable Failure (A or B) or Trunk Cable Failure (A and B) (if other cable already failed) |
| Intermittent TX | - no rules applied | Intermittent TX Node |

TABLE IV-continued

| FILTERED RESULTS | MASTER RULES APPLIED | FAILURE REPORTS GENERATED |
|---|---|---|
| Node X or Noisy Drop Cable or Noisy Trunk Cable | | X or Noisy Drop Cable or Noisy Trunk Cable |
| NETWORK WITH 2 NODES | | |
| TX Failure | - both report each other's TX Failure (within 30 seconds after first agent report) | Trunk Cable or Drop Cable Failure |

TABLE V

| FILTERED RESULTS | MASTER RULES APPLIED | FAILURE REPORTS GENERATED |
|---|---|---|
| NETWORK WITH MORE THAN 2 NODES | | |
| Trunk Cable Failure | - Node X reports Trunk Cable Failure - no other node reports are received within 30 seconds | Node X RX (A or B) Failure |
| Node X reported Trunk Cable (A or B) Failure | - Node X reported Trunk Cable Failure - no node reports Node X TX Failure (within 36 seconds of TX Failure report) | Node X RX (A or B) Failure |
| NETWORK WITH 2 NODES | | |
| TX Failure | only 1 node reports TX Failure in a period of 30 seconds | Reporting Node's RX Failure or Other Node's TX Failure |

TABLE VI

| FILTERED RESULTS | MASTER RULES APPLIED | FAILURE REPORTS GENERATED |
|---|---|---|
| NETWORK WITH MORE THAN 2 NODES | | |
| TX Failure Node X | - More than 1 node report Node X TX Failure - no reports are received from Node X within 30 seconds | Node X TX Failure |
| TX Failure Node X | - more than one report of Node X TX Failure - no reports of cable failures (within 36 seconds master window) | Node X TX Failure (A or B) |
| Intermittent TX Node X | - no rules applied | Intermittent TX Node X |
| NETWORK WITH 2 NODES | | |
| TX Failure | - only 1 node reports TX Failure in a period of 30 seconds | Reporting Node's RX Failure or Other Node's TX Failure |
| Intermittent TX | - Only 1 node reports Intermittent TX in a period of 30 seconds | Intermittent Failure of Reporting Node's RX or other Node's TX |
| Intermittent TX | - both nodes report Intermittent TX in a period of 30 seconds | Noisy Trunk Cable (A or B) |

TABLE VII

| FILTERED RESULTS | MASTER RULES APPLIED | FAILURE REPORTS GENERATED |
|---|---|---|
| NETWORK WITH MORE THAN 2 NODES | | |
| Noisy Trunk Cable (A or B) | - at least 2 nodes report Noisy Trunk Cable<br>- total no. of nodes reporting Noisy Trunk Cable is ≧5% of the total no. of nodes on the token bus | Noisy Trunk Cable (A or B) |
| | - at least 2 nodes for each cable report Noisy Trunk Cable<br>- total no. of nodes reporting Noisy Trunk Cable is ≧5% of the total no. of nodes on the token bus for each cable within 35 seconds | Noisy Trunk Cable (A and B) |
| NETWORK WITH 2 NODES | | |
| Noisy Trunk Cable (A or B) | - both nodes report a Noisy Trunk Cable within 30 seconds | Noisy Trunk Cable (A or B) |
| | both nodes report Noisy Trunk Cable on both cables within 30 seconds | Noisy Trunk Cable (A and B) |

FIGS. 3a-3d present examples which illustrate the fault detection of the present invention. The examples involve a token bus having channels A and B and four nodes numbered 1-4. The figures depict the hierarchical structure of the fault detection method. The CS 30 informs the agent processor 40 of missing agent heartbeats. Next, agent rules are applied to the CS reports to produce filtered results. The filtered results are then supplied to the master node which uses the master rules to generate master failure reports and performs recovery.

Figure 3A:
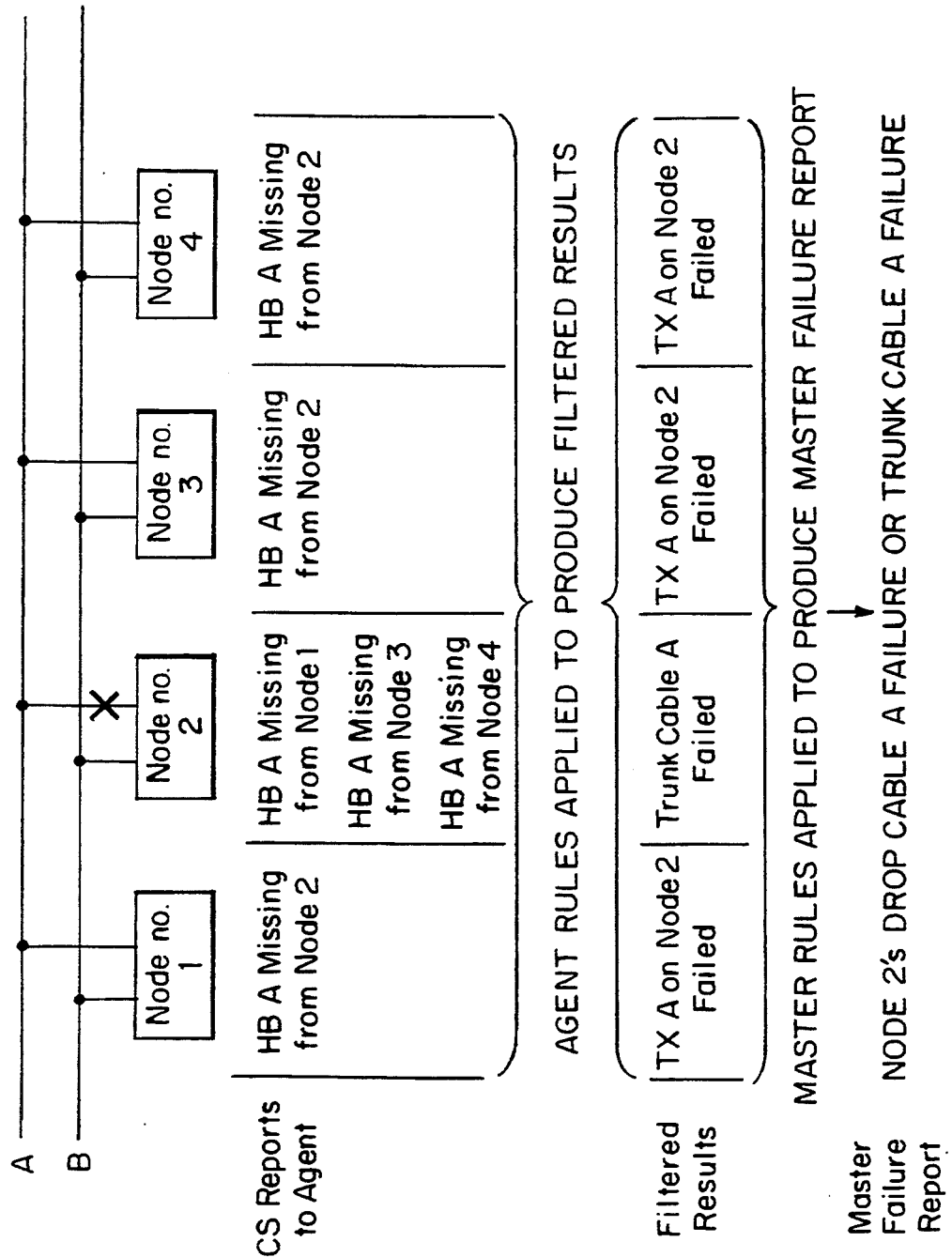
FIG. 3a shows the logical flow of the fault detection of the present invention when a drop cable has failed.

FIG. 3a depicts the case in which a drop cable has failed. In this case, the A drop cable to node 2 has failed, as is indicated by the "X" through the cable. The individual CSs have reported missing agent heartbeats to their respective agents. Specifically, agent nodes 1, 3, and 4 have been informed of missing agent heartbeat A from node 2. In addition, the CS in agent node 2 has reported agent heartbeat A missing from nodes 1, 3, and 4.

The agent rules are applied to each of these sets of CS reports to arrive at the filtered results. The filtered results from node 1 indicate that the A transmitter on node 2 has failed. Nodes 3 and 4 report the same failure. Node 2 reports failure of trunk cable A.

The master receives and applies master rules to these filtered results to arrive at the master's failure report. In this case the master reports that the node 2 drop cable A has failed.

Figure 3B:
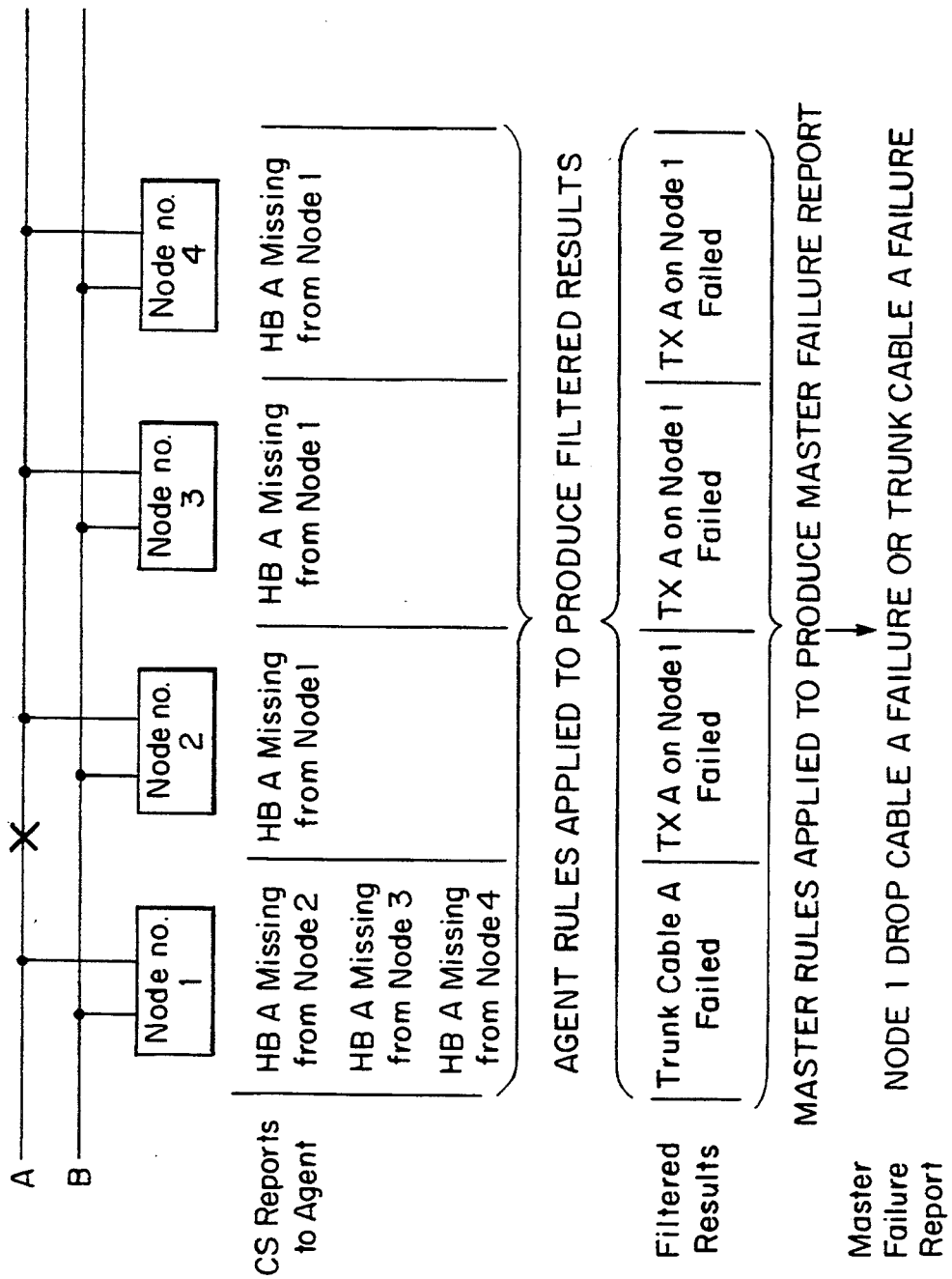
FIG. 3b shows the logical flow of the fault detection of the present invention when a trunk cable has failed.

FIG. 3b illustrates a trunk cable failure. In this case trunk cable A has failed as indicated by the "X" through the cable between nodes 1 and 2. The CS in node 1 reports agent heartbeat A missing from nodes 2, 3 and 4. Nodes 2, 3 and 4 report agent heartbeat A missing from node 1. These CS reports are transmitted to their respective agents.

The agent rules are applied to the CS reports to produce the filtered results. Node 1 concludes that trunk cable A has failed, while nodes 2, 3, and 4 conclude that the A transmitter on node 1 has failed. These filtered results are supplied to the master. The master rules result in the master's failure report which indicates failure of drop cable. A on node 1.

Figure 3C:
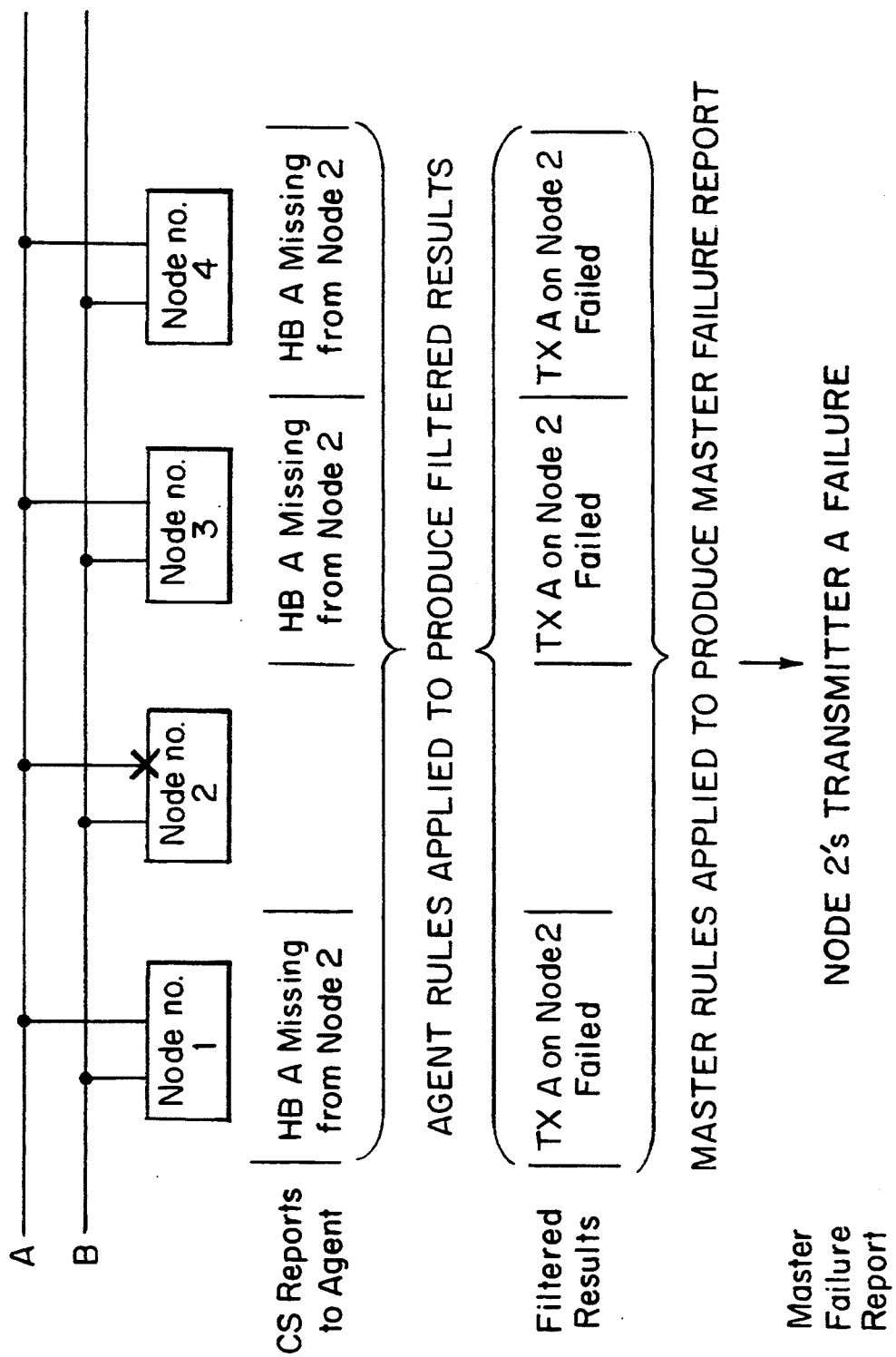
FIG. 3c shows the logical flow of the fault detection of the present invention when a transmitter has failed.

FIG. 3c illustrates a transmitter failure. In this case the A transmitter in node 2 has failed, as indicated by the "X" through the end of drop cable A on node 2. Nodes 1, 3, and 4 report missing A agent heartbeats from node 2. Node 2 makes no failure report. Agents 1, 3, and 4 report to the master that the A transmitter on node 2 has failed. No filtered results are sent from node 2 to the master. After applying the master rules to the filtered results, the master concludes that the node 2 A transmitter has failed.

Figure 3D:
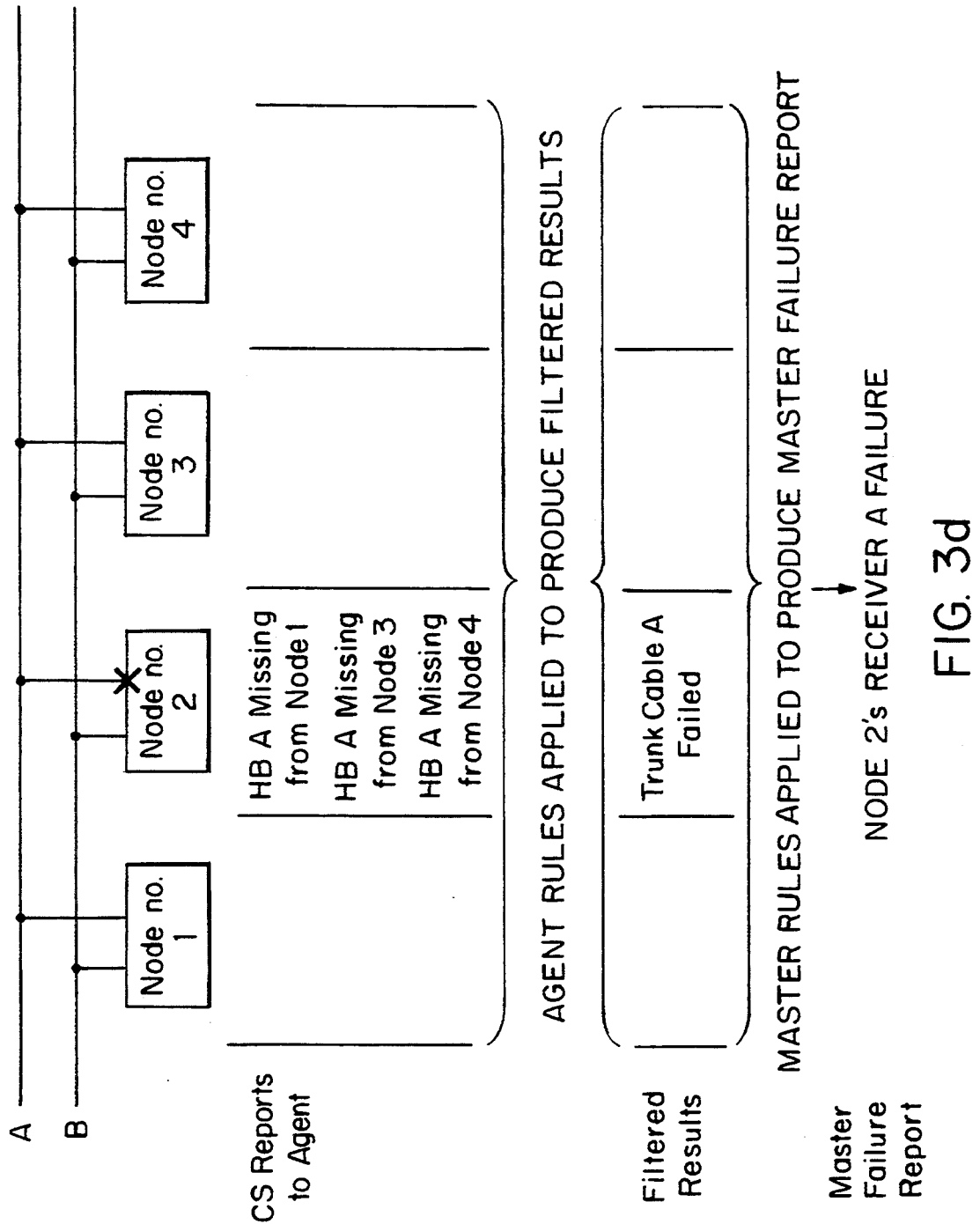
FIG. 3d shows the logical flow of the fault detection of the present invention when a receiver has failed.

FIG. 3d illustrates a receiver failure. In this case the A receiver on node 2 has failed as indicated by the "X" through the end of drop cable A at node 2. The CS in node 2 has reported to its agent processor 40 that agent heartbeat A is missing from nodes 1, 3, and 4. Nodes 1, 3 and 4 make no failure reports. The filtered results from node 2 report that trunk cable A has failed. No filtered results are reported by nodes 1, 3, and 4. The master rules applied to the filtered results from node 2 and the lack of filtered results from nodes 1, 3 and 4 cause the master to conclude that the receiver A on node 2 has failed.

Figure 4:
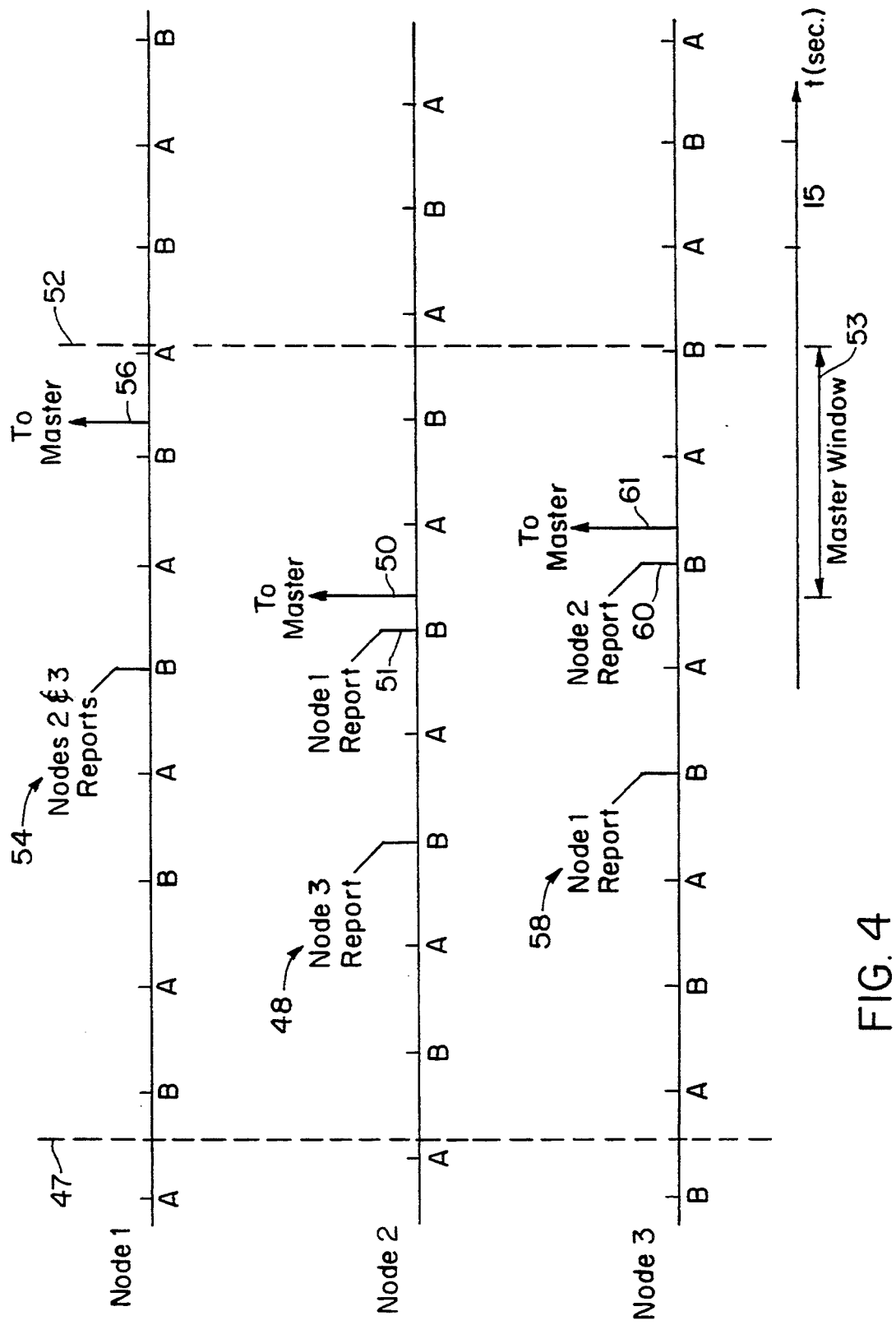
FIG. 4 is a timing diagram for the fault detection of the present invention.

FIG. 4 is a timing diagram which shows an example of a network having three nodes 12 on the token bus 18. The diagram shows the timing involved in detecting and reporting a network fault, in this case the failure of the A cable. As shown, each of the nodes alternately transmits an A and a B agent heartbeat on the network every fifteen seconds. The agent heartbeats shown are skewed to illustrate the worst case fault detection time on the network. That is, as node 1 is transmitting an A agent heartbeat, node 3 is transmitting a B agent heartbeat after a very small delay.

The time at which the failure occurs is indicated by a vertical dashed line 47 shown at the left side of the diagram. After the cable fails, each of the nodes continues operating normally, transmitting the periodic agent heartbeats on the network. When two consecutive agent heartbeats on a single cable are missed, the communications subsystem 30 reports the error to its agent processor 40. As previously noted, the CS 30 reports errors on one cable at the same time it is transmitting its own agent heartbeat on the other cable. That is, the CS 30 informs its agent processor 40 of cable A failure at the same time it transmits its own B agent heartbeat on the network. Thus, as can be seen from FIG. 4, since the failure is on cable A, all of the reports are made by CSs simultaneously with the transmission of B agent heartbeats.

As indicated at 48, the first fault report is made by the node 2 CS to its agent processor 40. Two consecutive missed A agent heartbeats are detected from node 3. When the node 2 channel B agent heartbeat is transmitted, the node 2 CS reports the node 3 fault to its agent processor 40. When this report is made, the node 2 agent processor 40 begins timing its 35-second agent window at 48. During the next 35 seconds, the node 2 agent processor 40 waits for further fault reports from its CS. Shown at 51, the node 2 CS reports two consecutive missed A agent heartbeats of node 1 to the agent processor 40. The two failure reports, namely, the node 3 report and the node 1 report, are collected and the agent rules are applied to them. At the end of the agent window indicated as 50, filtered results are transmitted to the master by the node 2 agent.

This first agent report 50 also starts the timer for the 36-second master window indicated by 53. During this window 53, the master collects agent reports. At the end of the window 53, the master rules are applied to the agent reports and a master failure report is generated. The master window 53 ends at the vertical dashed line 52. At this point, the master makes its failure report.

Nodes 1 and 3 also report the cable failure to the master. As indicated at 54, the node 1 CS reports missing consecutive agent heartbeats on nodes 2 and 3 to its agent processor 40. This starts the 35-second node i agent window running. At the end of the window, indicated at 56, node 1 makes an agent report to the master node.

As indicated at 58, the node 3 CS reports two consecutive missing agent heartbeats from node 1. This report starts the 35-second agent window for node 3 running. During the agent window, indicated at 60, the node 3 CS reports two consecutive missed agent heartbeats on node 2. At the end of the window, indicated as 61, the agent rules are applied to the node 1 and node 2 failure reports, and an agent report is made to the master node.

Thus, when the master window 53 closes at 52, the master has received three reports from the agent nodes. The master rules are applied to the agent node reports, and a master failure report is generated.

As mentioned above, the skewed transmission of node 1's A agent heartbeat while node 3 transmits its B agent heartbeat after a small delay sets up a worst-case scenario for fault detection in the network. As can be seen from the timing diagram, a maximum of two minutes is required between the time of the cable failure and the time the master failure report is made. In the general case, the reporting time will be less.

In addition to detecting network faults, the master also initiates a recovery action on the network by commanding the individual agents to take appropriate corrective steps. The master transmits a command to each agent to instruct it to carry out the action necessary in the circumstances. The command can be contained within a periodic master heartbeat signal transmitted by the master to the agents. The signal will be described below in further detail.

The appropriate recovery measures to be taken are determined by the failure on the network. Table VIII shows the recovery action performed by an agent module in response to specific failure reports generated by the master.

When an agent receives a report that either a trunk cable A or drop cable A has failed, it first checks to see if cable B has already been reported as failed. If cable B is bad, the CS 30 of the agent is informed that both cables are suspect. Failure reports regarding the cables from the CS 30 are disabled, and the CS 30 is instructed to continue operating as if conditions were normal. If cable B is not bad, cable A is disabled and the CS 30 is instructed to send both A and B agent heartbeats on cable B. The recovery action is the same if a channel B trunk cable or drop cable is reported failed. The roles of cables A and B are reversed.

When receiver A of a node is reported as failed, one of two recovery actions is performed, based on whether the node is a dual fault-tolerant module or a single module. In a fault-tolerant module, the CS 30 is commanded to run its own diagnostics for the receiver. If the receiver is faulty, and the B receiver has already been disabled, it is assumed that both receivers are suspect. Both receivers are turned on and continue to operate.

Failure reports from the CS regarding the receiver are disabled. If receiver B has not already been turned off, then receiver A is turned off and failure reports regarding receiver A are disabled.

For a single module, if receiver B has already been turned off, it is assumed that both receivers are suspect. Once again both receivers are enabled and continue operating. Failure reports from the CS 30 are disabled, and the agent will stop generating filtered results regarding the receiver failures. If receiver B has not already been turned off, receiver A will be turned off, and failure reports from the CS 30 regarding receiver A will be disabled. The recovery action is the same for a receiver B failure report with the roles of receiver A and receiver B reversed.

When the A transmitter of a node is reported failed, the recovery once again depends upon whether the module is fault tolerant or a single module. In a fault tolerant module, the CS 30 is commanded to perform its own diagnostics. If the A transmitter is bad and the B transmitter has already been disabled, then both transmitters are turned on and allowed to continue operating as under normal conditions. If the B transmitter has not already failed, the transmitter A is turned off. Both heartbeats are then transmitted on channel B. In a single module, if the channel B transmitter has already failed, both transmitters are turned on and allowed to continue operating. If the B transmitter has not already failed, the A transmitter is turned off and both the channel A and channel B agent heartbeats are transmitted by the channel B transmitter. When the B transmitter fails, the recovery is the same with the roles of the A and B transmitters reversed.

When noisy cables are detected, the agent on the token bus which detected the noisy cable initiates an immediate recovery action and then informs the master about the condition. The first noisy cable report starts the master window running. During the window, the master collects all reports from other agents and then concludes whether the cable is noisy. If the master decides that the cable is not noisy, it commands the recovered agents to return to their status before the noisy cable detection. This immediate recovery by the agents allows them to receive data they could miss if they waited for the master to command a recovery action.

If the A cable is reported as noisy, the agent making the report first checks to see if cable B has also been reported noisy and has been disabled. If so, both cables are enabled and operation continues as if conditions were normal. If cable B has not been disabled, cable A is disabled, and transmissions are limited to cable B. If cable B is reported as noisy, the same recovery action is taken, with the roles of cables A and B reversed. If both cables A and B are reported as noisy, both cables are enabled and operation continues as if conditions were normal.

When a cable is reported as being intermittent, no recovery action is commanded. An error message is displayed or printed for the user.

TABLE VIII

| FAILURE REPORT GENERATED | RECOVERY ACTION PERFORMED |
| --- | --- |
| Trunk or Drop Cable A Failure | If Cable B already bad, <br> - inform CS both cables suspect <br> - disable failure reports from CS |

TABLE VIII-continued

| FAILURE REPORT GENERATED | RECOVERY ACTION PERFORMED |
|---|---|
| | - keep running as normal Else, <br> - disable Cable A <br> - Send both HB on Cable B |
| Trunk or Drop Cable B Failure | same as A failure with roles of A and B reversed |
| Node X Receiver A Failure | 1. Fault-tolerant Module <br> - CS commanded to run diagnostics <br> - If RX B is off, <br> - assume both are suspect <br> - turn both on and continue operating <br> - disable failure reports from CS <br> - Else, <br> - turn off RX A <br> - disable A failure reports <br> 2. Single module <br> - If RX B is off, <br> - assume both are suspect <br> - turn both on and continue operating <br> - disable failure reports from CS <br> - generate no more filtered results <br> - Else, <br> - turn off RX A <br> - disable A failure reports |
| Node X Receiver B Failure | same as RX A failure with roles of A and B reversed |
| Node X Transmitter A Failure | 1. Fault-tolerant module <br> - CS commanded to run diagnostics <br> - If TX B already failed, <br> - turn both TX on <br> - Else, <br> - turn TX A off <br> - transmit both HB on TX B <br> 2. Single Module <br> - If TX B already failed, <br> - turn both TX on <br> - Else, <br> - turn TX A off <br> - transmit both HB on TX B |
| Node X Transmitter B Failure | same as TX B failure with roles of A and B reversed |
| Noisy Cable A | If B already noisy and turned off, <br> - enable both cables and operate as normal <br> - Else, <br> transmit on B cable only |
| Noisy Cable B | same as Noisy Cable A with roles of A and B reversed |
| Noisy Cables A and B | Enable both cables and operate as normal |
| Intermittent Cable A or B | No recovery - message printed |

During normal operation of the network, the master transmits a master heartbeat signal on the token bus periodically. In a preferred embodiment, the master heartbeat signal is transmitted every 30 seconds. All of the agent modules receive the master heartbeat signal. If two successive master heartbeats are missed by an agent, a master nomination algorithm to be described below is invoked to select a new master. Thus, it is assured that a master is always present on the token bus.

Figure 5:
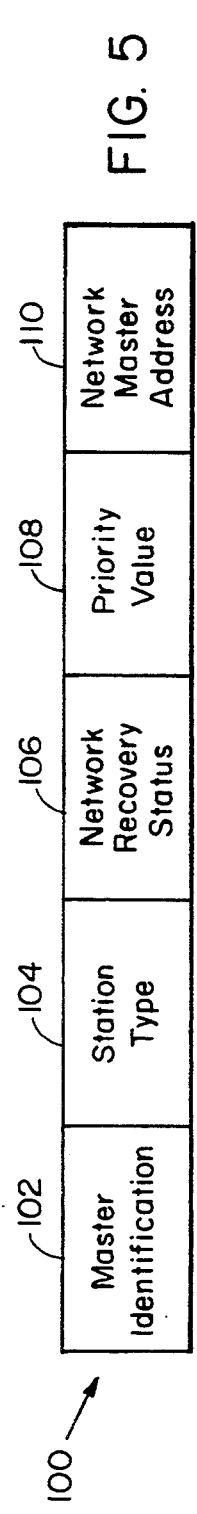
FIG. 5 schematically depicts the data fields of a master heartbeat signal.

FIG. 5 schematically depicts the data fields of the master heartbeat signal 100. The signal comprises five data fields. The first field is a master identification field 102 which identifies the type of master module transmitting the master heartbeat signal. For purposes of this application, the master is a token bus master module.

The second field is the station type field 104. For purposes of this application, the station type is LAN interface type.

The third data field is the network recovery status field 106. This field indicates the current recovery configuration of the token bus. If a previous network fault has been detected and recovered from, this field indicates the recovery that was commanded. For example, if the network trunk cable A has failed, this field will so indicate. When a new LAN interface module is connected to the network, it will read the master heartbeat. When it decodes this recovery status field 106, it knows that the A trunk cable has failed. Consequently, it will take its own local recovery action. In this case, it will periodically transmit both of its agent heartbeat messages on the B cable.

The next field in the master heartbeat 100 is the priority value field 108. This holds the priority value assigned to the module by the identity insert block 41. This field is decoded and compared to the priority value fields 108 of other master heartbeat messages during the master nomination algorithm.

The fifth field is the network address field 110. This provides a detailed physical network address for the master module. This allows the agent nodes on the network to specifically identify the master node.

Each LI module 12 on the token bus performs as an agent module. In addition, each LI module is also capable of serving as a master module. The master module on the bus 18 is selected from among the LI modules. This is accomplished by the master nomination algorithm.

As mentioned above, each of the LI modules 12 has a circuit 41 which uniquely identifies the module. The circuit is called an "Identity Insert Block for Electronic Modules" and is described in U.S. Pat. No. 5,006,842 to Tobol, the disclosure of which is incorporated herein by reference. The identity insert block 41 (see FIG. 1) is a multiple-pin circuit having a distinct electrically readable pin pattern and a corresponding visually readable label. The identity block 41 assigns a unique priority value to each LI module. The priority value can be read from the circuit 41 to identify the LI module.

When the master nomination algorithm is implemented, the priority value of each of the identity insert blocks 41 is read. Each module then transmits its priority value onto the token bus 18 as one data field in its master heartbeat signal. All of the modules receive the master heartbeat signals transmitted on the bus. The priority values are compared and the module having the highest priority value becomes the master.

The master nomination algorithm is invoked when power is first applied to the network. All of the LI modules 12 come up at the same time, and it is necessary to select a master module. Each LI module 12 coming up transmits a master heartbeat that contains the station type, the node's priority value and its network address. The priority values are compared, and the LI module 12 with the highest priority is nominated to serve as the master. The nominated node then broadcasts that it is the new master of the token bus 18.

During operation, if a new module 12 is added to the network, the master nomination algorithm is not invoked again, even if the new module has a higher priority value than the present master. The network continues to operate with the present master.

The master nomination algorithm described above provides the network of the invention with certain advantages. These include automatic fault isolation of the LAN and collection of status information by a central coordinator. The central coordinator is maintained automatically. Also, for future development, transition to a higher level LAN when a sitewide LAN interface (SLI) is introduced is facilitated.

The token bus nodes will be periodically informed by the master of its identification in the master heartbeat signal. In this way the token bus nodes are kept informed of the current status of the master and of changes as they occur. If there are two successive master heartbeat signals that are lost from the master, the master nomination algorithm is invoked. The master heartbeat for the token bus 18 will remain on the token bus 18 and not be allowed to go on any other buses in the system.

Figure 7:
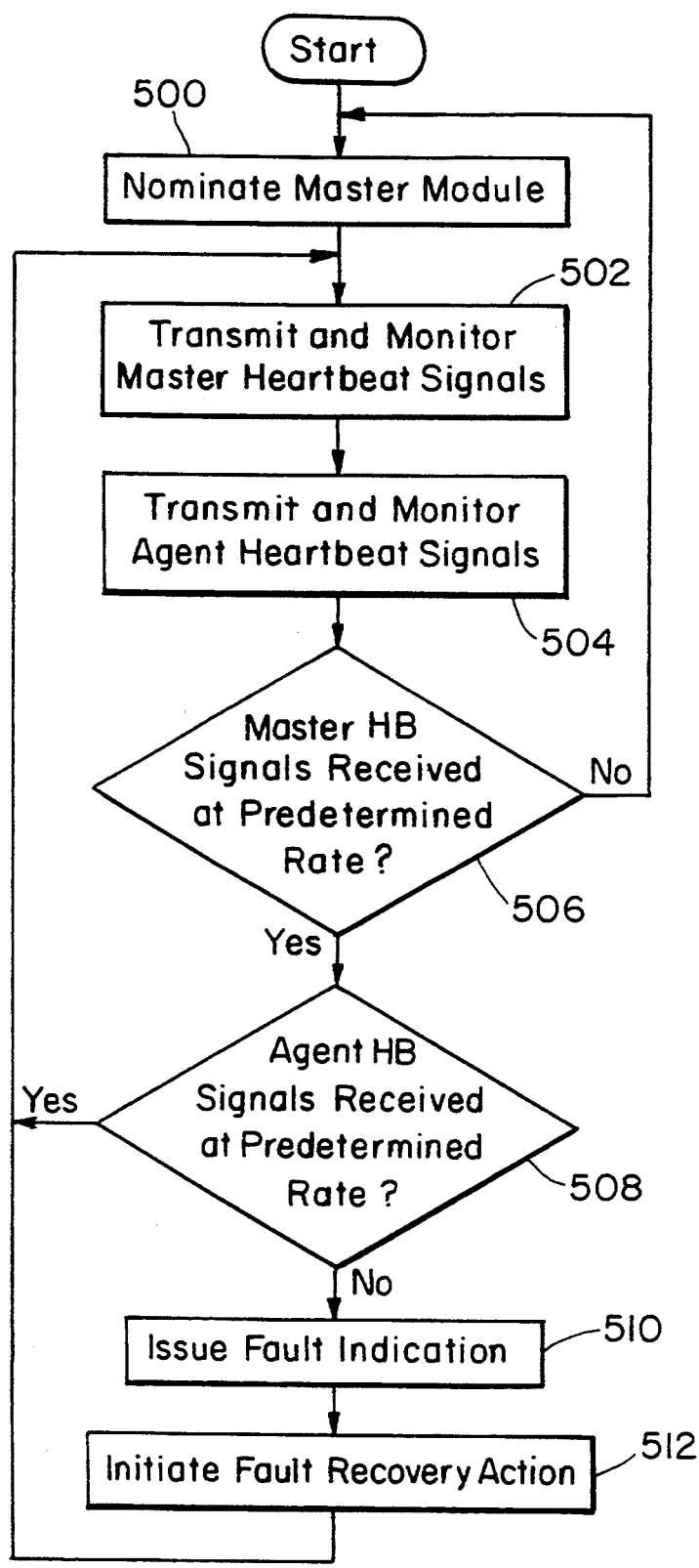
FIG. 7 is a flow chart showing the logical flow of an embodiment of the present invention.

FIG. 7 is a top-level flow chart showing the logical flow for a preferred embodiment of the invention. As described in detail above, when the network begins operating, it nominates one of the modules on the bus to serve as a master module as shown in step 500. Next, the master module begins transmitting periodic master heartbeat signals at step 502, and each of the agent modules begins transmitting periodic agent heartbeat signals at step 504. Both the master heartbeat signals and the agent heartbeat signals are transmitted at predetermined periodic rates, and the transmission of the heartbeat signals is monitored.

Step 506 indicates that the master heartbeat signals are monitored to ensure that they are received at the proper predetermined periodic rate as described above. If not, a new master module is nominated at step 500 and the flow continues to steps 502 and 504 in the illustrated loop.

If the master heartbeat signals continue to be received at the proper rate, the flow continues without nominating a new master. At step 508, the agent heartbeat signals are monitored to ensure that they are received at the proper rate from each of the agents. If not, as described in detail above, a fault indication is issued at step 510, and a fault recovery action is initiated at step 512. The process then continues to transmit and monitor master and agent heartbeat signals to discover further faults. At step 508, if the agent heartbeat signals continue to be received at the proper rate, each agent and the master continue to transmit agent and master heartbeat signals, respectively, to monitor performance of the network.

Figure 6:
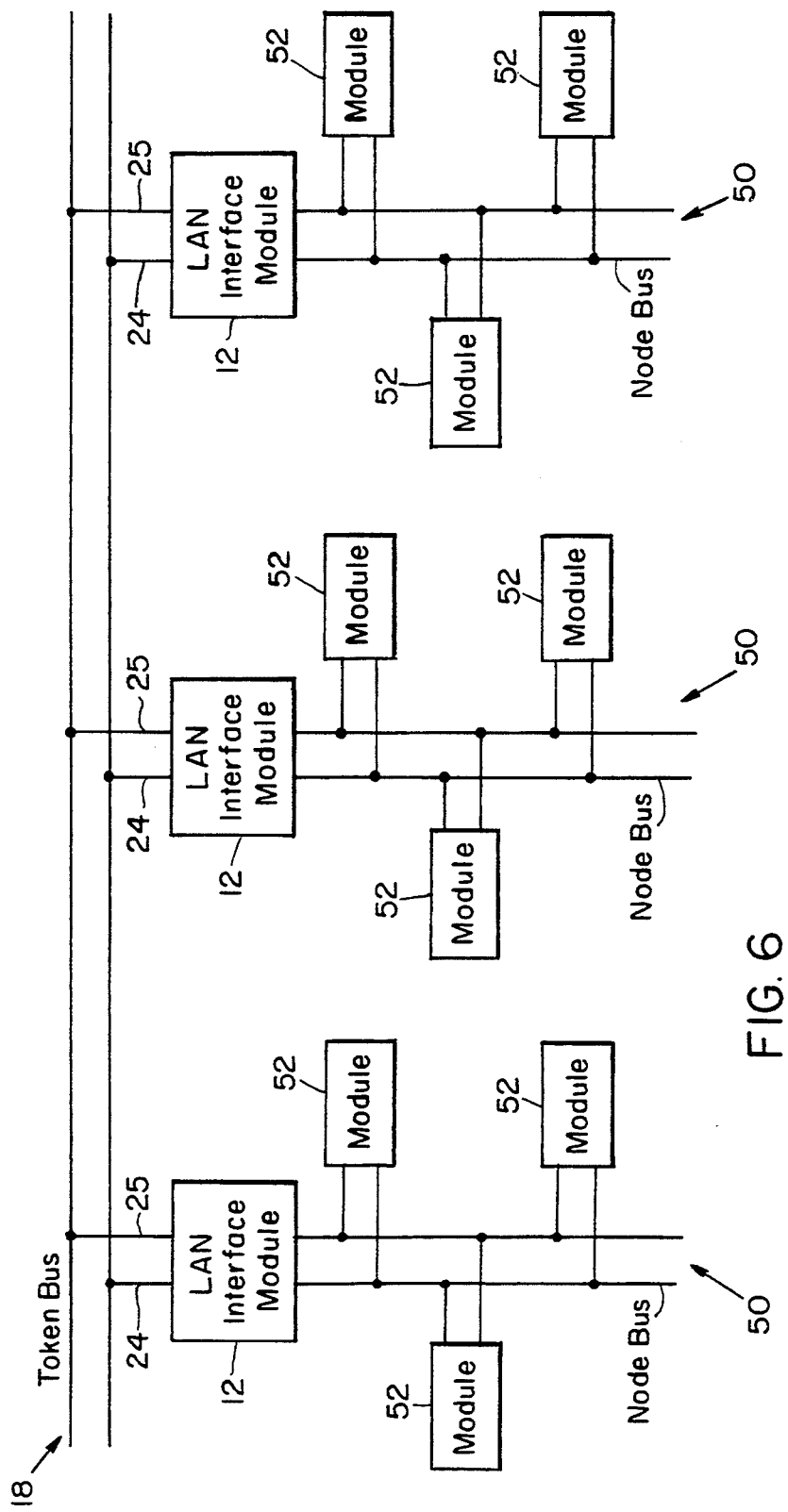
FIG. 6 is a schematic block diagram of a process control system incorporating the network of the present invention.

The network of the present invention can be incorporated into a larger system. FIG. 6 schematically depicts such a system. Three LI modules 12 are shown connected to the token bus 18 by drop cables 24 and 25.

In the system of FIG. 6, each of the LI modules 12 is also connected to a node bus 50. The node bus 50 interconnects various modules indicated generally as 52. These modules 52 are specific to the application of the system. For example, the system may be used to control a manufacturing or process plant. In that case, these modules 52 may be application processors, display processors, control processors, or various types of electrical, mechanical or chemical control devices used in the process. In one embodiment, the node bus 50 is an Ethernet bus compatible with IEEE standard 802.3.

Each individual node bus 50 has its own master node to which other nodes on the nodebus report failures. If the nodebus master cannot resolve a fault, it can report it to the LI module 12 which interfaces the nodebus 50 to the token bus 18. The LI module 12 can then resolve the failure by reporting to the token bus master. Each LI module 12 can also serve as the master module for its corresponding node bus 50.

Each LI module 12 is required to carry out numerous tasks to implement the fault detection and recovery of the present invention. Each of these tasks is controlled by software programs stored in module memory 42 and executed by processor 40. Programming code for the tasks is included as appendices to this description. It should be noted that during development of the code, changes were made without corresponding changes being made to the comments. Where a conflict exists between the code and the comments, the code governs.

One of the tasks is entitled Agent Problem Detection Task (APDT). This task receives error reports from the agent communications subsystem 30. It applies the agent rules to the error reports to generate filtered results. The filtered results are then transmitted to another task. Programming code written in the C programming language for the APDT task is included as Appendix A of this specification.

Another task entitled Collect Filtered Results and Deduce Failures (CFRDF) receives the filtered results from the APDT task. It applies the master rules to the filtered results to generate a master failure report. The task informs the user of network faults, it logs the network faults, and it commands recovery actions. Programming code for this task is included as Appendix B of this specification.

A task entitled Manage Token Bus Master (MTBM) handles user requests for service from the master. It also handles the timing and generation of master heartbeats and controls the master windows. Programming code for this task is included as Appendix C of this specification.

The task entitled Node Bus Isolation Task (NBIT) receives reports of unresolved situations from the node bus and generates action requests to the token bus master. Programming code for this task is included as Appendix D of this specification.

While this invention has been particularly shown and described with references to preferred embodiments thereof, it will be understood by those skilled in the art that various changes in form and details may be made therein without departing from the spirit and scope of the invention as defined by the appended claims.

Appendix A

Agent Problem Detection Task (APDT)

```
/****************************************************************
*                                                                *
* (C)Copyright by Foxboro Company  1985                          *
*                                                                *
* All rights reserved:  Foxboro Company  1985                    *
*                                                                *
*****************************************************************
*                                                                *
* FILE ID           : apdt.c                                     *
*                                                                *
* PART NUMBER       :                                            *
*                                                                *
* FUNCTION          : This module contains the APDT task main and all the *
*                     related functions. This task is responsible for     *
*                     interfacing to the local comms subsystem and        *
*                     analyzing the reported errors. It generates the     *
*                     FILTERED RESULTS for the Token Bus master.          *
*                                                                *
* FUNCTIONS CONTAINED : apdt_main()                              *
*                       apdt_init()                              *
*                       collect_data()                           *
*                       place_events()                           *
*                       remove_entry()                           *
*                       hb1_exp_func()                           *
*                       hb2_exp_func()                           *
*                       noisy_cab_func()                         *
*                       send_to_master()                         *
*                       adjust_apdt_list()                       *
*                       perform_local_recovery()                 *
*****************************************************************/ include <ipc.sys>
include <comex.sys>
#include <om_user.h>
#include <om_ecode.h>
#include "sm_msg.h"
#include <sman.h>
#include <sm_cfgf.h>
#include <sm_alias.h>
#include <vdef.h>
#include "nfd.h"
#include "mtbm.h"
#include "nfi_coms.h"
#include "nfi804.h"
#include "apdt.h"

VOID hb1_exp_func();
VOID hb2_exp_func() ;
VOID noisy_cab_func();
VOID collect_data();
VOID place_events();
VOID init_and_add_blk();
VOID remove_entry();
int send_to_master();
VOID adjust_apdt_list();

extern PROBLEM* get_eve_blk();
extern VOID rel_eve_blk();
/*
**    Function to convert the bit position to node.
```

```
**    Defined in the comms subsystem.
**
*/ ifdef LOGGER
extern void logger();
endif extern  int pos_to_node();

extern CURRENT_MASTERS_INFO cur_master;

/*
**    The following are defined by the local comms subsystem.
**
*/ extern unsigned long event_box;          /* Mailbox interface between
                                            the comms and the NFI
                                            subsystems.            */
extern unsigned long resource_mbx;       /* shared resource control
                                            mailbox.               */ extern unsigned long nfi_event_table[]; /* Events interface to comms */
extern unsigned long nfi_mask_table[];  /* Mask interface to comms.
                                            Defines to comms whether to
                                            report a problem to NFI or not */
extern char* mtbm_alias[];
int   tell_master = FALSE;               /* Flag used to determine if the  */
                                         /* master still needs to told     */
                                         /* about the local recovery that  */
                                         /* has been performed by this node*/
int which_cable ;                        /* local store about which cable  */
                                         /* local recovery to tell the mstr*/
                                         /* about when it becomes accessible*/
/*
**
**    mask table used to traverse each bit in a long word
**
*/ unsigned long mask[] =
{
   0x00000001, 0x00000002, 0x00000004, 0x00000008,
   0x00000010, 0x00000020, 0x00000040, 0x00000080,
   0x00000100, 0x00000200, 0x00000400, 0x00000800,
   0x00001000, 0x00002000, 0x00004000, 0x00008000,
   0x00010000, 0x00020000, 0x00040000, 0x00080000,
   0x00100000, 0x00200000, 0x00400000, 0x00800000,
   0x01000000, 0x02000000, 0x04000000, 0x08000000,
   0x10000000, 0x20000000, 0x40000000, 0x80000000
};

/*
**    Local copy of the event table
**
*/ unsigned long nfi_event_copy[6] = {0,0,0,0,0,0};

PROBLEM*  nfd_head = NULL;    /* this is where all the data about
                                 events is held              */

/*
**    The array used to fill in the matched failures. Array used to
**    determine which of the entries in the linked list to free up.
*/
```

```
PROBLEM *  apdt_array[64] =
                    {
                        0,0,0,0,0,0,0,0,
                        0,0,0,0,0,0,0,0,
                        0,0,0,0,0,0,0,0,
                        0,0,0,0,0,0,0,0,
                        0,0,0,0,0,0,0,0,
                        0,0,0,0,0,0,0,0,
                        0,0,0,0,0,0,0,0,
                        0,0,0,0,0,0,0,0
                    };
/*
**    This is the pseudo code for the Agent Problem Detection
**    task.
**
**
**
**
** - Initialize
**   register with IPC.
**
**
** - Do (forever)
**
**     process events and report them to the master.
**     -- IF data in the mailbox interface to comms Subsystem.
**            collect_data()
**
**     -- Else if (any collected events exist)
**            count down processing
**         --- delay 5 seconds
**         --- decrement the count on the first event on the linked event
**             list
**         --- IF (it is 0, it has expired )
**                deduce the failure condition
**                remove this entry from the event list.
**
**         --- FI
**      -- Else
**         --- Wait on the Mailbox for the next event reported.
**         --- collect_data()
**
**      -- FI
**
** - OD
*/

/****************************************************************
*
*  Function Name    : apdt_init()
*
*  File Name        : apdt.c
*
*  Function         : This is the initialization function for the APDT
*                     task. It tries to register and activate IPC usage.
*
*  Returned Params  : FALSE OR TRUE
*
*  Non-Resident Data : NONE
*
*  Routines Called  : cs_register() [O.S]
*                     cs_activate() [O.S]
*
****************************************************************/ int apdt_init()
{
    int ret_value = FALSE;
    /*
```

```
**  register this task for IPC use and activate it. Returns status
**  of the action.
*/
    if ((cs_register("APDT", 0, 0,CDT, 1,0)) == CALL_COMPLETE )
    {
        if((cs_activate("APDT",CDT)) == CALL_COMPLETE)
            ret_value = TRUE;
    }
    return (ret_value);

} /* apdt_init() */

/************************************************************************
*
*  Function Name    : apdt_main()
*
*  File Name        : apdt.c
*
*  Function         : This contains the main loop for the APDT task.
*
*  Returned Params  : N.A.
*
*  Non-Resident Data    : nfd_head [U]
*                         event_box[U]
*
*  Routines Called  : apdt_init()    [local]
*                     collect_data()[local]
*                     remove_entry()[local]
*                     sc_tdelay()    [O.S]
*                     sc_accept()    [O.S]
*                     sc_pend()      [O.S]
*
*
*  Exception Exits  : NONE ; if the init fails it loops forever to
*                     register.
*
************************************************************************/
apdt_main()
{
    long * msg ;
    int error = 0;

while ((apdt_init()) != TRUE)
    {
        sc_tdelay( (long) SECONDS_5);
    } for (;;)
    {
      /*
      **  check to see if there is anyting in the COMMS interface
      **  mailbox.
      */
      msg = (long*) sc_accept(&event_box,&error) ;
      if (error == RET_OK)
      {
         /*
         **  collect the data presented by comms
         */ collect_data(msg);                 /* collect the reported event
                                               data                    */
      }
      /*
       *                                                                *
       *                                                                *
       *    If any reports exist, delay the task 5 seconds to perform   *
       *    the count down in the window. If the window expires, deduce *
       *    the failure and remove the expired entry from the list.     *
       *                                                                *
       *                                                                *
       *                                                                */
```

```c
        else if (nfd_head != NULL)
        {
            sc_tdelay((long)SECONDS_5);
        /*                                                              *
         *                                                              *
         *     If the count of ticks to go becomes 0, then that          *
         *     entry's window has expired.                               *
         *     Thus processing must take place to determine if           *
         *     the failure is valid. This is done by invoking the        *
         *     function pointed to by function entry in the first        *
         *     block.                                                    *
         *                                                              */ if ( --nfd_head->ticks_to_go <= 0)
            {
                while ((nfd_head != NULL) && (nfd_head->ticks_to_go <= 0))
                {
                    (*nfd_head->func)();
                    remove_entry(nfd_head);

}
            }
        }
        else /* there is nothing to do as no events have been reported */
        {
            msg = (long*) sc_pend(&event_box, (long)0, &error) ;
            collect_data(msg);              /* collect the reported event*/
                                            /* data                      */
        } /* if (error) */

} /* for(;;) */

} /* apdt_main() */

/***********************************************************************
 *
 *  Function Name    : collect_data()
 *
 *  File Name        : apdt.c
 *
 *  Function         :
 *                     This function is responsible for the collection
 *                     of the data from the comms subsystem. It also
 *                     places the data in the correct location for in
 *                     the event list, dependent on the window for the
 *                     reported event.
 *
 *  design:
 *
 *
 *          collect_data()
 *
 *            - get event semaphore.
 *
 *            - copy events to local data.
 *
 *            - release the event semaphore.
 *
 *            - place the collected events in the list with the timeout
 *              conditions.
 *
 *
 *
 *
 *  Returned Params  : NONE
 *
 *  Non-Resident Data    : resource_mbx [C]
 *                         nfi_event_copy[]
```

```
*   Routines Called   : sc_pend()      O.S.
*                       sc_post()      O.S.
*                       byte_copy()    O.S.
*                       place_events() [local]
*
*   Exception Exits   : NONE
*
***************************************************************/

VOID collect_data(msg)
long * msg;              /* pointer to 6 long words           */

{
   int err = 0;

/*     sc_pend(&resource_mbx, (long)0, &err);   */

/* now we have the resource control MBX so the events can be copied */ byte_copy(msg, nfi_event_copy, SIZE_OF_EVENT_TABLE); /* copy 6 long words
*/ byte_fill(msg, 0, SIZE_OF_EVENT_TABLE );  /* clear the reported failure */

/*                                                    *
    *    release the mailbox.                            *
    */
   sc_post(&resource_mbx,(long) 0x000F ,&err);

/*                                                    *
    *    Now place the events in the timeout list for    *
    *    processing as the event windows expire          *
    *                                                    */ place_events();

} /* collect_data() */

/*****************************************************************
*
*   Function Name     : place_events()
*
*   File Name         : apdt.c
*
*   Function          : The function determines what events are reported
*                       by the comms subsystem, gets and sets up a free
*                       block and calls a function to place the events in
*                       the events list.
*
*
*   Returned Params   : NONE
*
*   Non-Resident Data : nfi_event_copy[]
*                       mask[]
*
*   Routines Called   : pos_to_node()     [ defined in the comms subsystem]
*                       init_and_add_blk() [local]
*
*   Exception Exits   : NONE
*
***************************************************************/

VOID place_events()
{
    PROBLEM * blk_ptr;
    unsigned long temp = 0;
    int i ;

if (nfi_event_copy[NOISY_A_OFFSET] & nfi_mask_table[NOISY_A_OFFSET] )
```

```c
{
    /* perform the local recovery and try and inform the master */ perform_local_recovery(CABLE_A);
    if ((send_to_master(LOCAL_CBL_REC, CABLE_A,
                NODE_ASCII2INT(&station_psap_address.nsap_address[NODE_ID])))
    < 0)
        {
            tell_master = TRUE;
            which_cable = CABLE_A;
        }
    else
        nfi_mask_table[NOISY_A_OFFSET] = 0;   /* disable all further reps*/

/*      init_and_add_blk(NOISY_CAB_COUNT, 0, CABLE_A, NOISY_CBL,   */
/*                       noisy_cab_func);                           */

} if ( nfi_event_copy[NOISY_B_OFFSET] & nfi_mask_table[NOISY_B_OFFSET] )
    {
        perform_local_recovery(CABLE_B);
        if ((send_to_master(LOCAL_CBL_REC, CABLE_B,
                NODE_ASCII2INT(&station_psap_address.nsap_address[NODE_ID])))
    < 0)
        {
            tell_master = TRUE;
            which_cable = CABLE_B;
        }
        else
            nfi_mask_table[NOISY_B_OFFSET] = 0;   /* disable all further reps*/

/*      init_and_add_blk(NOISY_CAB_COUNT, 0, CABLE_B, NOISY_CBL,   */
/*                       noisy_cab_func);                           */
    }

/*
     *  Now work through the list for the for all the other
     *  failures. The 4 long word entries define reported
     *  failures conditions from a possible of 32 nodes.
     *  For each event a block is updated and placed in an
     *  event list.
     *
     */ for (i = 0; i< 32 ; i++)
    {
        if (( temp = nfi_event_copy[HB1_A_OFFSET] & mask[i]))
        {
            init_and_add_blk(HB_1_COUNT, pos_to_node(temp), CABLE_A,
                         HB_1_LOSS, hb1_exp_func);
        }
        if (( temp = nfi_event_copy[HB1_B_OFFSET] & mask[i]))
        {
            init_and_add_blk(HB_1_COUNT, pos_to_node(temp), CABLE_B,
                         HB_1_LOSS, hb1_exp_func);
        }
        if (( temp = nfi_event_copy[HB2_A_OFFSET] & mask[i]))
        {
            init_and_add_blk(HB_2_COUNT, pos_to_node(temp), CABLE_A,
                         HB_2_LOSS, hb2_exp_func);
        }
        if (( temp = nfi_event_copy[HB2_B_OFFSET] & mask[i]))
        {
            init_and_add_blk(HB_2_COUNT, pos_to_node(temp), CABLE_B,
                         HB_2_LOSS, hb2_exp_func);
        }
    }
} /* place_events() */
```

```
/****************************************************************
*
*  Function Name     : init_and_add_blk()
*
*  File Name         : apdt.c
*
*  Function          : The function gets a block from free pool and
*                      updates it with the data provided. This is called
*                      when any event needs to be queued in the event list.
*                      If no free blocks are available it drops the
request.
*                      However, this should not happen as pool allocations
*                      are calculated so that atleast one is avaliable.
*
*  Returned Params   : NONE
*
*  Non-Resident Data : NONE
*
*  Routines Called   : add_to_eve_list() [util_804.c]
*                      get_eve_blk()     [nfi_mem.c ]
*
*  Exception Exits   : NONE
*
****************************************************************/
VOID init_and_add_blk(count,node, cable, failure ,func)
int count;              /* count of ticks to go  to set up */
int node;               /* node number passed, 0 passed for
                           noisy cable.                    */
int cable;              /* cable affected.                 */
int failure;            /* type of failure reported        */
int (*func)();          /* function address to setup in block*/
{
    PROBLEM* blk_ptr ;  /* pointer to problem data  */

/*
    ** get a block from free pool and setup the data in it.
    ** Add the updated block to the events list.
    */ if ((blk_ptr = get_eve_blk()) != NULL)
    { ifdef LOGGER
        logger( 0x000A, node,cable, failure,count);
#endif
        blk_ptr->ticks_to_go = count ;
        blk_ptr->node_no = node;
        blk_ptr->cable = cable;
        blk_ptr->failure_type = failure;
        blk_ptr->func = func ;
        add_to_eve_list(blk_ptr,&nfd_head);
    }

} /* init_and_add_blk() */
/****************************************************************
*
*  Function Name     : remove_entry()
*
*  File Name         : apdt.c
*
*  Function          : This function takes the block provided and puts
*                      it in the free pool. It adjusts the head
*                      entry accordingly. Since the block being released
*                      is always the first one in the list( as it's timeout
*                      count is 0), this function makes that assumption.
*
*
*
*  Returned Params   : NONE
```

```
*
*  Non-Resident Data    : NONE
*
*  Routines Called      : rel_eve_blk() [nfi_mem.c]
*
*  Exception Exits      : NONE
*
****************************************************************/
VOID remove_entry(ptr)
PROBLEM   * ptr;
{
   nfd_head = ptr->next;
   rel_eve_blk(ptr);              /* put the released block back to
                                      free pool.                   */
} /* remove_entry() */
/****************************************************************
*
*  Function Name  : hb1_exp_func()
*
*  File Name      : apdt.c
*
*  Function       : This function is invoked when the expired entry
*                     at the head of the problem list is the 1hb loss
*                     report. By searching through the queued events
*                     it determines what problem to report to the master.
*
*  design:
*
*     ( 1 HB condition timed out )
*
*     validate 1 HB missing condtion
*
*     - set window for this failure to 108, 5 second timeouts( 9 minutes)
*
*     - DO ( for all entries in the WINDOW )
*     --    find next entry
*     --    check in range and read data.
*     ---       add the timeout value to the running total
*               if( > 108 )
*                  set exit condition for the DO loop.
*               else if (same condition i.e. 1 HB loss on same cable as the expired
entry)
*                  compare Node number with the expired entry
*                  if (different)
*                     set more than 1 node reported condition.
*                  FI
*
*                  update the total count of reports and update the array of
*                  matched entries.
*               else
*                  do nothing
*
*     ---    FI
*     - OD
*
*     - CONCLUDE ON FAILURE
*
*     - if (all reports are from one node )
*          if ( total count >= 6)
*             send to master report " INTERMITTENT TX ( A or B ) on Node X "
*          FI
*     - else if ( reports are from more than 1 node )
*          if (total count /(total nodes -1)  >= 6)
*             send to master report "noisy cable X"
*          FI
*
*     - FI
*
*  Returned Params : NONE
*
```

```
*  Non-Resident Data   : nfi_active_count(U)
*
*  Routines Called     : send_to_master() [local]
*
*  Exception Exits     : NONE
*
******************************************************************/

VOID hb1_exp_func()
{
    int count = 0;
    int x = 0;                       /* index into array of matched failures*/
    int window_size = HB_1_COUNT;    /* set to the window size */
    PROBLEM*  this = nfd_head ;
    int failure_count = 0;           /* initialised to the timed out entry */
    BOOLEAN many_nodes_rep = FALSE;  /* to indicate that many nodes reported*/ while ((this != NULL) && ((count += this->ticks_to_go) <= window_size))
    {
        if ((this->failure_type == nfd_head->failure_type) &&
            (this->cable == nfd_head->cable) )
        {
            if (nfd_head->node_no != this->node_no)
            {
                many_nodes_rep = TRUE;
            }
            failure_count++;
            if (x < 32)
            {
                apdt_array[x++] = this;
            }
        }
        if (this->next == NULL)
            break;
        this = this->next;

}
    /*                                                                *
     *  If all reports are from one node                              *
     *  then check if it is valid. If so tell the master              *
     *  about the failure.                                            *
     *                                                                *
     *                                                                */ if (many_nodes_rep == FALSE)
    {
        if (failure_count >= VALID_NOISY_COUNT)
        {
ifdef LOGGER
            logger(0x000D, INTMITTENT_TX, nfd_head->cable, nfd_head->node_no);
#endif
            send_to_master(INTMITTENT_TX, nfd_head->cable, nfd_head->node_no);
            adjust_apdt_list(apdt_array, failure_count);
        }
    }

/*                                                                *
     *    If reports are from more than 1 node                        *
     *                                                                */ else if (failure_count/(nfi_active_count) >= VALID_NOISY_COUNT)
    {
ifdef LOGGER
        logger(0x000E, NOISY_CABLE, nfd_head->cable, -1);
#endif
        send_to_master(NOISY_CABLE, nfd_head->cable, -1);
        adjust_apdt_list(apdt_array, failure_count);
    }
```

} /* hb1_exp_func() */

/******************************************************************
*
* Function Name    : hb2_exp_func()
*
* File Name        : apdt.c
*
* Function         : This function gets invoked when the expired
*                    entry on the reported event list is of 2HB lost.
*                    By searching through the queued events
*                    it determines what problem to report to the master.
* design:
*
*   validate 2 hb failures.
*
*   - Find the last entry in this faults window.
*   - count all the failures of this type for the cable indicated in the
*       expired event ( at the head of the queue ).
*   - if (one failure report detected)
*       send TX failure report for the NODE in the head entry to the master.
*
*   - else if ( more than one report )
*       send CABLE FAILURE of cable indicated in the expired report.
*   - else
*       do nothing.
*
*
*
* Returned Params  : NONE
*
* Non-Resident Data : nfd_head(U)
*
* Routines Called  : send_to_master [local]
*
* Exception Exits  : NONE
*
******************************************************************/

```
VOID hb2_exp_func()
{
    int count = 0;
    int x = 0;                          /* index into array of matched failures*/
    int window_size = HB_2_COUNT;       /* set to the window size */
    PROBLEM* this = nfd_head ;
    int failure_count = 0;              /* initialised to the timed out entry */ while ((this != NULL) && ((count += this->ticks_to_go) <= window_size))
    {
        if ((this->failure_type == nfd_head->failure_type) &&
            (this->cable == nfd_head->cable) )
        {
            failure_count++;
            if ( x < 32 )
            {
                apdt_array[x++] = this;
            }
        }
        if (this->next == NULL)
            break;
        this = this->next;

} if (failure_count == 1)
    {
        send_to_master(TX_FAILURE, nfd_head->cable, nfd_head->node_no);
#ifdef LOGGER
```

```
            logger(0x000B, TX_FAILURE, nfd_head->cable, nfd_head->node_no);
#endif
        }
        else if (failure_count > 1)
        {
            send_to_master(CABLE_FAILURE, nfd_head->cable, -1 );
#ifdef LOGGER
            logger(0x000C, CABLE_FAILURE, nfd_head->cable, -1);
endif adjust_apdt_list(apdt_array,failure_count);
        }

} /* hb2_exp_func() */

/****************************************************************
*
*   Function Name    : noisy_cab_func()
*
*   File Name        : apdt.c
*
*   Function         : This function is called when the head entry
*                      just timed out is of the noisy cable type.
*                      The noisy cable condition is validated and then a
*                      is reported to the master of the Token bus.
*
*   design:
*
*      validate noisy cable condition.
*
*      - determine number of this cable failures ( the one in the expired entry)
*            reported.
*
*      - IF ( 2 or more reports of noisy cable)
*            send to master cable X noisy.
*
*      - ELSE  do nothing

*   Returned Params  : NONE

*   Non-Resident Data : nfd_head(U)

*   Routines Called  : send_to_master() [local]

*   Exception Exits, : NONE

****************************************************************/

VOID noisy_cab_func()
{
    int count = 0;
    int x = 0;                          /* index into array of matched failures*/
    int window_size = NOISY_CAB_COUNT;  /* set to the window size */
    PROBLEM* this = nfd_head ;          /* points to the next block to check  */
    int failure_count = 0;              /* initialised to the timed out entry */

/*
    ** if there are more than one entries in the event list,
    ** check the entries for the type of the expired failure for
    ** the window time period for that type of the failure.
    */ while ((this != NULL) && ((count += this->ticks_to_go) <= window_size))
        {
            if ((this->failure_type == nfd_head->failure_type) &&
```

```
                (this->cable == nfd_head->cable) )
            {
                failure_count++;
                if ( x < 32 )
                {
                    apdt_array[x++] = this;
                }
            }
            if (this->next == NULL)
                break;
            this = this->next;

} if (failure_count >= 2)
        {
            send_to_master(NOISY_CABLE, nfd_head->cable, -1);
            adjust_apdt_list(apdt_array,failure_count);
        }

} /* noisy_cab_func() */

/******************************************************************
*
*   Function Name    : send_to_master()
*
*   File Name        : apdt.c
*
*   Function         : This function sends the master the failure report
*                      for this task. It is passed the node number
*                      where the node number makes sense otherwise, it is
*                      passed an invalid number (-1).
*
*
*   Returned Params  : return from send_msg
*
*   Non-Resident Data    : cur_master (U)
*                          station_psap_address(U)
*
*   Routines Called  : send_msg()     [util_804.c]
*                      macro NODE_ASCII2INT [comms header file]
*
*   Exception Exits  : NONE
*
******************************************************************/
int send_to_master(failure,cable,node)
int     failure;         /* Failure condition                      */
int     cable;           /* Cable identifier                       */
int     node;            /* either a valid node number is passed or
                            -1 when node number is irrelevent      */
{

/*
    **      setup the message to send to the master
    */

FILT_RSLT_REPORT  msg;

msg.action.msg_hdr.msg_type = SM_ACTION_RQ_MSG;
    msg.action.action_cmd = SM_ACT_FILTERED_RESULT;
    msg.failure_type = (failure|cable) ; /* failure type with cable detail*/
    msg.failure_node_no = node;          /* = -1 sent means irrelevent   */
    msg.reporting_node_no =
            NODE_ASCII2INT(&station_psap_address.nsap_address[NODE_ID]);

/*
    *   send the message to the current master.
    *
    */
```

```
    return(send_msg(&msg, sizeof(FILT_RSLT_REPORT), CFRDF_ALIAS,
           &cur_master.masters_psap, NULL, NULL));

} /*  send_to_master() */

/*********************************************************************
*
*  Function Name    : adjust_apdt_list()
*
*  File Name        : apdt.c
*
*  Function         : This function takes the array list provided of the
*                     used up entries during the validation of a failure
*                     and then adjusts the ticks_to_go counts before
*                     releasing the entries to the free pool.
*
*  Returned Params  : NONE
*
*  Non-Resident Data : nfd_head
*
*  Routines Called  : rel_eve_blk() [nfi_mem.c]
*
*
*  Exception Exits  : NONE
*
**********************************************************************/

VOID adjust_apdt_list(array, count)
long array[];                              /* address of the array list  */
int count;                                 /* no of entries in the array */
{
    PROBLEM* prev = (PROBLEM*)array[0];    /* init the prev pointer      */
    PROBLEM* pointer = nfd_head;           /* temp pointer initialized   */
    int x = 0;

while ( count > 0 && x < 32 && pointer != NULL)
    {
        /*
        ** search for the first match in the list and the cable array.
        */ while ( (PROBLEM*)array[x] != pointer )
        {
            prev = pointer;                /* get the next in the list   */ if ((pointer = pointer->next) == NULL)
                break ;
        } if ( pointer == NULL )
            break;

/*
        ** now we have got the first match.
        */
        prev->next = pointer->next;        /* unlink this entry          */

/*
        ** adjust the counts around the matched block
        */
        if (pointer->next != NULL)
            pointer->next->ticks_to_go += pointer->ticks_to_go ;
        if (pointer != nfd_head)
            rel_eve_blk(pointer);

pointer = prev->next;
        count--;
```

```
        array[x] = (long)NULL;              /* initialize the used entry     */
        x++;

} /* while   */

} /* adjust_apdt_list() */

/*******************************************************************
*
*  Function Name    : perform_local_recovery()
*
*  File Name        : apdt.c
*
*  Function         : This function is called to inform the MTBM task
*                     on this box to recovery from a locally detected
*                     cable failure . This is concluded as a result of
*                     execessively noisy condition. The comms subsystem
*                     informs NFD of the problem and NFD tries to recover
*                     from this condition.
*
*
*  Returned Params  : NONE
*
*  Non-Resident Data    : station_psap_address
*
*  Routines Called  : send_msg() [util_804.c]
*
*
*  Exception Exits  : NONE
*
*******************************************************************/ perform_local_recovery(failure)
int failure ;        /*   cable A or B failure recovery      */
{
   RECOVER_FROM_FAILURE msg;
   char * ptr = NULL;

msg.rec_action.msg_hdr.msg_type = SM_ACTION_RQ_MSG;
   msg.rec_action.action_cmd = SM_ACT_REC_FROM_FAIL;
   msg.failure_type = failure;
      send_msg ( &msg, sizeof(RECOVER_FROM_FAILURE), mtbm_alias[0],
   &station_psap_address,
               NULL, NULL );

} /* perfrom_local_recovery() */
```

Appendix B

Collect Filtered Results and Deduce Failures (CFRDF)
/****************************************************************
 *                                                              *
 * (C)Copyright by Foxboro Company  1985                        *
 *                                                              *
 * All rights reserved:  Foxboro Company  1985                  *
 *                                                              *
 ****************************************************************
 *                                                              *
 * FILE ID            : cfrdf.c                                 *
 *                                                              *
 * PART NUMBER        :                                         *
 *                                                              *
 * FUNCTION           : This module contains all the functions associated *
 *                      with the Collect Filtered Results and Deduce Faults *
 *                      (CFRDF) task.                          *
 *                                                              *
 * FUNCTIONS CONTAINED : register_task()                        *
 *                       get_config_info()                      *
 *                       setup_config_data()                    *
 *                       not_master()                           *
 *                       process_filt_res()                     *
 *                       add_blk()                              *
 *                       cfrdf_timeout()                        *
 *                       cab_tx_more_2()                        *
 *                       cab_tx_2_less()                        *
 *                       noisy_2_less()                         *
 *                       noisy_2_more()                         *
 *                       inttx_2_less()                         *
 *                       adjust_list()                          *
 *                       get_cable_tx_failures()                *
 *                       get_failures()                         *
 *                       start_cfrdf_timer()                    *
 *                       print_message()                        *
 *                       perform_recovery()                     *
 *                       send_smdh_result()                     *
 *                       get_node_lbug()                        *
 *                                                              *
 ****************************************************************/

```
#include <comex.sys>
#include <ipc.sys>
#include <om_user.h>
#include <om_ecode.h>
#include "sm_msg.h"
#include <sman.h>
#include <sm_cfgf.h>
#include <sm_alias.h>
#include "nfd.h"
#include "nfi804.h"
#include "nfixcode.h"
#include "cfrdf.h"
#include "mtbm.h"
#include "sm_gnmsg.h"
#include "fs_util.h"

extern unsigned long mbx_cfrdf;          /* Mailbox to wait on */ extern char* mtbm_alias[];

extern unsigned int nfi_active_count;    /* count of active nodes        */
                                         /* kept by the comms subsystem */
extern void get_letterbug_id();          /* function to get station lbug*/
```

```c
extern char* sc_pend();
extern PROBLEM* get_eve_blk ();

extern int test_in_progress;

extern MASTER_REQ  set_to_normal_msg;

#ifdef LOGGER
extern void logger();
endif

VOID not_master ();                 /* Declare return value */
VOID add_blk ();
VOID cfrdf_timeout ();
VOID adjust_list ();
VOID get_cable_tx_failures ();
VOID perform_recovery ();
VOID send_smdh_result ();
char* get_node_lbug ();
VOID cbl_tx_more_2 ();
VOID cbl_tx_less_2 ();
VOID cbl_rec_more_2 ();
VOID noisy_2_more ();
VOID noisy_2_less ();
VOID inttx_2_less ();
VOID process_filt_res ();
VOID start_cfrdf_timer ();
VOID print_message ();

/*
**   Globals for this task .
*/ char       *cfrdf_name = "CFRDF";    /* Task name for the cfrdf task  */
                                     /* unique alias for this task    */
char       *cfrdf_alias[] = {"NFI_FIL"};
int         cfrdf_ids[1] ={ -1};     /* initialize the receive msg id's */
char        senders_alias[IPC_NAME_LEN]; /* senders alias info        */
int         cfrdf_master = FALSE ;   /* flag used by this task        */
int    cab_failure_count ;           /* count of cable failures found */
int    tx_failure_count ;            /* count of TXmitter failures found*/
int    inttx_count       ;
int    noisy_cab_count   ;           /* count of noisy cable found    */
int    noisy_a_count     ;           /* count of noisy A cable count  */
int    noisy_b_count     ;           /* count of noisy B cable count  */
int    cbl_rec_count     ;           /* count of the cable recovery on */
                                     /* this cable ( A or B)          */ char   my_smon_alias[LGCL_MAX+1];    /* smons alias to be used        */

PSAP_ADDR  my_smon_psap;             /* smon's psap                   */
PSAP_ADDR  snd_psap;                 /*  senders  psap info.          */ int    object_created ;              /* status of the attempt to create */
                                     /* the unique object for this task */
/*
**    Timer indentification for the IPC timer.
**
*/ int cfrdf_timer_value = 0;

int recovery_timer = 0;              /* recovery in progress indicator */
                                     /* while it is set more filtered  */
                                     /* reports are dropped.           */
int db_acquired = FALSE;             /* the database has already been  */
                                     /* acquired from the FS Utility.  */
                                     /* indicator                      */
```

```
PROBLEM * cable_array[ARR_SIZE] =
                    {0,0,0,0,0,0,0,0,    /* array of pointers that  */
                     0,0,0,0,0,0,0,0,    /* contain address of cable*/
                     0,0,0,0,0,0,0,0,    /* failure match entries.  */
                     0,0,0,0,0,0,0,0
                    };
PROBLEM * tx_array[ARR_SIZE] =
                    {0,0,0,0,0,0,0,0,    /* array of pointers that  */
                     0,0,0,0,0,0,0,0,    /* contain address of TX   */
                     0,0,0,0,0,0,0,0,    /* failure match entries.  */
                     0,0,0,0,0,0,0,0
                    };

PROBLEM * noisy_cable_array[ARR_SIZE] =         /* detected noisy cable info*/
                    {0,0,0,0,0,0,0,0,
                     0,0,0,0,0,0,0,0,
                     0,0,0,0,0,0,0,0,
                     0,0,0,0,0,0,0,0
                    };

PROBLEM * cbl_rec_array[ARR_SIZE] =
                    {0,0,0,0,0,0,0,0,    /* array of pointers that  */
                     0,0,0,0,0,0,0,0,    /* contain address of all  */
                     0,0,0,0,0,0,0,0,    /* nodes that have taken a */
                     0,0,0,0,0,0,0,0     /* local recovery action   */
                    };                   /* for this cable          */

PROBLEM * inttx_array[INTTX_ARR_SIZ] =
                    {0,0,0,0};           /* intermmitent TX array   */

PROBLEM * noisy_a_array[NSY_A_ARR_SIZ] =
                    {0,0,0,0};           /* noisy Cable A array     */

PROBLEM * noisy_b_array[NSY_B_ARR_SIZ] =
                    {0,0,0,0};           /* noisy Cable B array     */ char     cfrdf_rxbuf[ SM_MAX_IPC_MSG_SIZE ];   /* receive message buffer  */

SM_NFIRESULT   to_smdh_msg;              /* message to be sent to SMDH*/ char * cfrdf_rxbufptr = cfrdf_rxbuf;     /* address of buffer         */

/*
 *
 *    create the Token Bus status information data
 *
 */

TB_STATUS_INFO        tb_status;

/*
 *
 *    create the Token Bus node data ( got from FS utility ).
 *
 */

TB_REP_RECORD tb_node_data[MAX_NODES] ;

/*   Filtered results storage      */

PROBLEM*   cfrdf_head = NULL;

/*   Relinquish mastership message     */

RELINQ_MASTERSHIP rel_msg;
```

```
/*
**      Pseudo code for the task.
**
**      initialize the task data.
**
**      DO (forever)
**         wait on the MBX interface to the MTBM task.
**
**         register with IPC the alias and object create that alias.
**         get the static configuration from the FS Utility.
**         if (unable to get the configuration)
**            - Force this node to relinquish the mastership
**               and return to waiting on the MBX.
**
**         while (this station still a master)
**            - receive IPC messages.
**
**            - process returns
**
**               if (a timeout indication)
**                  process the timeout.
**
**               else if (message received)
**                  if (filtered result)
**                     process_filt_res();
**
**                  else if (relinquish mastership received)
**                     cleanup as no longer master.
**                     unregister the alias for this task.
**
**                  else
**                     print unknown message received.
**                  fi
**
**               else
**                  do nothing.
**               fi
**
**         end while
**
**      OD
*/
/*******************************************************************
*
*  Function Name     : register_task()
*
*  File Name         : cfrdf.c
*
*  Function          : This function registers with IPC and return the
*                      status.
*
*
*  Returned Params   : TRUE OR FALSE
*
*  Non-Resident Data : NONE
*
*
*  Routines Called   : cs_register() [o.s]
*                      cs_activate() [o.s]
*
*  Exception Exits   : NONE
*
*******************************************************************/ int register_task()
{
   int ret_value = FALSE;
   int ret;

object_created = FALSE;      /* init global status            */
```

```
/*
** register this task for IPC use and activate it. Returns status
** of the action.
*/
if ((ret = cs_register(cfrdf_name, ONE_ALIAS, cfrdf_alias, CDT, 0,0))
                             == CALL_COMPLETE )
   {
      if((cs_activate(cfrdf_name,CDT)) == CALL_COMPLETE)
      {
           if ( (obj_create (cfrdf_alias[0], PROCESS, STRING, CFRDF_ALIAS_SIZ))
                   == OM_SUCCESS)
           {
                object_created = TRUE;
                ret_value = TRUE;
           }
           else
           {
                err_rpt(NFD_SUBSYS_804,NFI_M_OBJ_CREATE_FAILED, cfrdf_name,
                        (char*) NULL);
                cs_unregister( cfrdf_name, CDT);
           }
      }
   }
   else if ( ret == E_UE_EXISTS )
   {
      if ( (obj_create (cfrdf_alias[0], PROCESS, STRING, CFRDF_ALIAS_SIZ))
              == OM_SUCCESS)
      {
           object_created = TRUE;
           ret_value = TRUE;
      }
      else
      {
           err_rpt(NFD_SUBSYS_804,NFI_M_OBJ_CREATE_FAILED, cfrdf_name,
                   (char*) NULL);
           cs_unregister( cfrdf_name, CDT);
      }
   }
   return (ret_value);
}

/*******************************************************************
*
* Function Name    : get_config_info()
*
* File Name        : cfrdf.c
*
* Function         : This function gets the configuration data about
*                    the Token Bus from the File Server utility and
*                    initializes the data held by this node.
*                    If the data is already acquired then returns the
*                    success to the caller.
*
* Returned Params  : TRUE Or FALSE
*
* Non-Resident Data  : my_smon_alias
*                      my_smon_psap
*                      db_acquired
*
* Routines Called  : get_system_monitor() [o.s]
*                    sc_tdelay()          [o.s]
*                    global_find()        [o.s]]
*                    err_rpt()            [o.s]
*                    send_msg()     [util_804.c]
*                    receive_msg()  [util_804.c]
*                    setup_config_data() [local]
*
*
* Exception Exits  : NONE
*
*******************************************************************/
```

```c
int get_config_info()
{
   int count = 0;
   int ret_value = TRUE;        /* return status                 */
   int ret_stat;                /* return status from send_msg () */
   LAN_REQ msg ;                /* message to send the FS utility */ if (db_acquired == FALSE)    /* if the database does not exist */
   {
      msg.para.msg_hdr.msg_type = SM_GET_RQ_MSG;
      msg.para.par_gr = SM_PG_TB_CONFIG ;
      byte_copy(&station_psap_address.nsap_address[LAN_ID], msg.lan_id,
LAN_ID_LEN);

/*
      ** now get the static data from the FS utility
      */
      if(get_system_monitor(my_smon_alias) >= 0)
      {
         if (global_find(my_smon_alias, PROCESS, &my_smon_psap) < 0)
         {
            err_rpt(NFD_SUBSYS_804,CFRDF_GBL_FND_FAIL, cfrdf_name,
                (char*) NULL);
            ret_value = FALSE;
         }
      }
      else
         ret_value = FALSE;

if (ret_value == TRUE)
      {
         while( (ret_stat = send_msg(&msg, sizeof(LAN_REQ), FS_UTIL_ALIAS,
                &my_smon_psap, NULL, cfrdf_alias[0])) < 0 && count++ <
MAX_RETRIES )
         {
            sc_tdelay((long)ONE_SECOND);
         }
         if (ret_stat < 0)
         {
            ret_value = FALSE;
         }
         else
         {
            for (count = 0 ; count < LOCAL_MAX; count++)
            {
               while( receive_msg ( ONE_ALIAS, cfrdf_alias, cfrdf_rxbuf,
                                   &snd_psap, cfrdf_ids, senders_alias ) !=
                                   MESSAGE_EVENT );
               if ((((SM_PAR_HDR*)cfrdf_rxbufptr)->par_gr == SM_PG_TB_CONFIG)
                   &&
(((SM_PAR_RSP_HDR*)cfrdf_rxbufptr)->par_hdr.msg_hdr.msg_type)
                     == SM_GET_RSP_MSG)
               {
                  if ((ret_value = setup_config_data(cfrdf_rxbuf)) == TRUE)
                     db_acquired = TRUE;
                  break;
               }
            } /* for */

} /* else */

} /* ret_value == TRUE */
   } return(ret_value);

}
```

```
/*******************************************************************
*
* Function Name     : setup_config_data()
*
* File Name         : cfrdf.c
*
* Function          : This function copies the number of fields returned
*                     from the FS utility and sets up the tb_node_data
*                     info.
*
* Returned Params   : TRUE OR FALSE
*
* Non-Resident Data : tb_node_data[]
*
*
* Routines Called   : byte_copy() [o.s]
*
* Exception Exits   : NONE
*
*******************************************************************/ int setup_config_data(msg)
LAN_RSP *msg;
{
   int i;
   int ret_stat = FALSE;
   if (msg->no_of_reports > 0)
   {
      for (i= 0 ; i < msg->no_of_reports ; i++)
      {
         /* copy the fields from the response */ tb_node_data[i].station_type = msg->configurati  [i].station_type;
         tb_node_data[i].node_no =
NODE_ASCII2INT(msg->configuration[i].node_no);
         byte_copy(msg->configuration[i].smon_alias,tb_node_data[i].smon_alias,
                  LGCL_MAX);
         byte_copy(msg->configuration[i].slbug,tb_node_data[i].sta_lbug,
                  SM_LID_LEN+1);

}
      ret_stat = TRUE;
   }
   return(ret_stat);
}

/*******************************************************************
*
*   Function Name    : cfrdf_main()
*
*   File Name        : cfrdf.c
*
*   Function         : This is the entry point to the task.  It is
*                      only active in the master station( LI or the SLI).
*
*   Returned Params  : None.
*
*   Non-Resident Data : cfrdf_name []
*                       cfrdf_rxbuf[]
*                       cfrdf_master
*                       mbx_cfrdf
*                       rel_msg
*                       station_psap_address
*
*
*   Routines Called  : sc_pend()         [o.s]
*                      sc_tdelete()      [o.s]
*                      get_config_data() [local]
```

```
*                       send_msg()       [util_804.c]
*                       receive_msg()    [util_804.c]
*                       get_type_of_message()[util_804.c]
*                       not_master       [local]
*                       cfrdf_timeout()  [local]
*                       process_filt_res()[local]
*                       err_rpt()        [o.s]
*
*
*  Exception Exits  : None.
*
********************************************************************/ cfrdf_main()
{
    int    rec_event;              /* rec_event                  */
    int    mes_type;               /* type of received message   */
    char * msg ;                   /* pend message received pointer */
    int err = 0;

/*
    ** Forever loop begins here.
    */ for (;;)
    { msg = sc_pend(&mbx_cfrdf, (long)0, &err );

/* clear the recovery filter flag */
       recovery_timer = 0;

if ( register_task() == TRUE)
       {
           if ( get_config_info() == TRUE )
           {
           /*
            * everything is o.k.; registration and Object creation
            * for this task is o.k. Succeeded in init of this task.
            */ cfrdf_master = TRUE;
           }
           else
           {
               /*
               ** object delete the object and unregister since
               ** they are the only ones succeeded.
               */
               obj_delete(cfrdf_alias[0], PROCESS);
               object_created = FALSE;
               cl_cancel(cfrdf_name);

if (cfrdf_timer_value > 0 )
               {
                 stop_time(cfrdf_timer_value);
                 cfrdf_timer_value = 0;
               }
               cs_unregister(cfrdf_name, CDT);
           }

}
       else
           cfrdf_master = FALSE ;

while (cfrdf_master == TRUE)
       {
       /*   initiate the receives of messages or the Timeout condition if
            it exists.                                                  */
```

```
              rec_event = receive_msg ( ONE_ALIAS, cfrdf_alias, cfrdf_rxbuf,
                                &snd_psap, cfrdf_ids, senders_alias );
              if ( rec_event == TIMEOUT_EVENT )
              {
                  cfrdf_timeout();
              }   /* if event is IPC timeout */
              else if (rec_event == MESSAGE_EVENT)
              {
                  mes_type = get_type_of_message( cfrdf_rxbuf );
                  switch ( mes_type )
                  {
                          case NO_LONGER_MASTER :
                              not_master();
                              break;

case FILT_RESULT :
                              if (recovery_timer == 0)
                                  process_filt_res(cfrdf_rxbuf) ;
#ifdef LOGGER
                              else
                                  logger(0x0007);
#endif
                              break;

case UNKNOWN_MSG :
                          default:

err_rpt(NFD_SUBSYS_804, NFI_CFRDF_UNKWN_MSG,
cfrdf_name,
                                                  (char*) NULL);
                              break;

}   /* switch */
              }   /* else message receives successfully */
         } /* while cfrdf_master */

}   /* for (;;) */

}   /* cfrdf_main() */
```

```
/***************************************************************
*
*  Function Name    : not_master()
*
*  File Name        : cfrdf.c
*
*  Function         :
*
*  Design           : object delete the alias name.
*                     cancel any outstanding IPC receives.
*                     unregister with the IPC mechanism. Make this
*                     task unavailable to anyone in the network.
*
*
*  Returned Params  : NONE
*
*  Non-Resident Data : nfi_active_count [comms]
*                      cfrdf_master.
*                      cfrdf_alias
*                      cfrdf_ids[]
*
*  Routines Called  : cl_cancel      [o.s]
*                     cs_unregister  [o.s]
*                     obj_delete     [o.s]
*                     stop_time      [o.s]
*                     rel_eve_blk()  [nfi_mem.c]
*
*  Exception Exits  : NONE
*
***************************************************************/
```

```
VOID not_master()
{
   PROBLEM * ptr;

if (object_created == TRUE)
   {
      if (( obj_delete(cfrdf_alias[0], PROCESS) == OM_SUCCESS)
           object_created = FALSE;
      else
          err_rpt(NFD_SUBSYS_804 , NFI_OBJ_DEL_FAILED , cfrdf_name,
                  (char*) NULL);
   }

/*
   ** If there is an outstanding receive for this task( including
   ** all aliases).
   **
   */ cl_cancel(cfrdf_name);
   if (cfrdf_timer_value > 0 )
   {
      stop_time(cfrdf_timer_value);
      cfrdf_timer_value = 0;
   } cs_unregister(cfrdf_name, CDT);

cfrdf_master = FALSE;                    /*   reset status            */

/*
   ** release all the blocks of data already queued up due to the
   ** events being reported to the master.
   */ while ( cfrdf_head != NULL )
   {
       ptr = cfrdf_head;
       cfrdf_head = cfrdf_head->next;
       rel_eve_blk(ptr);              /* put the released block back to  */
                                      /* free pool.                      */
   }

} /* not_master() */

/***********************************************************************
*
*  Function Name    : process_filt_res()
*
*  File Name        : cfrdf.c
*
*  Function         : This function is called when the master station
*                     receives the filtered results from the agent 804
*                     subsystems. It determines the typeof the report
*                     and updates the events list with the reported
*                     failures.
*
*  Returned Params  : NONE
*
*  Non-Resident Data : nfi_active_count
*                      cfrdf_head
*
*  Routines Called  : print_message        [local]
*                     add_blk()            [local]
*                     start_cfrdf_timer()  [local]
```

```
*                       However, this should not happen as pool allocations
*                       are calculated so that atleast one is avaliable.
*
* Returned Params  : NONE
*
* Non-Resident Data    : cfrdf_head
*
* Routines Called  : add_to_eve_list() [local]
*                    get_eve_blk()    [ defined in nfi_mem.c module]
*
* Exception Exits  : NONE
*
***************************************************************/
VOID add_blk(count,fail_node, rep_node, failure ,func)
int count;              /* count of ticks to go  to set up   */
int fail_node;          /* failure node number               */
int rep_node;           /* reporting node number             */
int failure;            /* type of failure reported          */
int (*func)();          /* function address to setup in block*/
{
    PROBLEM* blk_ptr ;  /* pointer to problem data  */

/*
    ** get a block from free pool and setup the data in it.
    ** Add the updated block to the events list.
    */ if ((blk_ptr = get_eve_blk()) != NULL)
    {
ifdef LOGGER
        logger(0x0001,fail_node,rep_node,failure);
endif blk_ptr->ticks_to_go = count ;
        blk_ptr->node_no = fail_node;
        blk_ptr->report_node_no = rep_node;
        blk_ptr->failure_type = failure;
        blk_ptr->func = func ;
        add_to_eve_list(blk_ptr,&cfrdf_head);
    }

} /*  add_blk() */

/*******************************************************************
*
* Function Name    : cfrdf_timeout()
*
* File Name        : cfrdf.c
*
* Function         : This function decerementsthe timeout at the head
*                    of the event queue and then invokes the action
*                    routine whenthat entry expires
*
* Design           :
*                    decrement timeout entry at the head of the list.
*                    if (== 0)
*                       invoke function provided.
*                       remove the first entry at the head of the list.
*                    fi
*
* Returned Params  : NONE
*
* Non-Resident Data    : cfrdf_head
*
*
* Routines Called  : rel_eve_blk [ nfi_mem.c]
*                    start_cfrdf_timer() [local]
*
* Exception Exits  : NONE
*
*******************************************************************/
```

```
VOID cfrdf_timeout()
{
    PROBLEM* ptr;              /* temp pointer for local use    */

/*
     *
     *   If the count of ticks to go becomes 0, then that
     *   entry's window has expired.
     *   Thus processing must take place to determine if
     *   the failure is valid. This is done by invoking the
     *   function pointed to by function entry in the first
     *   block.
     */

/*
     *   Apart from the processing of the expired entry, all further
     *   entries that have the ticks_to_go count == 0 and have not been
     *   manipulated by the adjust_list() function have to be processed.
     *   This is the justification for the while loop.
     */ cfrdf_timer_value = 0;              /* since the timer has expired  */
                                        /* cleanup the identifier       */
    /*
    ** if the recovery timer is running then decrement it value
    */ if (recovery_timer > 0)
        recovery_timer--;

if (cfrdf_head != NULL)
    {
        if ( --cfrdf_head->ticks_to_go <= 0)
        {
            while ((cfrdf_head != NULL) && (cfrdf_head->ticks_to_go <= 0))
            {
                (*cfrdf_head->func)();
                ptr = cfrdf_head;
                cfrdf_head = cfrdf_head->next;
                rel_eve_blk(ptr);           /* put the released block back to */
                                            /* free pool.                     */
            }

}
    } if(cfrdf_head != NULL || recovery_timer > 0) /* start another timer   */
                                                 /* if necessary          */
        start_cfrdf_timer();

} /* cfrdf_timeout() */

/****************************************************************
 *
 *  Function Name    : cbl_tx_more_2()
 *
 *  File Name        : cfrdf.c
 *
 *  Function         : This function is called when in a LAN of more
 *                     than 2 nodes, the expired entry atthe head of
 *                     the list is cable or a TX failure report. The
 *                     function applies the Rules associated with the
 *                     failure reports and deduces the detected failure.
 *
 *  Returned Params  : NONE
```

```
*
*   Non-Resident Data     : cab_failure_count
*                           tx_failure_count
*                           tb_status
*                           cfrdf_head
*                           cable_array[]
*                           tx_array[]
*
*   Routines Called       : get_cable_tx_failures() [local]
*                           perform_recovery()      [local]
*                           adjust_list()           [local]
*                           send_smdh_result()      [local]
*                           print_message()         [local]
*
*   Exception Exits       : NONE
*
*******************************************************************/

VOID cbl_tx_more_2()
{
    int failure_status = 0;          /* internal flag to indicate a valid  */
                                     /* failure was detected.              */
    int failure ;                    /* failure type of the timed out entry*/
    int cable ;                      /* which cable information            */
    int node = NODE_NOT_VALID;       /* node number set when valid         */
    int recovery = 0;                /* defines if recovery is needed      */
    int message_no;

/* find out the number of cable failure reports in 30 seconds */
    /* find out the number of the TXmitter failures in 30 seconds.*/ cab_failure_count = tx_failure_count = 0;

get_cable_tx_failures();         /* sets up the cable & TX arrays      */
    failure = cfrdf_head->failure_type ;
    cable = failure & CABLE_MASK ;

ifdef LOGGER logger(0x0002, cab_failure_count, tx_failure_count,failure, cable);

endif

/*
    **   if ( 1 cable failure report from Node X
    **   && 2 or more report TX failure for node X)
    **   Node X drop cable or cable X failure.
    **   OR  1 cable report from node X  and ALL others say TXmitter problem)
    **   then report "CABLE FAILURE OR DROP CABLE FAILURE"
    */ if (( cab_failure_count == 1 && tx_failure_count == nfi_active_count )
            || (cab_failure_count == 1 && tx_failure_count >= 2))
    {
        node = tx_array[0]->node_no;
        failure_status = CABLE_FAILURE | cable;
        tb_status.cable_status = failure_status;

/* pickup the node number of the failure*/
                                     /* node and update the relevant entry   */
                                     /* by getting the failure cable.        */ tb_status.tb_member_stat[node] =
                DROP_CABLE |(cable_array[0]->failure_type & CABLE_MASK);

if (cable == CABLE_A)
            message_no = ND_X_DRP_OR_CBL_A;
        else
```

```
            message_no = ND_X_DRP_OR_CBL_B;
         recovery = ALL_RECOVER;

}
/*
**    else if (more than 1 report cable failure and  no TX reports received)
**    "CABLE_FAILURE".
**    OR cable failure count > 1 and tx failure count > 0 ( added 17mAY 91)
*/ else if ((cab_failure_count > 1 && tx_failure_count == 0) ||
         (cab_failure_count > 1 && tx_failure_count > 0))
{
   tb_status.cable_status |= (CABLE_FAILURE | cable);
   failure_status = cable;
   if (tb_status.cable_status == (CABLE_FAILURE | CABLE_A | CABLE_B ))
      message_no = CBL_AB_FL_MSG;
   else if (cable == CABLE_A)
      message_no = CBL_A_FL_MSG;
   else
      message_no = CBL_B_FL_MSG;
   recovery = ALL_RECOVER;

}

/*
**    else if (1 report of cable failure from node X AND no TX reports
**    received)
**    "NODE X RECEIVER A/B FAILED".
*/ else if (cab_failure_count == 1 && tx_failure_count == 0)
{
   /* update the node's status info held          */ node = cfrdf_head->report_node_no;
   failure_status = RX_FAILURE | cable;
   tb_status.tb_member_stat[node] = failure_status;

if (cable == CABLE_A)
      message_no = ND_X_RX_A_FL ;
   else
      message_no = ND_X_RX_B_FL ;
   recovery = ONE_RECOVER;
}

/*
**    else if (0 cable failure reports received more than 1 says NODE X's TX
**                                    failed)
**    "NODE X's TXmitter failed"
*/
else if (cab_failure_count == 0 && tx_failure_count > 1)
{
   node = tx_array[0]->node_no;
   failure_status = TX_FAILURE | cable;
   tb_status.tb_member_stat[node] = failure_status;

if (cable == CABLE_A)
      message_no = ND_X_TX_A_FL ;
   else
      message_no = ND_X_TX_B_FL ;
   recovery = ONE_RECOVER;
}

/*
**   if a failure was detected then remove the used entries
**   and inform smdh, print message and perform recovery.
*/
```

```
    if (failure_status != 0)
    {
        tb_status.time_of_last_error = sc_gtime(); /* set the time of error */ tb_status.fault = FAULT_DETECTED;          /* set the fault flag    */

/*   inform smdh and print message */ ifdef LOGGER
        logger(0x0003, failure_status, recovery, node);
endif perform_recovery(failure_status, recovery,node);
        send_smdh_result(message_no, node, NODE_NOT_VALID);
        print_message(message_no, node, NODE_NOT_VALID);
        send_smon_status(NET_STATE_BAD, mtbm_alias[1]);
/*
**      if (cab_failure_count)
**          adjust_list(cable_array, cab_failure_count);
**      if (tx_failure_count)
**          adjust_list(tx_array,tx_failure_count);
*/
    }

} /* cbl_tx_more_2() */
/****************************************************************
*
*  Function Name    : cbl_tx_less_2()
*
*  File Name        : cfrdf.c
*
*  Function         : This function is called when the no of nodes on
*                     Token Bus is 2 or less and the expired entry at
*                     the head of the list is cab or Tx failure report.
*
*  Returned Params  : NONE
*
*  Non-Resident Data : tx_failure_count
*                      inttx_count
*                      noisy_count
*                      tx_array[]
*                      inttx_array[]
*                      noisy_cable_array[]
*                      tb_status
*
*  Routines Called  : get_failures()      [local]
*                     send_smdh_result()  [local]
*                     print_message()     [local]
*                     perform_recovery()  [local]
*                     adjust_list()       [local]
*
*
*  Exception Exits  : NONE
*
****************************************************************/
VOID cbl_tx_less_2()
{
    int failure_status = 0;        /* failure status detected    */
    int node1 = NODE_NOT_VALID;    /* initialize locals          */
    int node2 = NODE_NOT_VALID;
    int cable = cfrdf_head->failure_type & CABLE_MASK;
    int message_no;

tx_failure_count = inttx_count = noisy_cab_count = 0;

/*   get TX failures */ tx_failure_count = get_failures(TX_FAILURE | cable, WIN_30_SEC, tx_array,
                ARR_SIZE );
```

```c
/*   get INTTX failures */ inttx_count = get_failures(INTMITTENT_TX | cable, WIN_30_SEC, inttx_array,
                INTTX_ARR_SIZ );
#ifdef LOGGER
    logger(0x0005,tx_failure_count, inttx_count);
endif /*
    **   Both report each others TX failure ( in 30 seconds )
    **   " cable OR Drop Cable failure on A/B "
    */ if ( tx_failure_count == 2 &&
        tx_array[0]->node_no == tx_array[1]->report_node_no &&
        tx_array[0]->report_node_no == tx_array[1]->node_no  )
    { cable = tx_array[0]->failure_type & CABLE_MASK;
        tb_status.cable_status |= CABLE_FAILURE | cable;
        failure_status = tb_status.cable_status;
        if (tb_status.cable_status == (CABLE_FAILURE | CABLE_A | CABLE_B ))
           message_no = CBL_AB_FL_MSG;
        else if (cable == CABLE_A)
           message_no = CBL_DRP_CBL_A_FL_MSG ;
        else
           message_no = CBL_DRP_CBL_B_FL_MSG ;

}

/*
    **   Only 1 report of TX failure in 30 seconds
    **   " reporting nodes RX failure or other nodes TX failure"
    */ else if (( tx_failure_count == 1 ) && ( inttx_count == 0 ))
    {
        cable = tx_array[0]->failure_type & CABLE_MASK;
        node1 = tx_array[0]->report_node_no;
        node2 = tx_array[0]->node_no;

tb_status.tb_member_stat[node1] = POSS_RX_FAIL | cable;
        tb_status.tb_member_stat[node2] = POSS_TX_FAIL | cable;
        failure_status = POSS_RX_FAIL | POSS_TX_FAIL | cable;

if (cable == CABLE_A)
            message_no = REP_ND_RX_OTR_ND_TX_FL_A;
        else
            message_no = REP_ND_RX_OTR_ND_TX_FL_B;

}

/*
    **   One report of INT TX in 30 seconds.
    **   " Intermittent failure of reporting nodes receiver OR other nodes
    **   TX"
    */ else if (inttx_count == 1 )
    {
        cable = inttx_array[0]->failure_type & CABLE_MASK;
        node1 = inttx_array[0]->report_node_no;
        node2 = inttx_array[0]->node_no;

tb_status.tb_member_stat[node1] = POSS_INT_RX_FAIL | cable;
        tb_status.tb_member_stat[node2] = POSS_INT_TX_FAIL | cable;
        failure_status = POSS_INT_RX_FAIL | POSS_INT_TX_FAIL | cable;
```

```
         if (cable == CABLE_A)
            message_no = REP_ND_INTRX_OTR_ND_INTTX_FL_A;
         else
            message_no = REP_ND_INTRX_OTR_ND_INTTX_FL_B;

}
      /*
      ** if a failure was detected then tell smdh, perform recovery
      ** and print the message.
      */ if (failure_status != 0)
      {
         tb_status.time_of_last_error = sc_gtime();
         tb_status.fault = FAULT_DETECTED;

#ifdef LOGGER
         logger(0x0006, failure_status, node1,node2,message_no);
#endif
         /*
         ** inform SMDH and print message
         **
         */ send_smdh_result(message_no,node1, node2 );
         print_message(message_no, node1, node2);

/*
         ** perform recovery as if a cable failure has taken place.
         */ perform_recovery(cable, ALL_RECOVER, NODE_NOT_VALID);
         send_smon_status(NET_STATE_BAD, mtbm_alias[1]);

/*
         ** now get rid of the blocks not needed
         */

/*
**       if (tx_failure_count)
**          adjust_list(tx_array, tx_failure_count);
**       if (inttx_count)
**          adjust_list(inttx_array, inttx_count);
*/

}

} /* cbl_tx_less_2    */

/********************************************************************
*
*  Function Name    : cbl_rec_more_2()
*
*  File Name        : cfrdf.c
*
*  Function         : This function is called when in a LAN of more
*                     than 2 nodes, the expired entry atthe head of
*                     the list is cable recovery taken by any agents. The
*                     function applies the Rules associated with the
*                     failure reports and deduces the detected failure.
*
*  Returned Params  : NONE
*
*  Non-Resident Data    : cab_rec_count
*                         tb_status
*                         cfrdf_head
*                         cbl_rec_array[]
*
*  Routines Called  : get_failures() [local]
*                     perform_recovery() [local]
*                     adjust_list()     [local]
```

```
*                    send_smdh_result()[local]
*                    print_message()    [local]
*                    set_node_bothcbl() [local]
*
* Exception Exits  : NONE
*
*********************************************************************/

VOID cbl_rec_more_2()
{
    int failure_status = 0;         /* internal flag to indicate a valid */
                                    /* failure was detected.             */
    int failure ;                   /* failure type of the timed out entry*/
    int cable ;                     /* which cable information            */
    int node = NODE_NOT_VALID;      /* node number set when valid         */
    int recovery = 0;               /* defines if recovery is needed      */
    int message_no;

cbl_rec_count =  0;

cbl_rec_count = get_failures(cfrdf_head->failure_type, WIN_30_SEC,
                        cbl_rec_array, ARR_SIZE );
    failure = cfrdf_head->failure_type ;
    cable = failure & CABLE_MASK ;

ifdef LOGGER logger(0x0020, cbl_rec_count, failure, cable);

endif
    /*
    **   if the local cable recovery action has been taken by any station
    **   then the check if at least 2 confirm that action. OR in the case of
    **   a 2 node system make sure that one has taken a local recovery
    **   action. In either case it is a confirmed cable failure.
    **
    **
    */ if ( (cbl_rec_count >= 2 ) ||
              ( (cbl_rec_count == 1) && (nfi_active_count == 1)))

{
        failure_status = CABLE_FAILURE | cable;
        tb_status.cable_status |= failure_status;

/* pickup the node number of the failure*/
                                    /* node and update the relevant entry   */
                                    /* by getting the failure cable.        */ if (tb_status.cable_status == (CABLE_A | CABLE_B))
            message_no = CBL_AB_FL_MSG;
        else if (cable == CABLE_A)
            message_no = CBL_A_FL_MSG;
        else
            message_no = CBL_B_FL_MSG;
        recovery = ALL_RECOVER;

}

/* else if the count is only one and the master has not taken a recovery */
    /* for the same cable then only set it to normal.                        */
    /*                                                                       */ else if ( (cbl_rec_count == 1 ) && ( tb_status.cable_status != cable))
    {
```

```
        set_node_bothcbl(cbl_rec_array[0]->report_node_no);
     }
     /*
     ** if a failure was detected then remove the used entries
     ** and inform smdh, print message and perform recovery.
     */ if (failure_status != 0)
     {
         tb_status.time_of_last_error = sc_gtime();  /* set the time of error */ tb_status.fault = FAULT_DETECTED;           /* set the fault flag    */

/*   inform smdh and print message */ ifdef LOGGER
         logger(0x0021, failure_status, recovery, node);
endif perform_recovery(failure_status, recovery, node);
         send_smdh_result(message_no, node, NODE_NOT_VALID);
         print_message(message_no, node, NODE_NOT_VALID);
         send_smon_status(NET_STATE_BAD, mtbm_alias[1]);
/*       if (cbl_rec_count)
**           adjust_list(cbl_rec_array, cbl_rec_count);
*/
     }

} /* cbl_rec_more_2() */

/******************************************************************
*
*  Function Name    : noisy_2_less()
*
*  File Name        : cfrdf.c
*
*  Function         : This function is aclled when the expired entry
*                     at the head of the list is of NOISY CABLE and the
*                     no of nodes on this LAN are 2 or less.
*
*  Returned Params  : NONE
*
*  Non-Resident Data    : noisy_a_count
*                         noisy_b_count
*                         tb_status
*
*  Routines Called  : get_failures()      [local]
*                     send_smdh_result()  [local]
*                     print_message()     [local]
*                     perform_recovery()  [local]
*                     adjust_list()       [local]
*
*  Exception Exits  : NONE
*
******************************************************************/

VOID noisy_2_less()
{
    int cable = -1;
    int message_no;
    int failure_status;

/*
    ** initialize the data to be used
    **
    */ noisy_a_count = noisy_b_count = failure_status = 0;
```

```
/*
**   get the failures to be used and adjust the counts.
**
*/
noisy_a_count = get_failures(NOISY_CABLE | CABLE_A, WIN_30_SEC,
                             noisy_a_array, NSY_A_ARR_SIZ);

noisy_b_count = get_failures(NOISY_CABLE | CABLE_B, WIN_30_SEC,
                             noisy_b_array, NSY_B_ARR_SIZ );

/*
**   Both report NOISY CABLE on both cables.
**   "NOISY A & B".
*/ if (noisy_a_count == 2 && noisy_b_count == 2)
{
    /* update the cable status */ tb_status.cable_status = (NOISY_CABLE | CABLE_A | CABLE_B) ;
    failure_status = tb_status.cable_status;
    message_no = BOTH_CBLS_NSY;

}

/*
**   Both report noisy cable
**   "NOISY cable A/B "
*/ else if ( noisy_a_count == 2)
{
    tb_status.cable_status = (NOISY_CABLE | CABLE_A);
    failure_status = tb_status.cable_status;
    message_no = NSY_CBL_A;
}
else if (noisy_b_count == 2)
{
    tb_status.cable_status = (NOISY_CABLE | CABLE_B);
    failure_status = tb_status.cable_status;
    message_no = NSY_CBL_B;
} if (failure_status != 0)
{
    tb_status.time_of_last_error = sc_gtime();
    tb_status.fault = FAULT_DETECTED;

/*
    ** inform SMDH and print message
    **
    */ send_smdh_result(message_no, NODE_NOT_VALID, NODE_NOT_VALID );
    print_message(message_no, NODE_NOT_VALID, NODE_NOT_VALID);

/*
    **   if the failure can be recovered from, initiate
    **   recovery.
    */ perform_recovery(failure_status, ALL_RECOVER, NODE_NOT_VALID);

send_smon_status(NET_STATE_BAD, mtbm_alias[1]);

/*
    **   now get rid of the blocks not needed
    */

/*      if (noisy_a_count)
**          adjust_list(noisy_a_array,noisy_a_count);
**      if (noisy_b_count)
```

```
**          adjust_list(noisy_b_array,noisy_b_count);
*/

}

} /* noisy_2_less() */
/*****************************************************************
*
* Function Name    : noisy_2_more()
*
* File Name        : cfrdf.c
*
* Function         : This function gets called when more than 2 nodes
*                    on the Token Bus. i.e. greater than a 2 node net.
*                    It is called when the expired entry at the head of
*                    the list is of the noisy cable type.
*
* Design           :
*
*     get noisy cable reports for the same cable.
*     if (more than 2 report noisy cables and the >= 5% report it)
*         set the noisy cable condition in the status.
*         send recovery command to all nodes.
*     fi
*
* Returned Params  : NONE
*
* Non-Resident Data    : noisy_cab_count
*                        nfi_active_count
*                        tb_status
*
* Routines Called  : get_failures()      [local]
*                    send_smdh_result()  [local]
*                    print_message()     [local]
*                    perform_recovery()  [local]
*                    adjust_list()       [local]
*
* Exception Exits  : NONE
*
*****************************************************************/

VOID noisy_2_more()
{
    int cable = - 1;
    int failure_status = 0;
    int message_no;

/*
    **   get the failures related to the expired entry.
    */ noisy_cab_count = get_failures(cfrdf_head->failure_type, WIN_30_SEC,
                                    noisy_cable_array, ARR_SIZE);

/*
    **  if the noisy cable report count is 2 or greater AND
    **  the ratio of the number of nodes reporting to the number of
    **  nodes is greater than 5% of the nodes then A NOISY CABLE condition
    **  is valid.
    */ if (noisy_cab_count  >= 2 &&
        (int)(((float)noisy_cab_count/(nfi_active_count + 1))*100) >= PERCENT_5
    )
    { failure_status = cfrdf_head->failure_type ;
```

```
            if ((failure_status & CABLE_MASK) == CABLE_A)
                message_no = NSY_CBL_A;
            else
                message_no = NSY_CBL_B;

/*
            ** update the status.
            */
            tb_status.cable_status |= cfrdf_head->failure_type;
            tb_status.time_of_last_error = sc_gtime();
            tb_status.fault = FAULT_DETECTED;

perform_recovery(failure_status, ALL_RECOVER, NODE_NOT_VALID);
            print_message(message_no, NODE_NOT_VALID, NODE_NOT_VALID);
            send_smon_status(NET_STATE_BAD, mtbm_alias[1]);
/*              adjust_list(noisy_cable_array, noisy_cab_count);
**
*/
        }

}  /* noisy_2_more() */

/*******************************************************************
*
*  Function Name    : inttx_2_less()
*
*  File Name        : cfrdf.c
*
*  Function         : This function is only called on network of 2 nodes
*                     or less when the expired entry at the head of the
*                     event list is Intermittent Txmitter failure report.
*
*  Returned Params  : NONE
*
*  Non-Resident Data   : tb_status
*                        inttx_array[]
*                        cfrdf_head
*
*
*  Routines Called  : get_failures()      [local]
*                     send_smdh_result()  [local]
*                     print_message()     [local]
*                     perform_recovery()  [local]
*                     adjust_list()       [local]
*
*  Exception Exits  : NONE
*
*******************************************************************/

VOID inttx_2_less()
{
    int message_no = 0;        /* message number of the report   */
    int failure_status = 0;    /* failure status.                */
    int node1 = NODE_NOT_VALID;
    int node2 = NODE_NOT_VALID;
    int cable = -1;

inttx_count = get_failures(cfrdf_head->failure_type, WIN_30_SEC,
                               inttx_array, INTTX_ARR_SIZ );

/*
    ** only 1 node reports a INT TX then
    ** report "Intermittent Failure of reporting nodes RX or other
    ** nodes TXmitter.
    */
```

```c
if (inttx_count == 1)
{
   cable = inttx_array[0]->failure_type & CABLE_MASK;
   node1 = inttx_array[0]->report_node_no;
   node2 = inttx_array[0]->node_no;

tb_status.tb_member_stat[node1] = POSS_INT_RX_FAIL | cable;
   tb_status.tb_member_stat[node2] = POSS_INT_TX_FAIL | cable;
   failure_status = POSS_INT_RX_FAIL | POSS_INT_TX_FAIL | cable;

if (cable == CABLE_A)
      message_no = REP_ND_INTRX_OTR_ND_INTTX_FL_A;
   else
      message_no = REP_ND_INTRX_OTR_ND_INTTX_FL_B;

}
/*
** Both nodes report INTTX on one cable then
** report "NOISY CABLE".
*/
else if (inttx_count == 2)
{
   cable = cfrdf_head->failure_type & CABLE_MASK;
   tb_status.cable_status = NOISY_CABLE | cable;
   failure_status = tb_status.cable_status ;
   if (cable == CABLE_A)
       message_no = NSY_CBL_A ;
   else
       message_no = NSY_CBL_B ;

} if (failure_status != 0)
{
   tb_status.time_of_last_error = sc_gtime();
   tb_status.fault = FAULT_DETECTED;

adjust_list(inttx_array, inttx_count);
   print_message( message_no,node1,node2  );
   if ((tb_status.cable_status & 0xFFFC)  == NOISY_CABLE)

perform_recovery(tb_status.cable_status,ALL_RECOVER,
                        NODE_NOT_VALID);
      send_smon_status(NET_STATE_BAD, mtbm_alias[1]);

}

} /* inttx_2_less() */

/****************************************************************
*
* Function Name    : adjust_list()
*
* File Name        : cfrdf.c
*
* Function         : This function takes the array list provided of the
*                    used up entries during the validation of a failure
*                    and then adjusts the ticks_to_go counts before
*                    releasing the entries to the free pool.
*
* Returned Params  : NONE
*
* Non-Resident Data : cfrdf_head
```

```
*  Routines Called  : rel_eve_blk() [nfi_mem.c]
*
*
*  Exception Exits  : NONE
*
*******************************************************************/
VOID adjust_list(array, count)
long array[];                           /* address of the array list */
int count;                              /* no of entries in the array */
{
    PROBLEM* prev = (PROBLEM*)array[0];   /* init the prev pointer      */
    PROBLEM* pointer = cfrdf_head;        /* temp pointer initialized   */
    int x = 0;

while ( count > 0 && x < 32 && pointer != NULL)
    {
        /*
        **   search for the first match in the list and the cable array.
        */
        while ( (PROBLEM*)array[x] != pointer )
        {
            prev = pointer;                 /* get the next in the list  */ if ((pointer = pointer->next) == NULL)
                break ;
        } if ( pointer == NULL )
            break;

/*
        **   now we have got the first match.
        */
        prev->next = pointer->next;         /* unlink this entry         */

/*
        **   adjust the counts around the matched block
        */
        if (pointer->next != NULL)
            pointer->next->ticks_to_go += pointer->ticks_to_go ;
        if (pointer != cfrdf_head)
            rel_eve_blk(pointer);

pointer = prev->next;
        count--;
        array[x] = (long)NULL;              /* initialize the used entry  */
        x++;

} /* while   */

} /* adjust_list() */

/*******************************************************************
*
*  Function Name   : get_cable_tx_failures()
*
*  File Name       : cfrdf.c
*
*  Function        : This function gets all the cable failures and
*                    TXmitter failures reports (for the same node)
*                    and sets up the array's specified with the
*                    addresses of all the matched entries.
*
*  Returned Params : NONE
*
```

```
*  Non-Resident Data     : cab_failure_count
*                          tx_failure_count
*                          cable_array[]
*                          tx_array[]
*                          cfrdf_head
*
*
*  Routines Called       : NONE
*
*  Exception Exits       : NONE
*
******************************************************************/

VOID get_cable_tx_failures()
{ int count = 0;
   int temp_node_no = -1;              /* node no of tx_failure reported */
   int window_count = WIN_30_SEC;      /* set to the window size          */
   PROBLEM*  this = cfrdf_head ;       /* points to the first entry       */
                                       /* init the cable failure detected pointer.
*/
   long * cab_arr_p = (long*) &cable_array[0];
                                       /* init the tx failure detected pointer. */
   long * tx_arr_p = (long*) &tx_array[0];
   int cable_failure = cfrdf_head->failure_type &  CABLE_MASK;
   int tx_failure = cable_failure | TX_FAILURE;

cab_failure_count = 0;              /* init counts                     */
   tx_failure_count  = 0;

/* find all the entries in the window time specified (15 seconds)*/
   /* and if they meet the criteria for the cable or the TX failures*/
   /* then, update the global info about the found blocks.          */ while ((this != NULL) && ((count += this->ticks_to_go) <= window_count))
      {
         if (this->failure_type == cable_failure )
         {
            /*  if a cable failure report   */
            /*  update the count and the    */
            /*  array showing which are the matched entries */
            if (cab_failure_count < ARR_SIZE)      /* check bounds */
            {
               cab_failure_count++;
               *cab_arr_p = (long)this;
               cab_arr_p++;
            }
         }
         else if ( this->failure_type == tx_failure )
         {
            if (temp_node_no == -1)
            {
                temp_node_no = this->node_no;

} if ( this->node_no == temp_node_no )
            {
                /*  if a TX failure report and the node number of the    */
                /*  failure nodes reported are the same , update the count */
                /*  and the array info showing the matched entries.      */ if (tx_failure_count < ARR_SIZE)
                {
```

```
                         tx_failure_count++;
                       * tx_arr_p = (long)this;
                         tx_arr_p++;

}
                }
            } this = this->next;

} /* end of while loop */

} /* get_cable_tx_failures() */

/*********************************************************************
*
*  Function Name    : get_failures()
*
*  File Name        : cfrdf.c
*
*  Function         : This function finds all the entries with the
*                     specified entries in the time window specified
*                     and set up the array with the addresses found.
*
*  Returned Params  : NONE
*
*  Non-Resident Data : cfrdf_head
*
*  Routines Called  :
*
*  Exception Exits  : NONE
*
**********************************************************************/ int get_failures(failure, window_size, array, size )
int failure ;                           /* type of failures to look for  */
int window_size ;                       /* window size in which to look  */
long * array[];                         /* pointers to blocks that match */
int size;                               /* array size                    */
{
    int count = 0;
    PROBLEM* this = cfrdf_head ;        /* first block of linked list    */
    int x = 0;                          /* array index                   */
    int found = 0;                      /* temp counter of number found  */

/*
    ** find all the entries in the window time specified (15 seconds)
    ** and if they meet the criteria for the failure then, update the
    ** global info about the detected failure types.
    */ while ((this != NULL) && ((count += this->ticks_to_go) <= window_size))
    {
        if ( this->failure_type == failure )
        {
            /*  if a failure report matches  */
            /*  update the count and the     */
            /*  array showing which are the matched entries */ if (x < size )
            {
                found++;
                array[x++] = (long*)this;
            }
        }
        this = this->next;

} /* end of while loop */
```

```
      return(found) ;                      /* return the number found    */

} /* get_failures() */

/****************************************************************************
*
* Function Name    : start_cfrdf_timer()
*
* File Name        : cfrdf.c
*
* Function         : This function starts a 3 second IPC timer.
*
* Returned Params  : NONE
*
* Non-Resident Data    : event         (C)
*                        cfrdf_timer_value (C)
*
* Routines Called  : start_time() [o.s]
*                    rel_eve_blk()[nfi_mem.c]
*
*
* Exception Exits  : NONE
*
****************************************************************************/

VOID start_cfrdf_timer()
{
   PROBLEM * this = cfrdf_head;
   PROBLEM * ptr;                   /* temp pointer used by the function */
   struct event_spec event;
   event.efn = TIMEOUT_EVENT ;

if ((cfrdf_timer_value = start_time ( (long)IPC_SECONDS_3, ONE_TIME,
&event))
                    < 0 )
   {
      cfrdf_timer_value = 0;
      recovery_timer = 0;           /* clear the recovery timer and allow */
                                    /* filtered results again             */
#ifdef LOGGER
      logger(0x0050, cfrdf_timer_value);
endif /*
      ** release all the blocks that are currently in the
      ** events linked list. This means a new timer will only
      ** get initiated when a new filtered result gets reported
      ** to the 802-4 master.
      */ while (this != NULL)
      {
         ptr = this;
         this = this->next;
         rel_eve_blk(ptr);
      }
      cfrdf_head = NULL;

}   /* could not get timer */

}/* start_cfrdf_timer() */

/****************************************************************************
*
* Function Name    : print_message()
*
* File Name        : cfrdf.c
*
* Function         : This function is used to send messages to be
*                    printed via the master's sysmon.
*
```

```
*  Returned Params   : NONE
*
*  Non-Resident Data  : my_smon_psap
*
*
*  Routines Called   : send_msg   [ util_804.c]
*                      get_node_lbug() [local]
*                      get_letterbug_id() [SMAS]
*
*  Exception Exits   : NONE
*
******************************************************************/

VOID print_message(message_no, node1, node2)
int message_no ;                 /* effective xcode in the err_cms file */
int node1;                       /* -1 if not used otherwise node number*/
int node2;                       /* -1 if not used otherwise node number*/
{
   char * ptr ;                  /* address of the matched node's letterbug*/
   SM_GENMSG   msg ;             /* message to sent to be printed         */

/*
   ** Fill in the strings with nulls
   */ byte_fill(msg.string1, 0, GEN_MSG_STR_LEN);
   byte_fill(msg.string2, 0, GEN_MSG_STR_LEN);
   byte_fill(msg.src_letterbug, 0, SM_LID_LEN+2);

/*
   ** setup the message to be sent.
   */ msg.ehdr.msg_hdr.msg_type = SM_EVENT_MSG;
   msg.ehdr.event_cmd = SM_EV_GEN_MSG;
   get_letterbug_id(msg.src_letterbug);
   msg.xcode = message_no;
   msg.ssid =  NFD_SUBSYS_804 ;

/*
   ** If the node numbers are valid use them for substitution
   ** in the printed strings.
   */ if (node1 != NODE_NOT_VALID)
   {
      ptr = get_node_lbug(node1);
      if (ptr != NULL)
         byte_copy(ptr, msg.string1, SM_LID_LEN );
   }
   if (node2 != NODE_NOT_VALID)
   {
      ptr = get_node_lbug(node2);
      if (ptr != NULL)
         byte_copy(ptr, msg.string2, SM_LID_LEN );
   }

/*
   ** send the message to the masters system monitor which
   ** facilitates the printing via error report.
   */ send_msg ( &msg, sizeof(SM_GENMSG), my_smon_alias ,&my_smon_psap, NULL, NULL
);
```

}

```c
/******************************************************************
 *
 * Function Name    : perform_recovery()
 *
 * File Name        : cfrdf.c
 *
 * Function         : This function is called when a recovery operation
 *                    is required.
 *
 * Returned Params  : NONE
 *
 * Non-Resident Data : tb_node_data[]
 *
 * Routines Called  : send_msg() [util_804.c]
 *                    sc_tdelay() [o.s]
 *                    ipc_bcast() [o.s]
 *
 * Exception Exits  : NONE
 *
 ******************************************************************/

VOID perform_recovery(failure, send_where, node)
int failure;                    /* the failure to recover from    */
int send_where;                 /* is the recovery for all the    */
                                /* stations or just one station   */
int node;                       /* the node number valid only for */
                                /* single node recovery, otherwise*/
                                /* set to -1.                     */
{
    int count = 2;
    int ret ;
    RECOVER_FROM_FAILURE msg;
    char * ptr = NULL;
    PROBLEM* pointer = cfrdf_head->next ;  /* temp pointer initialized  */
    PROBLEM* temp ;

msg.rec_action.msg_hdr.msg_type = SM_ACTION_RQ_MSG;
    msg.rec_action.action_cmd = SM_ACT_REC_FROM_FAIL;
    msg.failure_type = failure;

/* start the flush window after the recovery is taken    */
    /* Flush for the next 45 seconds                         */ recovery_timer = WIN_45_SEC ;

/*
    ** The test in progress is reset as the test is over. This
    ** is IMPORTANT if the test was initiated manually and for
    ** whatever reason the operator decided to run another one.
    */ test_in_progress = FALSE;

/*
    ** Flush the rest of the data queued up at the master
    ** except for the head entry which gets returned at the top
    ** level.
    */
    while (pointer != NULL)
    {
        temp = pointer->next;
        rel_eve_blk(pointer);
        pointer = temp;

}
    cfrdf_head->next = NULL;

if (send_where == ALL_RECOVER)
    {
```

```
            /*
            **
            ** broadcast to all the LI's and the SLI on this Token Bus.
            ** It is tried twice in the case no resources are
            ** available.
            **
            */ do
            {
                    ret = ipc_bcast( mtbm_alias[0], "INT_SYSTEM",
                        (long)sizeof(RECOVER_FROM_FAILURE),
                        &msg,
                        cfrdf_alias[0],
                        (unsigned int)LOW_SEC_MSG,
                        (unsigned int)( LAN | UPPER_LAYERS));

if (ret == E_NO_RES)
                {
         */         sc_tdelay( (long)ONE_SECOND/2);      /*   wait 1/2 second
                }

}
            while (count-- && ret == E_NO_RES );
    }
    else
    {
        ptr = get_node_lbug (node);

send_msg ( &msg, sizeof(RECOVER_FROM_FAILURE), mtbm_alias[0], NULL, ptr,
                   NULL );

}

} /* perform_recovery() */

/********************************************************************
 *
 *   Function Name       : send_smdh_result()
 *
 *   File Name           : cfrdf.c
 *
 *   Function            : This function is called when SMDH needs to be
 *                         informed about the TB status change.
 *
 *   Returned Params     : NONE
 *
 *   Non-Resident Data   : tb_status (U)
 *                         to_smdh_msg[] (C)
 *
 *   Routines Called     : bcast_msg() [util_804.c]
 *                         byte_copy() [o.s]
 *
 *   Exception Exits     : NONE
 *
 ********************************************************************/
VOID  send_smdh_result(xcode, node1, node2)
int xcode ;                     /* type of failure to report    */
int node1;                      /* node numbers if valid        */
int node2;

{
   char* ptr1;
   char* ptr2;                  /* pointers to get node's letterbugs*/
   int   i;                     /* Loop counter */
```

```
byte_fill(&to_smdh_msg,0,sizeof(SM_NFIRESULT));

/*
**    update the message to be sent
*/ to_smdh_msg.ev_hdr.msg_hdr.msg_type = SM_EVENT_MSG;
to_smdh_msg.ev_hdr.event_cmd = SM_EV_TB_RESULTS;
to_smdh_msg.test_result = xcode;
to_smdh_msg.cable_state = tb_status.cable_status;
to_smdh_msg.fault_flag = tb_status.fault ;

if (node1 != NODE_NOT_VALID)
{
    /* get the letterbug from the tb_node_data held by
    ** the master.
    */ ptr1 = get_node_lbug(node1);
    if (ptr1)
    {
        byte_copy(ptr1, to_smdh_msg.sta_info[0].sta_lbug, SM_LID_LEN);
        to_smdh_msg.sta_info[0].sta_txrx_state =
                                    tb_status.tb_member_stat[node1];
        to_smdh.msg.count++;

}

}
if (node2 != NODE_NOT_VALID)
{
    ptr2 = get_node_lbug(node2);
    if (ptr2)
    {
        byte_copy(ptr2, to_smdh_msg.sta_info[1].sta_lbug, SM_LID_LEN);
        to_smdh_msg.sta_info[1].sta_txrx_state =
                                    tb_status.tb_member_stat[node2];
        to_smdh_msg.count++;

}

}

/*
 * Filling in the rest of the LIs information.

*/ for ( i=0; i < MAX_NODES; i++ )
   {
      if ( tb_node_data[i].sta_lbug[0] != '\0' )
      {
         /* This entry's letterbug is not NULL */ if ( ( tb_node_data[i].node_no != node1 ) &&
              ( tb_node_data[i].node_no != node2 ) )
         {
            /* This entry is not node1 or node2 */ byte_copy ( tb_node_data[i].sta_lbug,
                        to_smdh_msg.sta_info [ to_smdh_msg.count ].sta_lbug,
                        SM_LID_LEN );

to_smdh_msg.sta_info [ to_smdh_msg.count ].sta_txrx_state =
                tb_status.tb_member_stat [ tb_node_data[i].node_no ];

to_smdh_msg.count++;

}   /* if this entry not node1 or node2 */
```

```
       } /* if sta_lbug[0] != '\0' */

}   /* for i=0 to MAX_NODES */

/*
   ** send the message out now to all SMDH's
   */ bcast_msg(SMDH_GLOBAL, "GRAPHIC_DEV",sizeof(SM_NFIRESULT),&to_smdh_msg);

} /* send_smdh_result() */

/***********************************************************************
*
* Function Name     : get_node_lbug()
*
* File Name         : cfrdf.c
*
* Function          : This function searches for the letterbug of the
*                       node provided in the tb_node_data array.
*
* Returned Params   : pointer to letterbug array OR NULL if unsuccessful.
*
* Non-Resident Data : tb_node_data[]
*
* Routines Called   : NONE
*
* Exception Exits   : NONE
*
***********************************************************************/ char* get_node_lbug(node)
int node;
{
   char* ptr = NULL;
   int i ;

for (i = 0; i< MAX_NODES ; i++)
   {
      if (tb_node_data[i].node_no == node)
         ptr = &tb_node_data[i].sta_lbug[0] ;
   }
   return(ptr);
}/* get_node_lbug()  */

/***********************************************************************
*
* Function Name     : set_node_bothcbl()
*
* File Name         : cfrdf.c
*
* Function          : This function searches for the letterbug of the
*                       node provided in the tb_node_data array and sends
*                       a set to normal message to that node. This follows
*                       local cable recovery  which resulted in the master
*                       disagreeing with the node that took local recovery.
*
* Returned Params   : NONE
*
* Non-Resident Data : tb_node_data[]
*
* Routines Called   : get_node_lbug()
*                     send_msg()
*
* Exception Exits   : NONE
*
***********************************************************************/
```

```
set_node_bothcbl(node)
int node ;                    /* node number to set to normal */
{
    char * ptr = get_node_lbug(node);

send_msg( &set_to_normal_msg , sizeof ( MASTER_REQ ),mtbm_alias[0],
            NULL, ptr, NULL);
}
```

Appendix C

Manage Token Bus Master (MTBM)

```
/*****************************************************************************
*                                                                            *
* (C)Copyright by Foxboro Company  1985                                      *
*                                                                            *
* All rights reserved:  Foxboro Company  1985                                *
*                                                                            *
******************************************************************************
*                                                                            *
* FILE ID             : mtbm.c                                               *
*                                                                            *
* PART NUMBER         :                                                      *
*                                                                            *
* FUNCTION            : Maintains a token bus master and handles requests.   *
*                                                                            *
* FUNCTIONS CONTAINED : mtbm_main()                                          *
*                       mtbm_init()                                          *
*                       arm_timer()      starts IPC timer                    *
*****************************************************************************/ include <ipc.sys>
include <comex.sys>
#include "sm_msg.h"
#include <sman.h>
#include <sm_cfgf.h>
#include <om_user.h>
#include <om_ecode.h>
#include "nfi804.h"
#include "mtbm.h"
#include "nfi_coms.h"
#include "nfixcode.h"

#ifdef DEBUG
#include "stubs.h"
extern int stub_retval [MAX_STUBS];       /* For Debugging Only */
endif VOID arm_timer ();

extern unsigned long nfi_mask_table[];  /* mask table interface to comms
                                           to disable comms reports.    */
extern PSAP_ADDR    station_psap_address;/* Global data available to all*/ extern int recovery_timer ;

char       *ap_name = "MTBM";     /* Task name                         */
char       *mtbm_alias[] =             /* List of task's alias names   */
{
```

```
*    ]        "AGNT_INTR",
*             "TBMSTRXXXX"
*    ]        };
*
*    ]        int              master_status = FALSE ;  /* come up as an agent  */
*             int              hb_value = 2 ;           /* HB history variable  */
*    ]        char             nfd4_lid [ SM_LID_LEN + 1 ];  /* my letterbug    */
*             int              my_sta_type;             /* type of station     */
*    ]        PSAP_ADDR        my_psap;   /* This station's PSAP global to this
*                                             station                          */
*             struct chk_clinfo   info;    /* chk_clinfo structure used by IPC */
*             CURRENT_MASTERS_INFO cur_master; /* info about current 802.4 master */
*    ]        int              time_id;   /* id of current timer               */
*             int              test_in_progress = FALSE;
*             int              test_timer; /* number of timeouts left until    */
*                                           /* current test is completed       */
*             int this_station_status = 0; /* defines the current detected     */
*                                           status for this station.           */
*             int mtbm_ids[2];              /* store of the Rx msg id's        */
*
*             int              first_hb = TRUE; /* flag to indicate that       */
*                                           /* TRUE = master's HB not recd     */
*                                           /* FALSE = master's HB received    */
*                                           /*         the first time.         */
*             int     man_test_pending = FALSE ; /* Flag is only set a manual test */
*                                           /* needs to be run later.          */
****
mtbm_:
{            TB_MASTER_HB     my_hbeat =
    /*      {                              /* Token Bus master's heartbeat    */
    *          SM_EVENT_MSG,
    *          SM_EV_TB_HB
               };
PS
ch           MASTER_REQ       set_to_normal_msg =  /* message to set everything to */
in           {                                      normal on the Token Bus    */
in              SM_ACTION_RQ_MSG,
in              SM_ACT_SET_TO_NORMAL
in           };
SM
    /*       char    rx_buf[ SM_MAX_IPC_MSG_SIZE ];  /* receive msg buf        */
    **
    **
    */       /*****************************************************************
              *
while (mtbm_init() != TRUE)     /* register and initialize
{                                  the interface                               */
       sc_tdelay((long)SECONDS_5);
}

/*
**      Arming the 30 second, one shot IPC timer
*/ arm_timer();

/*
**      The main loop
*/ for (;;)
{
    /*
    ** If this station is the master then receive on all aliases
    ** otherwise receive on only one alias.
    */ if ( master_status == I_AM_MASTER)
        alias_count = ALL_ALIASES;
```

```
    else
        alias_count = ONE_ALIAS;
    received_event = receive_msg( alias_count, mtbm_alias, rx_buf,
                                  &rx_psap, mtbm_ids, rx_alias);

if ( received_event == SIN_30SEC_EVENT )
{
    handle_timeout();            /* Process the PC timeout event */
    if ( (man_test_pending == TRUE) && ( recovery_timer == 0))
    {
        man_test_pending = FALSE ;
        snd_rsp = FALSE;           /* make sure no response is sent  */
                                   /* as this is a delayed test after*/
                                   /* recovery has stopped flushing  */
                                   /* errors in the master.          */
                                   /* The action response has already*/
                                   /* been sent out when the request */
                                   /* was received.                  */

/* generate a dummy call just to run the previously requested*/
        /* cable test.                                               */
         proc_tb_user_req((long)0,(long)0, (int)0, snd_rsp);

}
}
else if (received_event > 0)   /* a message event received        */
{
    /* a message has been received */ mes_type = get_type_of_message( rx_buf );
    switch (mes_type)
    {
      case HB_RECEIVED:

handle_hb( rx_buf );
        break;

/* hb received */
      case MASTER_REQ_REC:

/* Checking to see if it is normal already */ this_station_status = 0;    /* setting flags to normal */
        /*
        **
        **      enable all the reports to the comms subsystem. This
        **      makes sure that all reports on both cable are
        **      enabled.
        **
        **
        */
            nfi_mask_table[NOISY_A_INDEX] =
            nfi_mask_table[NOISY_B_INDEX] =
            nfi_mask_table[HB1_A_INDEX] =
            nfi_mask_table[HB1_B_INDEX] =
            nfi_mask_table[HB2_A_INDEX] =
            nfi_mask_table[HB2_B_INDEX] = 0xFFFFFFFF;

/* Tell local comms to
                                       Txmit cable HB's on both
                                       cables and turn all RXvers
                                       on.                      */
            to_local_comms( BACK_TO_NORMAL );

break;
```

```
                /* master request received */

/*
         * Token Bus User request
         *
         */ case TB_USER_REQ:
                rx_ident_ptr = (SM_ACTION_HDR*)&rx_buf[0];
                snd_rsp = TRUE;
                /* User request to RUN a TB test */
                proc_tb_user_req(&rx_psap, rx_alias,rx_ident_ptr->msg_ident,
snd_rsp);
                break;

/*
         * Recover from a failure command
         *
         */ case RECOVER_FROM_FAIL:

rec_from_fail( rx_buf );  /* Master's request to ask this
                                             station to recover from a failure */
                break;

case SMDH_REQUEST:

send_smdh_data(&rx_psap, rx_alias); /* send to the requesting
SMDH*/
                break;                              /* the Token Bus info.     */

/* smdh request */ case NO_LONGER_MASTER:

relinquish_mastership ( rx_buf );
                break;

/* giveup mastership */ default:
                err_rpt(NFD_SUBSYS_804,NFI_MTBM_UNKWN_MSG, ap_name,
                    (char*) NULL);

break;
            }
        }  /* else */

}  /* for ;; */

}  /* mtbm main */

/**********************************************************************
 *
 *   Function Name    : mtbm_init()
 *
 *   File Name        : mtbm.c
 *
 *   Function         : registers the AGNT_INTR alias with the IPC.  Determine
 *                      the LAN ID and the NODE ID of this station and update
 *                      the XXXX field of the alias array.
 *
 *   Returned Params  : TRUE if register and activate was successful,
 *                      otherwise returns FALSE.
 *
 *   Non-Resident Data : my_hbeat     (C)
 *                       nfd4_lid[]   (C)
 *                       station_psap_address (U)
```

```
*                        mtbm_alias (U)
*                        ap_name (C)
*                        my_sta_type (C)
*                        mtbm_ids (C)
*
*   Routines Called   : byte_copy()
*                        cs_register()
*                        cs_activate()
*                        get_86_sta_type()
*
*   Exception Exits   : None.
*
**********************************************************************/
int mtbm_init()
{ int         retval = FALSE;       /* return status     */
   char        *temp_ptr = NULL;
   int         error ;               /* internal status   */

/*
   ** get the letterbug.
   **
   */
   get_letterbug_id( nfd4_lid );

/*
   **    setup the variable fields of the ALIAS
   **
   */ temp_ptr = mtbm_alias[ UNIQUE_ALIAS ] + FIRST_X_CHARACTER ;    /* points to
the first X character */
   byte_copy( &station_psap_address.nsap_address[SITE_ID], temp_ptr, 2 );
   temp_ptr += 2;
   byte_copy( &station_psap_address.nsap_address[LAN_ID], temp_ptr, 2 );

/*
   **       Register and activate the aliases
   */ if ( ( error = cs_register( ap_name,
                               ONE_ALIAS,
                               mtbm_alias,
                               CDT,
                               1,
                               0 ) ) == CALL_COMPLETE )
   {
      if( ( error = cs_activate( ap_name, CDT ) )== CALL_COMPLETE )
      {
          retval = TRUE ;
      }

}
   else if ( error == E_UE_EXISTS )
   {
      if( ( error = cs_activate( ap_name, CDT ) )== CALL_COMPLETE )
      {
          retval = TRUE ;
      }
   } byte_copy ( nfd4_lid, my_hbeat.mlbug, SM_LID_LEN+1 );

/*
   **       Setup the masterbeat information for when this station
   **       becomes the master.
   */ my_sta_type = get_86_sta_type();
   my_hbeat.station_type = my_sta_type;
```

```
    /* initialize the message id array to be used for receives   */
    mtbm_ids[0] = mtbm_ids[1] = -1 ;
    return(retval);
}   /* mtbm_init */

/***********************************************************************
 *
 *    Function Name      : arm_timer()
 *
 *    File Name          : mtbm.c
 *
 *    Function           : Arms the thirty second, one shot timer.
 *
 *    Returned Params    : none.
 *
 *    Non-Resident Data  : event     (C)
 *                         time_id   (C)
 *                         ap_name   (U)
 *
 *    Routines Called    : start_time()
 *                         sc_tdelay()
 *
 *    Exception Exits    : None.
 *
 ***********************************************************************/
VOID arm_timer()
{ int count = 2;                     /* retry count                 */
    struct event_spec event;

event.efn = SIN_30SEC_EVENT ;      /* Timer event only            */
    while ( (time_id = start_time( (long)IPC_SECONDS_30, ONE_SHOT, &event )) ==
            E_NO_RES && count-- > 0)
    {
        sc_tdelay ( (long)(ONE_SECOND/2) );
    }
    if (time_id < 0)
    {
        err_rpt(NFD_SUBSYS_804, NFI_TIMER_INVOC_FAILED, ap_name,
                                (char*) NULL);
        time_id = 0;
    }

}   /* arm_timer */

/***********************************************************************
 *
 *    Function Name      : get_86_sta_type
 *
 *    File Name          : util_804.c
 *
 *    Function           : This function gets the station type from the
 *                         rom vault. It is used only in the LI stations.
 *
 *    Returned Params    : station type
 *
 *    Non-Resident Data  : NONE
 *
 *    Routines Called    : NONE
 *
 *
 *    Exception Exits    : None.
 *
 ***********************************************************************/
int get_86_sta_type ()
{
```

```
    union  phys_2_addr
    {
       unsigned  int   seg_off [2] ;
       int             *ptr ;
    } addr ;

/*
     * ROMVAULT address of station type
     */ addr.seg_off [0] = 6 ;
    addr.seg_off [1] = 0xfffa ;

return (*addr.ptr) ;
}
```

Appendix D

Node Bus Isolation Task (NBIT)

```
/****************************************************************************
 *
 * (C)Copyright by Foxboro Company, 1990
 *
 * All rights reserved:  Foxboro Company, 1990
 *
 ****************************************************************************
 *
 *  FILE ID.... : nbit.c
 *
 *  PART NUMBER : #####
 *
 *  FUNCTION... : This module contains the main loop for the NBIT task
 *                and the top level routines for the task.
 *
 *  FUNCTIONS CONTAINED :
 *
 *                       nbit_main()
 *                       init_nbit()
 *                       process_unresolved()
 *                       process_bband_request()
 *                       process_nb_results()
 *                       process_timeout()
 *                       no_longer_master()
 ****************************************************************************/
#include <comex.sys>
#include <ipc.sys>
#include "sm_msg.h"
#include <sman.h>
#include <sm_cfgf.h>
#include <om_user.h>
#include <om_ecode.h>
#include "nfi804.h"
#include "nbit.h"
#include "nfd.h"
#include "nfixcode.h"
#include "nfi_coms.h"
```

```
#ifdef DEBUG
#include "stubs.h"
extern stub_retval[];
endif extern   BOOLEAN  utl_same_psap();      /* to compare psaps              */
extern   unsigned long  mbx_nbit;       /* nbit interface mailbox        */

/*
**    Globals for this task .
*/ char         *nbit_name = "NBIT";       /* Task name for the nbit task   */
                                        /* unique alias for this task    */
char         *nbit_alias[] = {"NFI_NBXXXX"};
long          event_mask = 0;
int           nbit_ids[1] ={ -1};       /* initialize the receive msg id's */
int           nbit_master ;             /* flag used by this task        */ struct event_spec event;

char         nbit_rxbuf [ SM_MAX_IPC_MSG_SIZE ];/* receive message buffer
*/

/*
     **  The array of 100 entries of NODE_DETAIL structures to manage
     **  the filtering for cable and master failure modes on the nodebus.
     **  The particular node entry is determined by the node number
     **  anything from 0 to 99 node number.
     */

NODE_DETAIL   nodes_info[NUM_LIMIT_ON_NODES] ;

/*
**    Timer indentification for the IPC timer.
**
*/ int nbit_timer_value = 0;

/*
 *   the following is the nb_resolve data created  to be used to place the
 *   UNRESOLVED SITUATION REPORTED to TB master by the nodebus master.
 */

NB_RESOLVE_STATUS     nb_resolve ;

/*
**  test history data kept for the tests initiated on the nodebuses
*/

TEST_HISTORY    nb_history;

int unknwn_msg_count  = 0;          /* count of unknown messages recvd */
                                        /* generally are responses from NB */
                                        /* master when it rejects the req  */

VOID process_timeout ();            /* Function return types */
    VOID process_unresolvd ();
    VOID process_nb_results ();
    VOID is_it_src_or_dest ();
    VOID no_longer_master ();
    BOOLEAN start_ipc_fil_timer ();
    NB_PROBLEM_RECORD *add_to_work_list ();

extern PSAP_HISTORY *get_phist_blk ();      /* External function type */
```

```
/******************************************************************
 *
 *   Function Name     : nbit_main()
 *
 *   File Name         : NBIT.C
 *
 *   Function          : This is the entry point to the task.  It is
 *                       only active in the master station( LI or the SLI).
 *
 *   Returned Params   : None.
 *
 *   Non-Resident Data : nbit_alias[]
 *                       nbit_rxbuf[] (C)
 *                       nbit_ids[]   (C)
 *                       mbx_nbit     (C)
 *
 *   Routines Called   : process_unresolved() [local]
 *                       process_bband_req()  [local]
 *                       process_NB_results() [local]
 *                       process_timeout()    [local]
 *                       no_longer_master()   [local]
 *                       register_alias()     [local]
 *                       sc_pend()            [o.s]
 *                       sc_tdelete()         [o.s]
 *                       err_rpt()            [o.s]
 *                       receive_msg()        [util_804.c]
 *                       get_type_of_message()[util_804.c]
 *
 *   Exception Exits   : None.
 ******************************************************************/ nbit_main()

{ int    rec_event;            /* received events              */
   PSAP_ADDR  snd_psap;         /* senders  psap info.          */
   int    mes_type;             /* type of received message     */
   int    err = 0;
   char   rx_alias[IPC_NAME_LEN];

/*
   ** setup the variable portion of the alias name
   */ byte_copy ( &station_psap_address.nsap_address[SITE_ID],
               &nbit_alias[0][ FIRST_X_CHARACTER ], SITE_ID_LEN );
   byte_copy ( &station_psap_address.nsap_address[LAN_ID],
               &nbit_alias[0][ FIRST_X_CHARACTER + SITE_ID_LEN ], LAN_ID_LEN);
   /*
   ** Forever loop begins here.
   */ for (;;)
   {
      /*
      ** wait to awakened when this node becomes the master node.
      */ sc_pend(&mbx_nbit, 0L, &err );

if ((register_alias ()) == FALSE)
      {
        /* unable to register with IPC , therefore this task cannot
           run.                                                     */ nbit_master = FALSE;
      }
      else
      {
```

```
        nbit_master = TRUE;

while (nbit_master == TRUE)
        {
        /*  initiate the receives of messages or the Timeout condition if
            it exists.                                                   */ rec_event = receive_msg ( ONE_ALIAS, nbit_alias, nbit_rxbuf,
                                      &snd_psap, nbit_ids, rx_alias );

if ( rec_event == TIMEOUT_EVENT )
            {
                process_timeout();
            }   /* if event is IPC timeout */
            else if (rec_event == MESSAGE_EVENT)
            {
                mes_type = get_type_of_message ( nbit_rxbuf );
                switch ( mes_type )
                {
                    case NO_LONGER_MASTER :
                        no_longer_master();
                        break;

case UNRES_SITUATION :
                        process_unresolvd(nbit_rxbuf) ;
                        break;

case BBAND_REQ_REC :
                        process_bband_req(nbit_rxbuf);
                        break;

case NB_RESULT:
                        process_nb_results(nbit_rxbuf);
                        break;

case UNKNOWN_MSG :
/*                          err_rpt(NFD_SUBSYS_804, NFI_NBIT_UNKNOWN_MESG,
nbit_name,
                                                (char*) NULL);   */
                        unknwn_msg_count++;
                        break;
                    default:
                        break;
                }   /* switch */
            }   /* else message receives successfully */
        } /* while nbit_master */
        }/* else successfully registered */

}   /* for (;;) */

}   /* nbit_main() */

/******************************************************************
*
*   Function Name   : process_timeout()
*
*   File Name       : nbit.c
*
*   Function        : Updates all the node entries in the nodes_info array
*                     and kicks off a new 15 second timer if there are
*                     still records with timers set.
*
*   Returned Params : None.
*
*   Non-Resident Data : nodes_info[] (C)
*                       nbit_name    (U)
*
*   Routines Called : start_ipc_fil_timer()
*                     err_rpt()   [E.P]
```

```
*
*    Exception Exits    : None.
*
************************************************************/
VOID process_timeout ()
{
    int  index;                        /* index into nodes_info array */
    int  outstanding_timers = FALSE;/* True if records with outstanding
                                    timers                         */

/*
    *      Work through the array of structures to update the
    *      filter timeout condition for each nodebus. The master
    *      status and the cable status is checked and updated.
    *      If the time has expired for all the filter that were
    *      started, then no more IPC timeouts are invoked.
    */ nbit_timer_value = 0;              /* clear the timer value.      */ for ( index = 0; index < NUM_LIMIT_ON_NODES; index++ )
    {
        /* Checking cable timeout condition */ if ( nodes_info [ index ].cable_time > NO_OUTSTANDING_TIMER )
        {
            /*
            ** count down the cable filter time.
            */ nodes_info [ index ].cable_time--;
            if ( nodes_info [ index ].cable_time == NO_OUTSTANDING_TIMER )
            {
                nodes_info [ index ].nb_cab_stat = NODE_CABLE_OK;
            }
            else
            {
                outstanding_timers = TRUE;
            }
        }

/* Checking down master timeout condition */ if ( nodes_info [ index ].mstr_time > NO_OUTSTANDING_TIMER )
        {
            nodes_info [ index ].mstr_time--;
            if ( nodes_info [ index ].mstr_time == NO_OUTSTANDING_TIMER )
            {
                nodes_info [ index ].nb_mst_stat = NODE_MASTER_OK;
            }
            else
            {
                outstanding_timers = TRUE;
            }
        }

}  /* for index */

/*
    ** If any timers are outstanding then start a new timer.
    */ if ( outstanding_timers == TRUE )
    {
        if (start_ipc_fil_timer() != TRUE)
            err_rpt(NFD_SUBSYS_804,NFI_TIMER_INVOC_FAILED, nbit_name,
                    (char*) NULL);
    }
```

} /* process_timeout() */

/****************************************************************
 *
 * Function Name     : register_alias
 *
 * File Name         : nbit.c
 *
 * Function          : registers and activaties the Nodebus Isolation
 *                     Task's unique alias.
 *
 * Returned Params   : returns TRUE if successful, FALSE if an error
 *                     occurred.
 *
 * Non-Resident Data : nbit_alias     (U)
 *                     nbit_name      (U)
 *
 * Routines Called   : cs_register() [IPC]
 *                     cs_activate() [IPC]
 *
 * Exception Exits   : NONE
 *
 ****************************************************************/
int register_alias()
{ int value;
    int retries_count = 0;
    int retval = FALSE;
    int error ;

if ( ( error = cs_register( nbit_name,
                                ONE_ALIAS,
                                nbit_alias,
                                CDT,
                                0,
                                0)) == CALL_COMPLETE  )
    {
        if( ( error = cs_activate( nbit_name, CDT ) )== CALL_COMPLETE )
        {
    /*
     * keep trying to object create until it works or the maximum nuber of
     * retries has been exceeded
     */
            while ( ( ( value = obj_create ( nbit_alias[ 0 ],   /* Registering the
unique */
                                    PROCESS,            /* master alias with the
*/
                                    STRING,             /* world */
                                    NBIT_ALIAS_SIZ ) ) != OM_SUCCESS ) &&
                    ( retries_count++ < MAX_NUM_RETRIES ) )
            {
                sc_tdelay ((long)ONE_SECOND );
            } /* while */ if ( value == OM_SUCCESS )

{
                retval = TRUE ;
            } /* if object_create was good */
            else
            {
                err_rpt(NFD_SUBSYS_804,NFI_M_OBJ_CREATE_FAILED, nbit_name,
                            (char*) NULL);
                cs_unregister( nbit_name , CDT);
            } /* object create was bad  */
```

}

}
        return(retval);

}    /* register_alias() */

/************************************************************************
 *
 *    Function Name     : process_unresolvd()
 *
 *    File Name         : nbit.c
 *
 *    Function          : This function filters the received request and
 *                        determines if it is a new request. If so, it
 *                        initiates the of the testing of the dest path.
 *
 *    Returned Params   : NONE
 *
 *    Non-Resident Data : nb_resolve
 *                        nodes_info
 *                        nbit_timer_value (U)
 *
 *    Routines Called   : add_to_work_list() [nbit_utl.c]
 *                        filter_req()            ""
 *                        send_req_to_nbm()       ""
 *                        unlink_nb_blk()         ""
 *                        rel_nb_blk()       [nfi_mem.c]
 *                        start_ipc_fil_time() [local]
 *                        sc_gtime()         [o.s]
 *                        update_nodes_info() [nbit_utl.c]
 *
 *    Exception Exits   : None.
 ************************************************************************/

VOID process_unresolvd(msg)

UNRESOLVED_SITUATION *msg;
{
    NB_PROBLEM_RECORD *  ptr ;

/* if a new request received    */
    if ( filter_req(msg) == TRUE )
    {

/* Check to see that the oldest is deleted if the limit is */
    /* is reached.                                             */ if (nb_resolve.total_entries == MAX_ALLOWED )
        {
            ptr = nb_resolve.last_entry;
            unlink_nb_blk(ptr);
            rel_nb_blk(ptr);

}

/*
     * If the total entries are less than the MAXIMUM allowed  *
     *
     *                                                         */
        if (nb_resolve.total_entries  < MAX_ALLOWED )
        {
            if((ptr = add_to_work_list(msg)) != NULL)
                {
                if ( send_req_to_nbm( &(ptr->dest_psap) ) > 0)
                {

/*                                              */
                    /* setup the status data in the work list       */
                    /*                                              */
                    ptr->dest_time = sc_gtime();
                    ptr->req_master_type = NBMASTER;
                    ptr->dest_status = RUNNING_VALIDATION ;

```
            }
        else
        {
            /*                                                          *
             *      Drop the request as we are unable to talk to that   *
             *      Nodebus master. Release the block to the free pool. *
             *      It is unused. Setup the filter condition for the    *
             *      down nodebus master. Start a timer so that the      *
             *      filter can be disabled at the end of the timeout    *
             *      period.                                             *
             *                                                          *
             *                                                          *
             *      If no timer exists start a timer and update the     *
             *      timeout values in the relevent nodes_info entry     *
             *                                                          */ update_nodes_info (
                NODE_ASCII2INT(&(ptr->dest_psap.nsap_address[NODE_ID])),
                UPDATE_MASTER, DOWN );

/*
            **  unlink the block from the list and release it.
            */ unlink_nb_blk(ptr);
            rel_nb_blk(ptr);

} /* send to NB master failed */

} /* add to work list returns null pointer */
    } /* total   entries < MAX    */

} /* if filter_req() true  */

} /* process_unresolvd() */

/************************************************************************
 *
 *    Function Name      : process_nb_results()
 *
 *    File Name          : nbit.c
 *
 *    Function           : This function is invoked when a nodebus master
 *                         sends a result of a test to the Token bus master.
 *                         It sets the necessary filters if needed and
 *                         determines if any more paths need to be tested.
 *
 *
 *    - Update TEST_HISTORY data.
 *    - Determine Type of failure
 *    --         If (cable failure detected)
 *                    start a filter timer for 2 minutes
 *                    start a 15 seconds Repetative timer
 *                    update the node entry in the array "nodes_info"
 *                        (with the count of Number of timeouts left to
 *                         the endof the condition (cable_time).Update
 *                         nb_cab_stat to the failure reported.
 *
 *    --         Else do nothing
 *
 *    - If (Result received was from the SRC path)
 *           remove entry from NB_RESOLVE_STATUS
 *           Return memory to free pool.
 *    - Else
 *
 *           Determine if SRC path needs to be tested(is_src_test_needed)
 *           and initiate testing if necessary.
 *
 *    - FI
 *
 *
 *    Returned Params    : NONE
```

```
*
*     Non-Resident Data  : nb_history (C)
*                          nodes_info (C)
*                          nbit_timer_value(U)
*
*     Routines Called    : is_src_test_needed()   [nbit_utl.c]
*                          rel_nb_blk()           [nfi_mem.c]
*                          start_ipc_fil_time()   [local]
*                          byte_copy()            [ O.S.]
*                          rel_phist_blk()        [ nfi_mem.c]
*                          send_req_to_nbm()      [nbit_utl.c]
*                          sc_gtime()             [O.S]
*                          get_phist_blk()        [nfi_mem.c]
*                          unlink_nb_blk()        [nbit_utl.c]
*                          is_it_src_or_dest()    [nbit_utl.c]
*                          update_nodes_info()    [nbit_utl.c]
*
*
*     Exception Exits    : None.
***********************************************************************/

VOID process_nb_results(msg)
SM_803_RES * msg ;
{

PSAP_HISTORY * ptr, *temp;
                                        /* locations that contain the found
                                           record of the source path match   */
    NB_PROBLEM_RECORD* src_path = NULL;
                                        /* locations that contain the found
                                           record of the dest path match     */
    NB_PROBLEM_RECORD* dest_path = NULL;

if ((ptr = get_phist_blk()) != NULL)
    {
        byte_copy( &(msg->sta_psap), &(ptr->psap), sizeof(PSAP_ADDR));
        ptr->ret_status = msg->sta_txrx_state | msg->cable_state;

/*
        **
        **      setup the linked list for the psap history
        **
        */ ptr->next = nb_history.first;
        if (ptr->next != NULL)              /* If not last in list */
            ptr->next->prev = ptr;
        nb_history.first = ptr;
        if (nb_history.last == NULL)        /* If last not yet set */
            nb_history.last = ptr;
        ptr->prev = NULL;                   /*  as the first in the list  */
        ptr->time_detected = sc_gtime();    /* And get the time */

/*
        **   If the number of history elements exceeds the limit of 39
        **   then delete the last one in the list( the oldest).
        **   Return the block to the free pool, adjust the count and perform the
        **   necessary linking of the blocks.
        **
        */ if ((++nb_history.total_no) >= MAX_NO_PSAP_HIST){
            temp = nb_history.last;
            nb_history.last = temp->prev;
            temp->prev->next = NULL;
            rel_phist_blk(temp);
            (nb_history.total_no)-- ;
        }
    } /*  if (get phistory block was success)  */ if (msg->cable_state != 0)
```

```
{
    /*                                                              *
     *    The cable failure is detected and so a filter must        *
     *    be enabled. Start a timer so that the                     *
     *    filter can be disabled at the end of the timeout          *
     *    period.                                                   *
     *                                                              */
    update_nodes_info (
        NODE_ASCII2INT(&(msg->sta_psap.nsap_address[NODE_ID])), UPDATE_CABLE, msg->cable_state );
}
/*
**  find out if this is the response from a SRC path test.
**  If the SRC path result is received then delete the entry
**  from the nb_resolve list as the testing for that reported
**  problem has been completed. Otherwise determine if the SRC
**  path has to be validated ( initiates the testing for the SRC
**  path if necessary ).
**
*/
is_it_src_or_dest(msg, &src_path, &dest_path);

if (src_path)
{
    /*
    ** SOURCE PATH has been validated so release the block
    ** to the free pool.
    */
    unlink_nb_blk(src_path);
    rel_nb_blk(src_path);
}
else if (dest_path)
{

/*
    **    DESTINATION path was validated.
    **    Determine if the SRC path needs to be validated.
    **    If so send the request to the SRC psap and update the
    **    status data held.
    */
    dest_path->dest_status = DONE_TESTING;

if (is_src_test_needed( &(msg->sta_psap),
                      (msg->cable_state | msg->sta_txrx_state)))
    {
        if ( send_req_to_nbm( &(dest_path->src_psap) ) > 0 )
        {

/*                                               */
            /* setup the status data in the work list        */
            /*                                               */
            dest_path->src_time = sc_gtime();
            dest_path->req_master_type = NBMASTER;
            dest_path->src_status = RUNNING_VALIDATION ;
        }
        else
        {
            /*                                                            *
             *    Drop the request as we are unable to talk to that       *
             *    Nodebus master. Release the block to the free pool.     *
             *    It is unused. Setup the filter condition for the        *
             *    down nodebus master. Start a timer so that the          *
             *    filter can be disabled at the end of the timeout        *
             *    period.                                                 *
             *                                                            */

/*
            ** update the node_info table to say that the master was
            ** inaccessible.
            */
```

```
        update_nodes_info (
            NODE_ASCII2INT(&(dest_path->src_psap.nsap_address[NODE_ID])),
            UPDATE_MASTER, DOWN );

/*
        ** remove the block from the resolve list and
        ** free up the memory.
        */ unlink_nb_blk(dest_path);
        rel_nb_blk(dest_path);

} /* send_req_to_nbm */

} /* if is_src_test_needed   */
    else
    {
       /*  drop the entry as the SRC path does not need to be
       **  validated. i.e done with the testing.
       */ unlink_nb_blk(dest_path);
       rel_nb_blk(dest_path);
    }

} /* if src path */

} /* process_nb_results() */

/****************************************************************************
 *
 *  Function Name      : process_bband_req()
 *
 *  File Name          : nbit.c
 *
 *  Function           : TBD
 *
 *  Returned Params    : TBD
 *
 *  Non-Resident Data  : TBD
 *
 *  Routines Called    : TBD
 *
 *  Exception Exits    : TBD
 *
 ****************************************************************************/
process_bband_req(msg)
char* msg ;
{
   /*
   ** Currently no such message is implemented. When this message
   ** exists, this function will be updated. At the moment it return
   ** without any action taken. This function will be implemented when
   ** the broadband is introduced.
   **
    NOTE: Should never be invoked.*****
   */

} /* process_bband_req() */

/****************************************************************************
 *
 *  Function Name      : is_it_src_or_dest()
 *
 *  File Name          : nbit.c
 *
 *  Function           : This function determines if the result from the
 *                       nodebus master is from the src path validation
 *                       or the destination path validation.
 *
```

```
*
*
*   Returned Params     : Address of NB_PROBLEM_RECORD either in the
*                         src_path or the dest_path parameters passed
*                         to this function.
*
*   Non-Resident Data : nb_resolve (U)
*
*   Routines Called     : utl_same_psap() [utl_main.c in comms subsystem]
*
*   Exception Exits    : None.
*
****************************************************************/

VOID is_it_src_or_dest(rec_msg, src_path, dest_path)
SM_803_RES*  rec_msg;
NB_PROBLEM_RECORD **  src_path;
NB_PROBLEM_RECORD **  dest_path;
{ int count = nb_resolve.total_entries;     /* temp counter          */
    NB_PROBLEM_RECORD * res_ptr = nb_resolve.first_nb_rec;

while (count > 0  && ( res_ptr != NULL) )
    {
        count--;

/*
        ** if it is the src path being validated, check that the same psaps
        ** are involved. If so, it is the response for this test
        ** and completes the search.
        */ if (res_ptr->src_status)
        {
            if ((utl_same_psap(&(rec_msg->sta_psap), &(res_ptr->src_psap))) ==
TRUE)
            {
                *src_path = res_ptr ;
                break;
            }
        }
        else if (res_ptr->dest_status)
        {
            if ((utl_same_psap( &(rec_msg->sta_psap), &(res_ptr->dest_psap)))
== TRUE)
            {
                *dest_path = res_ptr ;
                break;
            }

}
        res_ptr = res_ptr->nxt_entry;
    } /* while() */

} /* is_it_src_or_dest() */

/****************************************************************
*
*   Function Name      : start_ipc_fil_time()
*
*   File Name          : nbit.c
*
*   Function           : This function starts a 15 second IPC timer.
*                        If it is unable to do so due to out of resource
*                        then it clears all counts so that no more timers
*                        will be enabled. Another attempt will be made to
*                        start the timer when another situation requires it.
*
*   Returned Params    : TRUE if successful; nbit_timer_value is then valid.
*                        FALSE if unsuccessful; nbit_timer_value is = 0.
```

```
*    Non-Resident Data  : event (C)
*                         nbit_timer_value (C)
*
*    Routines Called    : start_time()  [IPC]
*                         byte_fill()   [ O.S ]
*
*
*    Exception Exits    : None.
*
**********************************************************************/

BOOLEAN start_ipc_fil_timer()
{
   BOOLEAN ret = TRUE;

event.efn = TIMEOUT_EVENT ;

nbit_timer_value = start_time ( (long)DELAY_15_SEC, ONE_TIME, &event );
   if ( nbit_timer_value < 0 )
   {
     /*
      * The timer could not be started.  This error is handled by
      * byte filling the nodes_info array to all zeros. Stops all
      * existing timers.
      */ byte_fill ( &nodes_info[ 0 ],
             0,
             NUM_LIMIT_ON_NODES * sizeof ( NODE_DETAIL ) );
      nbit_timer_value = 0;
      ret = FALSE;

}   /* could not get timer */ return(ret);

} /* start_ipc_fil_time() */

/**********************************************************************
*
*    Function Name      : no_longer_master()
*
*    File Name          : nbit.c
*
*    Function           : This function is called when this node is no longer
*                         the master and the NBIT task will unregister the
*                         the global alias used by the task.
*
*
*    Returned Params    : NONE
*
*    Non-Resident Data  : nb_resolve, nbit_alias[], nbit_ids[]
*                         nbit_master
*
*    Routines Called    : rel_nb_blk() [nfi_mem.c]
*                         obj_delete() [O.M.]
*                         cl_cancel()  [IPC]
*
*    Exception Exits    : None.
*
**********************************************************************/

VOID no_longer_master()
{
   NB_PROBLEM_RECORD * ptr = nb_resolve.first_nb_rec ;
   NB_PROBLEM_RECORD * temp_ptr;
```

```
    obj_delete(nbit_alias[0], PROCESS);
/*
** If there is an outstanding receive for this alias, then
** cancel that receive.
*/
if (nbit_ids[0] > 0)
{
   cl_cancel(nbit_alias);
}

/*
 *      Release all the collected allocated blocks to the free pool
 *
 */
while( ptr != NULL )
{
   temp_ptr = ptr;
   ptr = ptr->nxt_entry;
   rel_nb_blk(temp_ptr);         /* release to the free pool   */
}

/*    cleanup the header pointer block   */ nb_resolve.first_nb_rec = nb_resolve.last_entry = NULL;
nb_resolve.total_entries = 0;

nbit_master = FALSE;

/*
** Do not use IPC till it becomes the master again.
*/
if (nbit_timer_value > 0)
{
   stop_time(nbit_timer_value);
   nbit_timer_value = 0;
} cs_unregister( nbit_name, CDT);

/*
**    cleanup the nodes info array
*/ byte_fill ( &nodes_info[0], 0,
            NUM_LIMIT_ON_NODES * sizeof(NODE_DETAIL));
} /* no_longer_master */
```

The invention claimed is:

1. In a local area network having (i) a token bus formed of redundant cables and (ii) a plurality of modules connected to the token bus, a method of detecting and recovering from faults comprising the steps of:
with each module, periodically transmitting heartbeat signals on each redundant cable of the token bus at a predetermined periodic rate;
with each module, monitoring the periodic heartbeat signals on each redundant cable of the token bus, each module being adapted to receive on each of said cables every periodic heartbeat signal from other modules connected to the token bus;
indicating a fault when the heartbeat signals fail to be received at the predetermined periodic rate; and
initiating a fault recovery action.

2. The method of claim 1 wherein the local area network is a token passing local area network.

3. The method of claim 1 further comprising the step of selecting a master module from among the modules and wherein the step of indicating a fault comprises each module reporting errors to the master module.

4. The method of claim 1 further comprising the steps of:
nominating a module to serve as a master module, all of the modules being agent modules; and
with the master module, transmitting master heartbeat signals to the agent modules at a predetermined periodic rate.

5. The method of claim 1 wherein the step of indicating a fault includes indicating a network trunk cable fault.

6. The method of claim 1 wherein the step of indicating a fault includes indicating a module drop cable fault.

7. The method of claim 1 wherein the step of indicating a fault includes indicating a network trunk cable discontinuity.

8. The method of claim 1 wherein the step of indicating a fault includes indicating a module drop cable discontinuity.

9. The method of claim 1 wherein the step of indicating a fault includes indicating excessive cable noise.

10. The method of claim 1 wherein the step of indicating a fault includes indicating a failure of a token bus transmitter in a module.

11. The method of claim 1 wherein the step of indicating a fault includes indicating a failure of a token bus receiver in a module.

12. The method of claim 1 wherein at least one module interfaces the local area network to a subsystem, said subsystem comprising (i) a node bus and (ii) a plurality of devices connected to the node bus, said devices communicating with each other and the at least one module via the node bus.

13. The method of claim 1 wherein the step of indicating a fault comprises:
nominating a module to serve as a master module, all of the modules being agent modules, said agent modules reporting errors to the master module when the heartbeat signals fail to be received at the predetermined periodic rate; and
with the master module, determining when a network fault exists based on errors reported by the agent modules.

14. The method of claim 13 further comprising the step of transmitting with the master module master heartbeat signals to the agent modules at a predetermined periodic rate.

15. The method of claim 13 wherein the nominating step comprises:
assigning to each module a unique identifying character having an ordered priority value; and
selecting the module with the identifying character having the highest priority value to be the master module;
selecting the module with the character having highest priority value identifying to be the master module.

16. The method of claim 13 wherein the agent modules report errors to the master module according to a set of agent rules.

17. The method of claim 16 wherein the step of the master module determining existence of a network fault further comprises the master module applying a set of the master rules to error reports from the agent modules to determine that a fault exists.

18. The method of claim 13 wherein the step of the master module determining existence of a network fault further comprises the master module applying a set of master rules to error reports from the agent modules to determine that a fault exists.

19. The method of claim 13 wherein the step of initiating a fault recovery action comprises commanding with the master module at least one agent module to take at least one corrective action.

20. The method of claim 13 wherein at least one module interfaces the local area network to a subsystem, said subsystem comprising (i) a node bus and (ii) a plurality of devices connected to the node bus, said devices communicating with each other and the at least one module via the node bus.

21. The method of claim 20 wherein:
one of the devices on each node bus is a master device for receiving error reports from the other devices on the node bus; and the step of indicating a fault further comprises determining if a fault exists on the node bus and reporting node bus faults to the master module on the token bus.

22. In a local area network having (i) a token bus formed of redundant cables and (ii) a plurality of modules connected to the token bus, a method of detecting and recovering from faults comprising the steps of:
nominating one of the modules to serve as a master module, all of the modules being agent modules;
with each agent module, transmitting heartbeat signals on each redundant cable of the token bus at a predetermined periodic rate;
with each agent module, monitoring the periodic heartbeat signals on each of said redundant cables, each agent module being adapted to receive on each of said cables every periodic heartbeat signal from all other agent modules connected to the token bus;
with each agent module, determining when errors occur based on the monitored heartbeat signals;
with each agent module, transmitting an error message to the master module when an error occurs;
with the master module, monitoring the error messages received from the agent modules;
with the master module, determining if a network fault exists based on the monitored error messages; and
when a network fault is determined to exist, initiating a fault recovery action.

23. The method of claim 22 further comprising the steps of:
with the agent modules, applying a set of agent rules to the monitored heartbeat signals to determine if an error exists; and
with the master module, applying a set of master rules to the error messages to determine if a network fault exists.

24. A local area network with fault detection and recovery comprising:
a plurality of modules;
a token bus having redundant cables connecting the modules;
in each module, at least one transmitter periodically transmitting heartbeat signals on each redundant cable of the token bus at a predetermined periodic rate;
in each module, at least one receiver adapted to receive every heartbeat signal on each said cable from all other modules; and
in each module, means for monitoring the periodic heartbeat signals on each said cable, said means for monitoring including means for indicating a fault when the heartbeat signals fail to be received at the predetermined periodic rate.

25. The local area network of claim 24 wherein the local area network is a token passing local area network.

26. The local area network of claim 24 wherein the modules report errors to a module serving as a master module, said master module having been nominated from among the modules.

27. The local area network of claim 24 wherein a module nominated from among the modules to serve as a master module transmits master heartbeat signals to the modules at a predetermined periodic rate.

28. The local area network of claim 24 wherein the means for indicating includes modules which report errors to a master module, said master module being nominated from among the modules.

29. The local area network of claim 24 wherein the means for indicating a fault indicates network trunk cable faults.

30. The local area network of claim 24 wherein the means for indicating a fault indicates module drop cable faults.

31. The local area network of claim 24 wherein the means for indicating a fault indicates network trunk cable discontinuities.

32. The local area network of claim 24 wherein the means for indicating a fault indicates module drop cable discontinuities.

33. The local area network of claim 24 wherein the means for indicating a fault indicates excessive cable noise.

34. The local area network of claim 24 wherein the means for indicating a fault indicates failures of token bus module transmitters.

35. The local area network of claim 24 wherein the means for indicating a fault indicates failures of token bus module receivers.

36. The local area network of claim 24 wherein at least one module interfaces the local area network to a subsystem, said subsystem comprising (i) a node bus and (ii) a plurality of devices connected to the node bus, said devices communicating with each other and the at least one module via the node bus.

37. The local area network of claim 24 wherein all of the modules are agent modules and one of the modules is nominated to serve as a master module, said agent modules being adapted to report errors to the master module when an agent module fails to receive heartbeat signals at the predetermined periodic rate, and said master module being adapted to determine when a fault exists based on the errors reported by the agent modules.

38. The local area network of claim 37 wherein each module is assigned a unique identifying character having an ordered priority value and the nominated master module is the module having the identifying character of highest priority value.

39. The local area network of claim 37 wherein the agent modules report errors to the master module according to a set of agent rules.

40. The local area network of claim 39 wherein the master module applies a set of master rules to error reports from the agent modules to determine that a fault exists.

41. The local area network of claim 37 wherein the master module applies a set of master rules to error reports from agent modules to determine that a fault exists.

42. The local area network of claim 37 wherein the master module commands at least one agent module to perform at least one corrective action to recover from the fault.

43. The local area network of claim 37 wherein at least one module interfaces the local area network to a corresponding subsystem, said subsystem comprising a plurality of devices communicating with each other and the at least one module via a node bus.

44. The local area network of claim 43 wherein one of the devices on the node bus is a master device for receiving error reports from the other devices on the node bus, said master device determining if a fault exists on the node bus, and reporting node bus faults to the at least one module.

45. A token passing local area network with fault detection and recovery comprising:
  a master module on the network;
  at least one agent module on the network;
  a token bus with redundant cables for providing communication among the modules, said token bus interconnecting each agent module and the master module such that each module communicates with all other modules;
  in each module, at least one transmitter transmitting heartbeat signals on each redundant cable of the token bus at a predetermined periodic rate;
  in each module, at least one receiver being adapted to receive every heartbeat signal from the other modules on each redundant cable;
  in each module, means for monitoring the periodic heartbeat signals on each redundant cable;
  in each module, means for determining when an error occurs based on the monitored heartbeat signals;
  means for reporting an error to the master module when an error occurs; and
  in the master module, means for monitoring errors reported by modules and for determining when a network fault exists based on the monitored error reports; and
  means for initiating a fault recovery action.

* * * * *